US012667224B2

(12) United States Patent
Hillstrom et al.

(10) Patent No.: US 12,667,224 B2
(45) Date of Patent: Jun. 30, 2026

(54) PORTABLE GRILLS INCLUDING A BASE HAVING SUPPORTS FOR STORING REMOVABLE SIDE TABLES

(71) Applicant: Weber-Stephen Products LLC, Palatine, IL (US)

(72) Inventors: Henry Michael Hillstrom, Chicago, IL (US); Derek Edward Schmitz, Chicago, IL (US); Karol Polaczek, Jr., Hickory Hills, IL (US); Sean Alan Yakes, Schaumberg, IL (US); Paul Richard Hunt, Lake Zurich, IL (US)

( * ) Notice: Subject to any disclaimer, the term of this patent is extended or adjusted under 35 U.S.C. 154(b) by 764 days.

(21) Appl. No.: 18/175,353

(22) Filed: Feb. 27, 2023

(65) Prior Publication Data

US 2023/0397763 A1 Dec. 14, 2023

Related U.S. Application Data

(60) Provisional application No. 63/351,225, filed on Jun. 10, 2022.

(51) Int. Cl.
*A47J 37/07* (2006.01)
*F24C 3/14* (2021.01)

(52) U.S. Cl.
CPC ....... *A47J 37/0763* (2013.01); *A47J 37/0713* (2013.01); *A47J 37/0786* (2013.01); *F24C 3/14* (2013.01)

(58) Field of Classification Search
CPC ............... A47J 37/0763; A47J 37/0713; A47J 37/0786; F24C 3/14
USPC ..................................................... 126/25 R
See application file for complete search history.

(56) References Cited

U.S. PATENT DOCUMENTS

| | | | | | |
|---|---|---|---|---|---|
| 5,076,257 | A | * | 12/1991 | Raymer | .............. A47J 37/0786 |
| | | | | | 126/41 R |
| D457,030 | S | | 5/2002 | DeMars | |
| D457,776 | S | | 5/2002 | DeMars | |
| D458,506 | S | | 6/2002 | DeMars | |
| 6,606,987 | B2 | | 8/2003 | DeMars | |
| 6,699,036 | B2 | | 3/2004 | Schlosser et al. | |

(Continued)

FOREIGN PATENT DOCUMENTS

| | | |
|---|---|---|
| AU | 2005100471 | 9/2005 |
| AU | 2009212882 | 4/2010 |

(Continued)

OTHER PUBLICATIONS

IP Australia, "Examination Report No. 1," issued in connection with Australian Patent Application No. 2023282765, dated Oct. 7, 2025, 3 pages.

(Continued)

*Primary Examiner* — Avinash A Savani
(74) *Attorney, Agent, or Firm* — Avantech Law, LLP

(57) ABSTRACT

Example portable grills including a base having supports for storing removable side tables are disclosed. An example portable grill includes a cookbox, a base, and a side table. The base is coupled to the cookbox. The base is configured to support the cookbox above an underlying surface onto which the base is to be placed. The side table is configured to be removably coupled to the base in a storage position. The side table is to be located beneath the cookbox when the side table is coupled to the base in the storage position.

20 Claims, 37 Drawing Sheets

(56) References Cited

U.S. PATENT DOCUMENTS

| | | | |
|---|---|---|---|
| D503,582 S | 4/2005 | Johnson et al. | |
| D503,586 S | 4/2005 | Johnson | |
| D503,587 S | 4/2005 | Johnson et al. | |
| 6,910,475 B2 | 6/2005 | Zelek et al. | |
| 6,910,476 B2 | 6/2005 | Johnson et al. | |
| 6,945,774 B2 | 9/2005 | Shoeb | |
| D510,680 S | 10/2005 | Johnson | |
| 6,951,213 B2 | 10/2005 | Coleman et al. | |
| 6,976,485 B2 | 12/2005 | Johnson et al. | |
| 6,981,497 B2 | 1/2006 | DeMars | |
| 7,004,063 B1 | 2/2006 | Li | |
| 7,028,684 B2 | 4/2006 | Johnson | |
| 7,073,429 B2 | 7/2006 | Bruno et al. | |
| 7,373,875 B2 | 5/2008 | Bruno et al. | |
| 7,438,071 B2 | 10/2008 | Johnson et al. | |
| 7,640,929 B2 | 1/2010 | Johnson et al. | |
| 7,753,046 B2 | 7/2010 | Bruno et al. | |
| 7,757,604 B2 | 7/2010 | Gonzalez | |
| 7,762,249 B2 | 7/2010 | Johnson et al. | |
| 7,802,565 B2 | 9/2010 | Bruno | |
| 7,810,484 B2 | 10/2010 | Schlosser et al. | |
| D631,686 S | 2/2011 | Tiller et al. | |
| 8,074,635 B2 | 12/2011 | Bruno et al. | |
| 8,156,860 B2 | 4/2012 | Liu et al. | |
| 8,161,958 B2 | 4/2012 | Johnson et al. | |
| 8,201,550 B2 | 6/2012 | Malumyan | |
| 8,215,297 B2 | 7/2012 | Foster | |
| 8,316,837 B2 | 11/2012 | Malumyan | |
| 8,522,769 B2 | 9/2013 | Ducate, Jr. et al. | |
| 8,607,777 B2 | 12/2013 | Ducate, Jr. et al. | |
| 8,770,632 B2 | 7/2014 | Zelek | |
| 8,851,060 B2 | 10/2014 | Johnson et al. | |
| D737,092 S | 8/2015 | Lin | |
| D742,681 S | 11/2015 | Pai | |
| 9,187,108 B2 | 11/2015 | Bruno et al. | |
| 9,351,608 B2 | 5/2016 | Lin | |
| D760,012 S | 6/2016 | Lin | |
| 9,392,904 B2 | 7/2016 | Garman | |
| 9,504,352 B2 | 11/2016 | Lin | |
| D790,903 S | 7/2017 | Yang | |
| D801,745 S | 11/2017 | Costa et al. | |
| 9,826,859 B1 * | 11/2017 | Steele ............... | A47J 37/0763 |
| 10,451,285 B2 | 10/2019 | Dumenil | |
| D881,631 S | 4/2020 | Lien | |
| 11,033,149 B2 | 6/2021 | Bartlett | |
| 2002/0069866 A1 | 6/2002 | DeMars | |
| 2004/0112361 A1 | 6/2004 | Delek et al. | |
| 2004/0112364 A1 | 6/2004 | Johnson et al. | |
| 2006/0086351 A1 | 4/2006 | Wilgus et al. | |
| 2008/0230045 A1 | 9/2008 | Bruno | |
| 2008/0271728 A1 | 11/2008 | Pai | |
| 2009/0165771 A1 | 7/2009 | Selk | |
| 2010/0275906 A1 | 11/2010 | Foster | |
| 2011/0203566 A1 | 8/2011 | Lin | |
| 2011/0283992 A1 | 11/2011 | DeMars | |
| 2014/0251160 A1 | 9/2014 | Contarino, Jr. | |
| 2017/0159941 A1 | 6/2017 | Kahler et al. | |
| 2021/0177205 A1 | 6/2021 | James | |

FOREIGN PATENT DOCUMENTS

| | | |
|---|---|---|
| KR | 20100000391 U | 1/2010 |
| WO | 2019084630 A1 | 5/2019 |

OTHER PUBLICATIONS

IP Australia, "Certificate of Examination" issued in connection with Australian Design Patent Application No. 202216156, dated Mar. 29, 2023, 2 pages.

IP Australia, "Certificate of Examination" issued in connection with Australian Design Patent Application No. 202216160, dated Mar. 29, 2023, 2 pages.

International Searching Authority, "International Search Report," issued in connection with International Patent Application No. PCT/US2023/014095, mailed on Jun. 14, 2023, 3 pages.

International Searching Authority, "Written Opinion," issued in connection with International Patent Application No. PCT/US2023/014095, dated Jun. 14, 2023, 3 pages.

Sanchez et al., "Zsim: Fast and accurate microarchitectural simulation of thousand-core systems," ACM SIGARCH Computer architecture news, Jun. 2013, 12 pages.

Weber Q1200 Liquid Propane Grill, Available on Amazon.com, Mar. 29, 2022, https://www.amazon.com/dp/B09WTN9NY8/ref, 2022, 5 pages.

United States Patent and Trademark Office, "Non-Final Rejection," issued in connection with U.S. Appl. No. 29/842,226, mailed on Jul. 19, 2023, 5 pages.

United States Patent and Trademark Office, "Non-Final Rejection," issued in connection with U.S. Appl. No. 29/842,225, mailed on Jul. 19, 2023, 5 pages.

United States Patent and Trademark Office, "Notice of Allowance," issued in connection with U.S. Appl. No. 29/842,221, mailed on Aug. 3, 2023, 6 pages.

China National Intellectual Property Administration, "Notice of Decision of Grant of Patent Right for Design," issued in connection with Chinese Patent Application No. 202230685683.4, dated Aug. 3, 2023, 5 pages.

United States Patent and Trademark Office, "Notice of Allowance," issued in connection with U.S. Appl. No. 29/842,221, mailed on Aug. 14, 2023, 6 pages.

IP Australia, "Notice of Acceptance," issued in connection with Australian Patent Application No. 2023282765, dated Nov. 27, 2025, 3 pages.

European Patent Office, "Extended European Search Report," issued in connection with European Patent Application No. 23820228.7, dated Sep. 23, 2025, 8 pages.

International Bureau, "International Preliminary Report on Patentability," issued in connection with International Patent Application No. PCT/US2023/014095, mailed Dec. 19, 2024, 6 pages.

European Patent Office, "Examination Report," issued in connection with European Patent Application No. 23820228.7, dated Dec. 17, 2025, 8 pages.

European Union Intellectual Property Office, "Certificate of Registration No. 015000780-0001," issued on Oct. 18, 2022, 5 pages.

European Union Intellectual Property Office, "Certificate of Registration No. 015000774-0001," issued on Oct. 18, 2022, 5 pages.

European Union Intellectual Property Office, "Certificate of Registration No. 015000776-0001," issued on Oct. 18, 2022, 5 pages.

European Union Intellectual Property Office, "Certificate of Registration No. 015000777-0001," issued on Oct. 18, 2022, 5 pages.

United Kingdom Intellectual Property Office, "Certificate of Registration No. 6237870," issued on Nov. 9, 2022, 5 pages.

United Kingdom Intellectual Property Office, "Certificate of Registration No. 6237849," issued on Nov. 9, 2022, 5 pages.

United Kingdom Intellectual Property Office, "Certificate of Registration No. 6237850," issued on Nov. 9, 2022, 5 pages.

United Kingdom Intellectual Property Office, "Certificate of Registration No. 6237851," issued on Nov. 9, 2022, 5 pages.

IP Australia, "Certificate of Registration" issued in connection with Australian Design Patent Application No. 202216155, dated Nov. 28, 2022, 10 pages.

IP Australia, "Certificate of Registration" issued in connection with Australian Design Patent Application No. 202216156, dated Nov. 28, 2022, 10 pages.

IP Australia, "Certificate of Registration" issued in connection with Australian Design Patent Application No. 202216158, dated Nov. 28, 2022, 10 pages.

IP Australia, "Certificate of Registration" issued in connection with Australian Design Patent Application No. 202216160, dated Nov. 28, 2022, 10 pages.

IP Australia, "Certificate of Examination" issued in connection with Australian Design Patent Application No. 202216155, dated Mar. 27, 2023, 2 pages.

(56)     References Cited

OTHER PUBLICATIONS

IP Australia, "Certificate of Examination" issued in connection with Australian Design Patent Application No. 202216158, dated Mar. 27, 2023, 2 pages.

* cited by examiner

SECTION A-A

SECTION B-B

SECTION C-C

SECTION D-D

PORTABLE GRILLS INCLUDING A BASE HAVING SUPPORTS FOR STORING REMOVABLE SIDE TABLES

RELATED APPLICATIONS

This application claims priority to U.S. Provisional Patent Application No. 63/351,225, filed Jun. 10, 2022. The entirety of U.S. Provisional Patent Application No. 63/351, 225 is hereby incorporated by reference herein.

FIELD OF THE DISCLOSURE

This disclosure relates generally to portable grills and, more specifically, to portable grills including a base having supports for storing removable side tables.

BACKGROUND

Portable grills typically include a cookbox, a base configured to support the cookbox, a lid configured to cover the cookbox so as to form a cooking chamber, and one or more heat-generating component(s) located within the cookbox and/or within the cooking chamber. In some examples, the portable grill can be implemented as an electric portable grill, with the heat-generating component(s) being implemented as one or more electrically-powered heating element(s). In other examples, the portable grill can instead be implemented as a gas portable grill, with the heat-generating component(s) being implemented as one or more gas burner(s). Portable grills also commonly include one or more side table(s) configured to support one or more cooking vessels, cooking accessories, and/or items of food when the side table(s). The side table(s) of the portable grill is/are typically couplable to the base of the portable grill via one or more mechanical fastener(s) (e.g., one or more screw(s), bolt(s), rod(s), nut(s), etc.) that require the use of one or more hand tool(s) (e.g., a screwdriver, a wrench, etc.) to either fasten or unfasten the side table(s) to or from the base.

In some known examples, the side table(s) of the portable grill is/are rotatably coupled to the base of the portable grill such that the side table(s) can be rotated relative to the base and/or relative to the cookbox between a use position and a storage position. The use position is typically a position in which the side table(s) is/are laterally offset from the cookbox of the portable grill, with the side table(s) being horizontally oriented to facilitate supporting one or more cooking vessels, cooking accessories, and/or items of food. In some examples, the storage position is a position in which the side table(s) is/are folded (e.g., rotated) inwardly (e.g., one hundred and eighty degrees relative to the use position) to a location within the cooking chamber and/or the cookbox of the portable grill.

Figure 1:
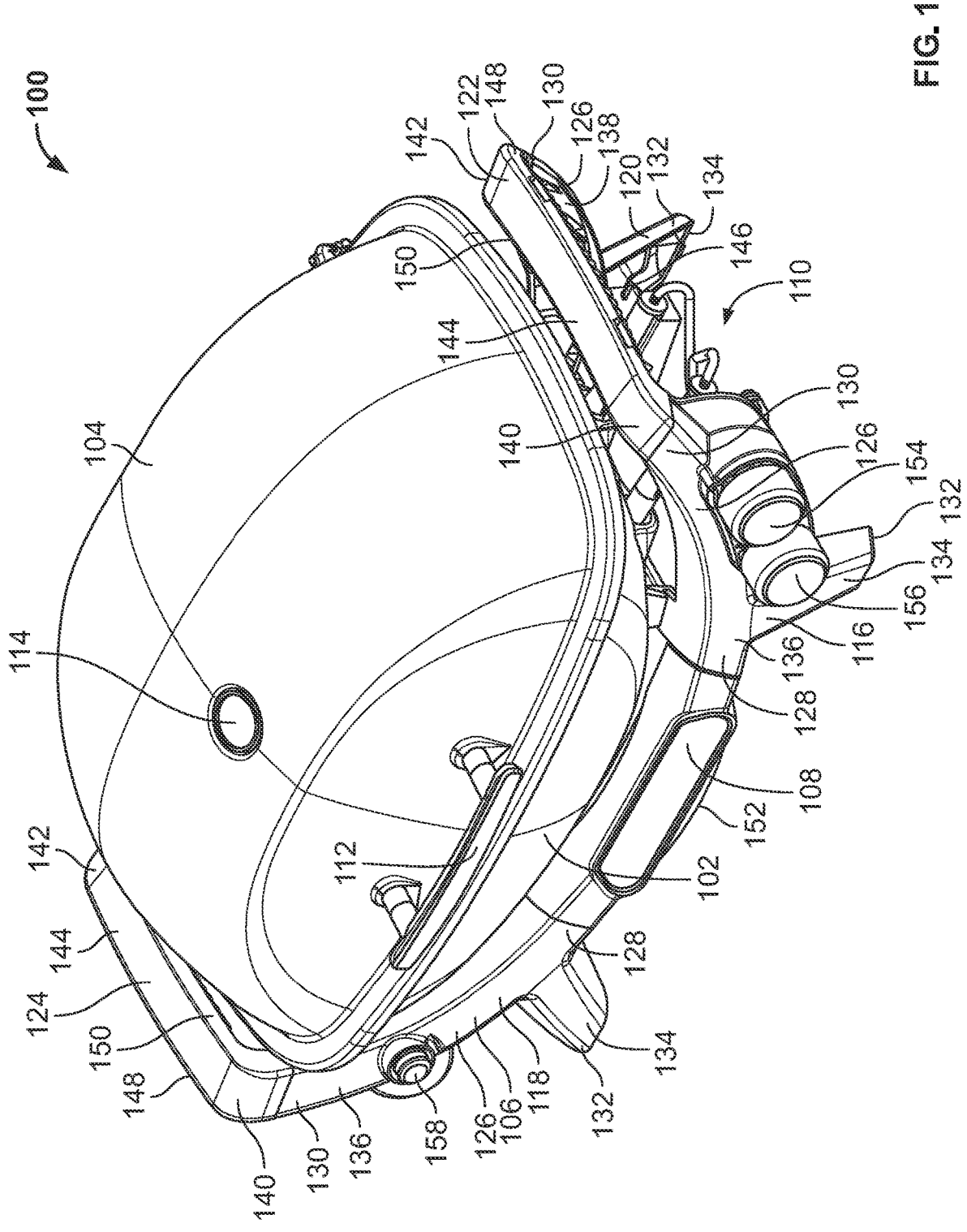
FIG. 1 is a perspective view of an example portable grill constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

As discussed above, known portable grills commonly include one or more side table(s) configured to support one or more cooking vessels, cooking accessories, and/or items of food when the side table(s). The side table(s) of such known portable grills is/are typically couplable to the base of the portable grill via one or more mechanical fastener(s) (e.g., one or more screw(s), bolt(s), rod(s), nut(s), etc.) that require the use of one or more hand tool(s) (e.g., a screwdriver, a wrench, etc.) to either fasten or unfasten the side table(s) to or from the base. A user of such a known portable grill must accordingly locate and make use of the appropriate hand tool(s) any time a need or desire to remove the side table(s) arises, as may occur, for example, if the user wanted to replace the side table(s), or is the user wanted to wash the side table(s) in either a sink or a dishwasher.

As further discussed above, the side table(s) of some known portable grills is/are rotatably coupled to the base of the portable grill such that the side table(s) can be rotated relative to the base and/or relative to the cookbox between a use position and a storage position. In some examples, the storage position is a position in which the side table(s) is/are folded (e.g., rotated) inwardly (e.g., one hundred and eighty degrees relative to the use position) to a location within the cooking chamber and/or the cookbox of the portable grill. One drawback of such an arrangement is that locating the side table(s) within the cooking chamber and/or the cookbox of the portable grill exposes the side table(s) to cooking waste (e.g., grease, ash, and/or other residual cooking matter) that might be present within the cooking chamber and/or the cookbox.

Unlike the known portable grills described above, example portable grills disclosed herein include one or more side table(s) configured to be removably coupled to the base of the portable grill without the use of any hand tools. Such an arrangement advantageously increases the ease by which the side table(s) can be connected to and/or removed from the portable grill (e.g., for assembling, replacing, and/or cleaning the side table(s)), thereby providing the user of the portable grill with an improved user experience relative to known portable grills. Example portable grills disclosed herein also advantageously include a base having supports configured to store the removable side table(s) of the portable grill in a storage position that places and/or locates the side table(s) beneath the cookbox of the portable grill. Placing the side table(s) in a storage position that is beneath the cookbox of the portable grill advantageously minimizes (e.g., eliminates) the possibility of the side table(s) being exposed to cooking waste (e.g., grease, ash, and/or other residual cooking matter) that might be present within the cooking chamber and/or the cookbox when the side table(s) is/are being stored, as may occur when the portable grill as a whole is being transported or stored. In some disclosed examples, the footprint and/or the form factor of the side table(s) is substantially within (e.g., does not exceed) the footprint and/or the form factor of the base of the portable grill when the side table(s) is/are positioned in the storage position beneath the cookbox. Such an arrangement advantageously increases the portability of the portable grill, thereby providing the user of the portable grill with an improved user experience relative to known portable grills.

The above-identified features as well as other advantageous features of example portable grills including a base having supports for storing removable side tables as disclosed herein are further described below in connection with the figures of the application. As used herein in a mechanical context, the term "configured" means sized, shaped, arranged, structured, oriented, positioned, and/or located. For example, in the context of a first object configured to fit within a second object, the first object is sized, shaped, arranged, structured, oriented, positioned, and/or located to fit within the second object. As used herein in an electrical and/or computing context, the term "configured" means arranged, structured, and/or programmed. For example, in the context of a controller configured to perform a specified operation, the controller is arranged, structured, and/or programmed (e.g., based on machine-readable instructions) to perform the specified operation.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween; without other parts therebetween; with the first and second parts touching; or without the first and second parts being in direct contact with one another. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, the phrase "in electrical communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, the term "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processor circuitry is/are best suited to execute the computing task(s).

Figure 2:
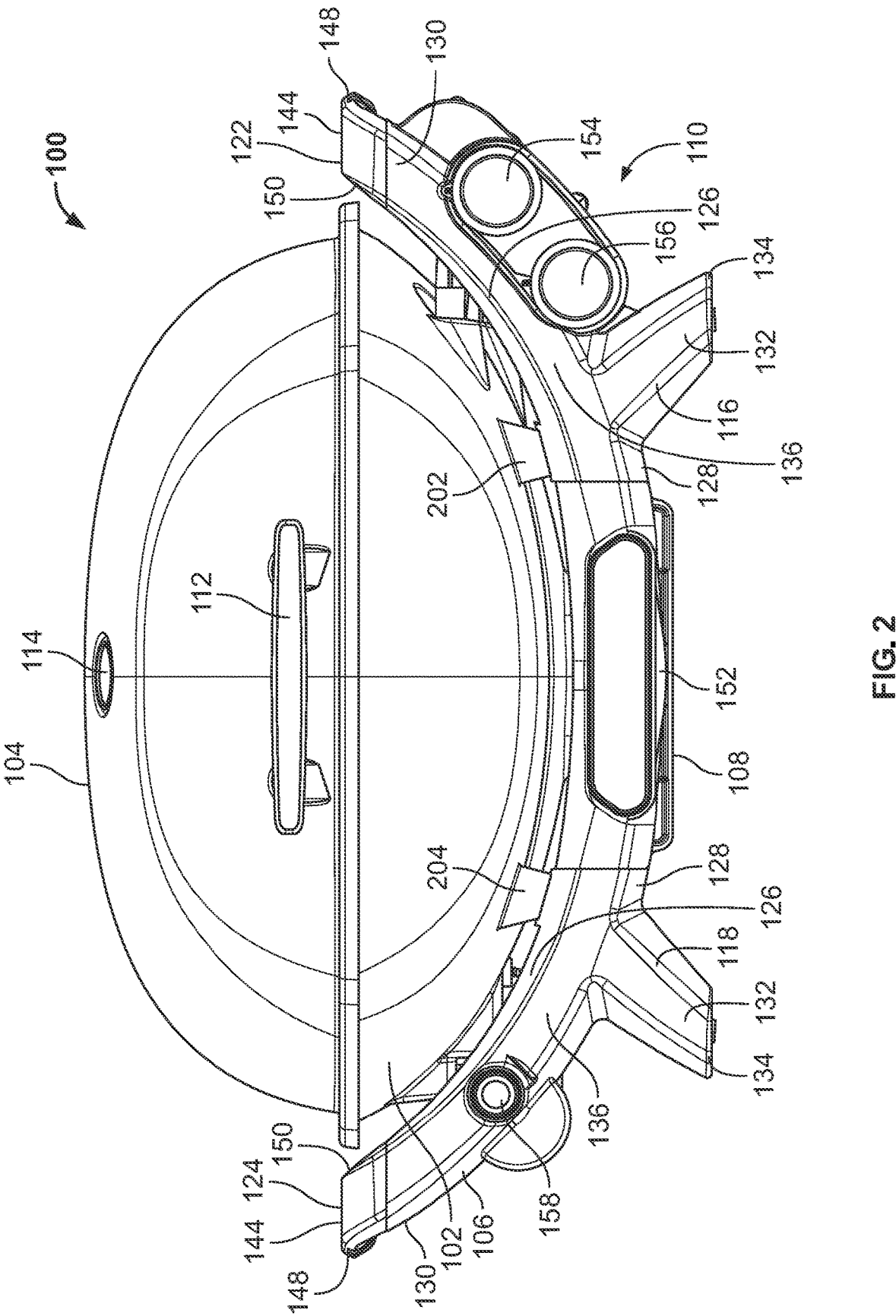
FIG. 2 is a front view of the portable grill of FIG. 1.
Figure 3:
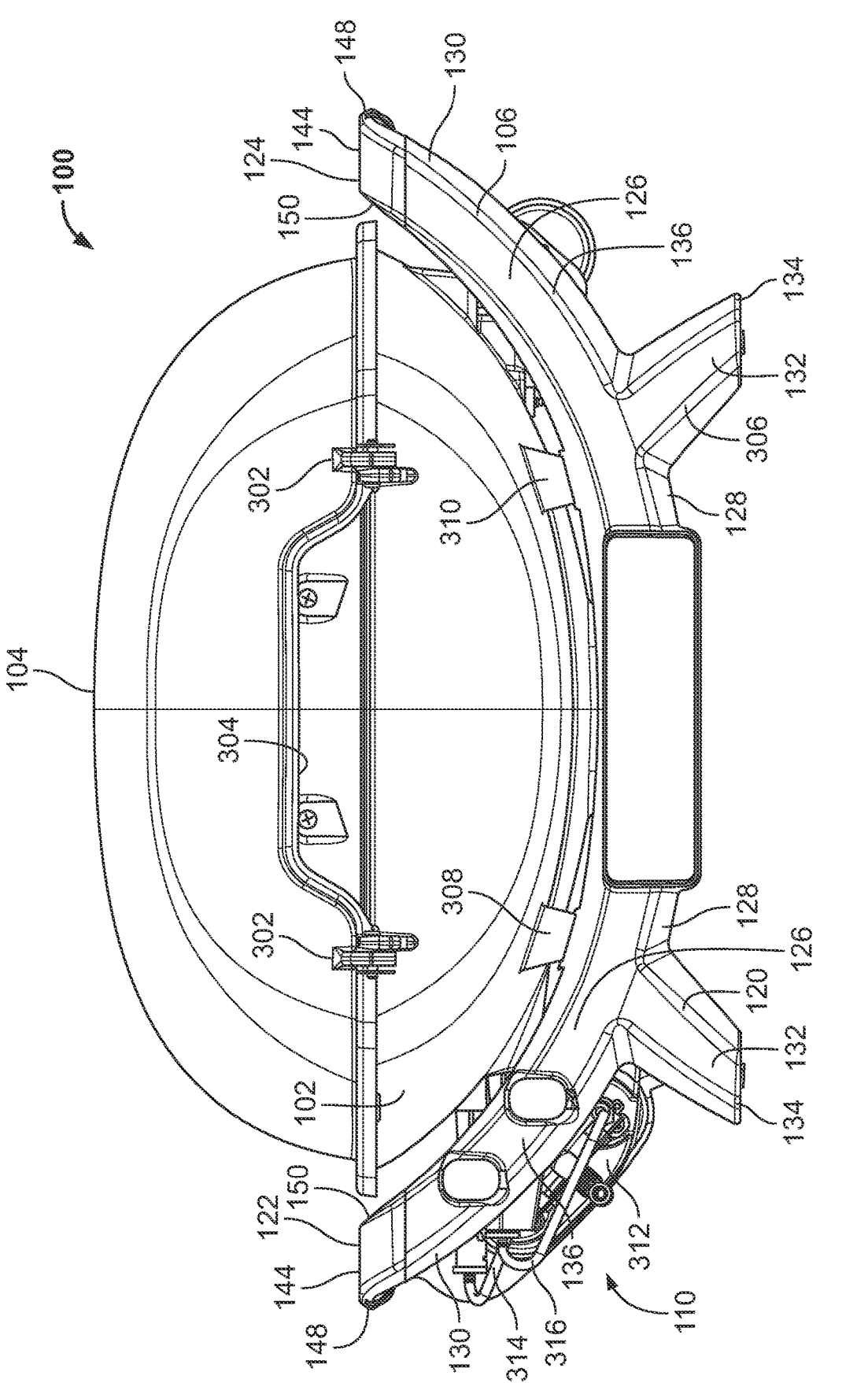
FIG. 3 is a rear view of the portable grill of FIGS. 1 and 2.
Figure 4:
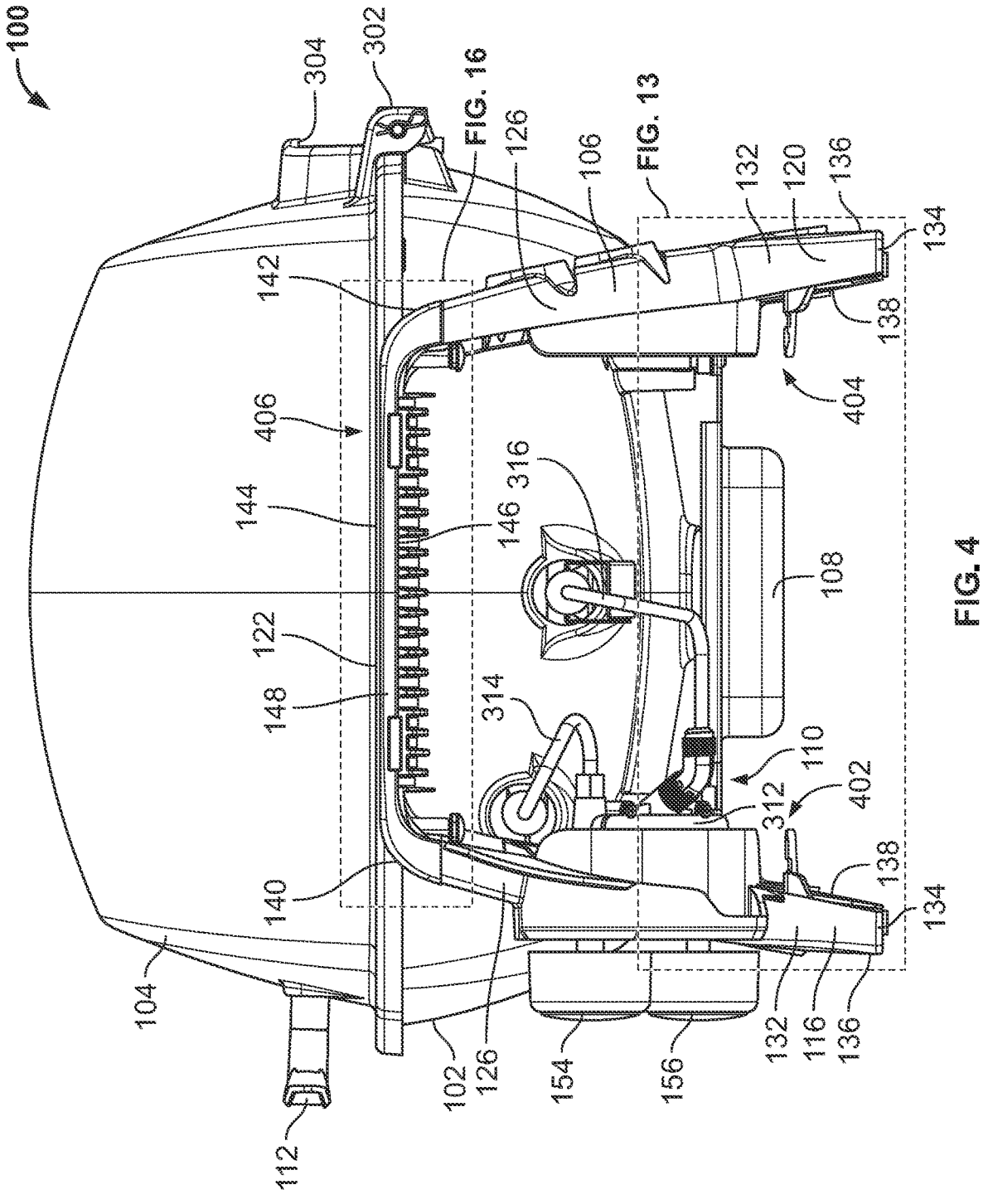
FIG. 4 is a right side view of the portable grill of FIGS. 1-3.
Figure 5:
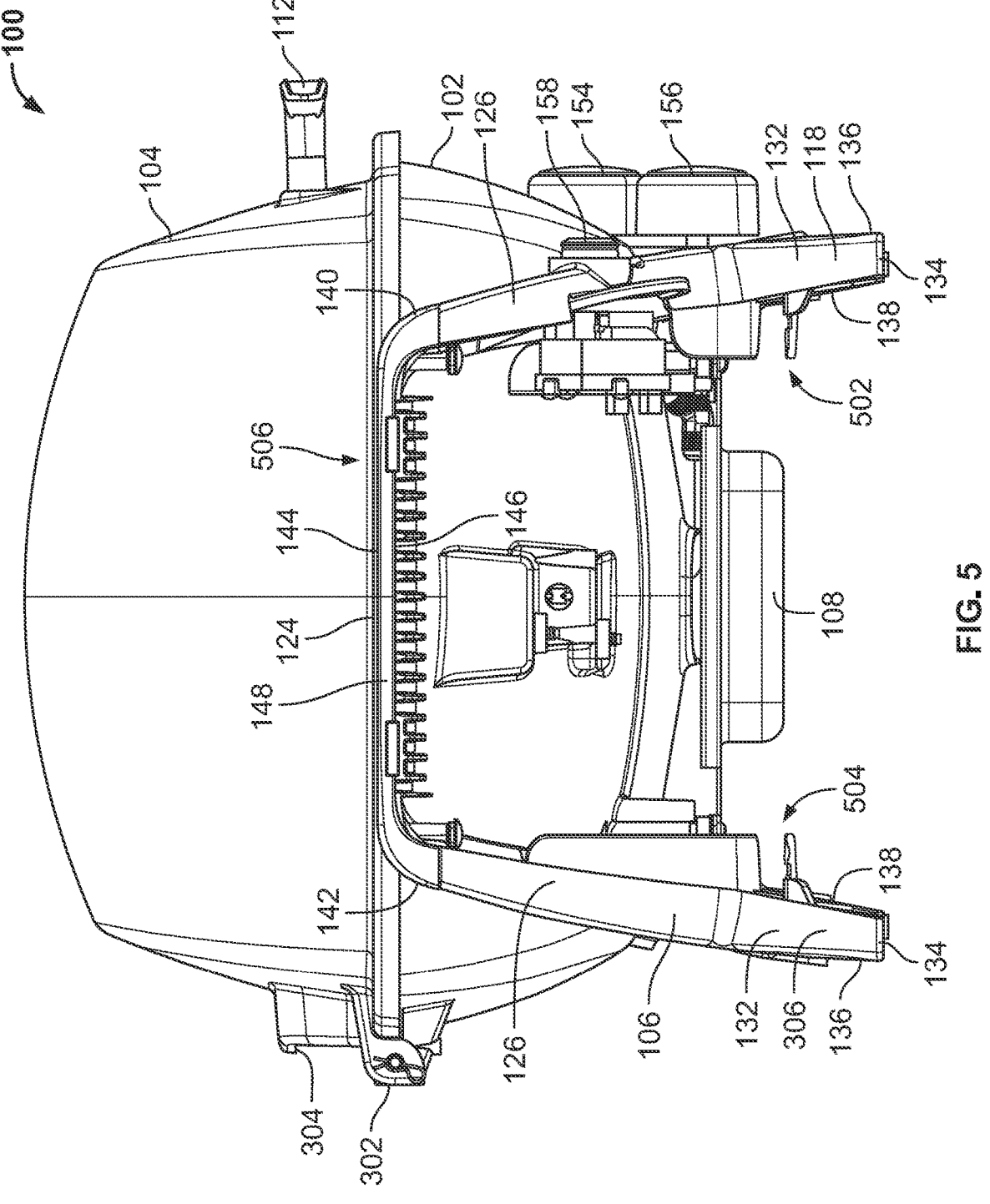
FIG. 5 is a left side view of the portable grill of FIGS. 1-4.
Figure 6:
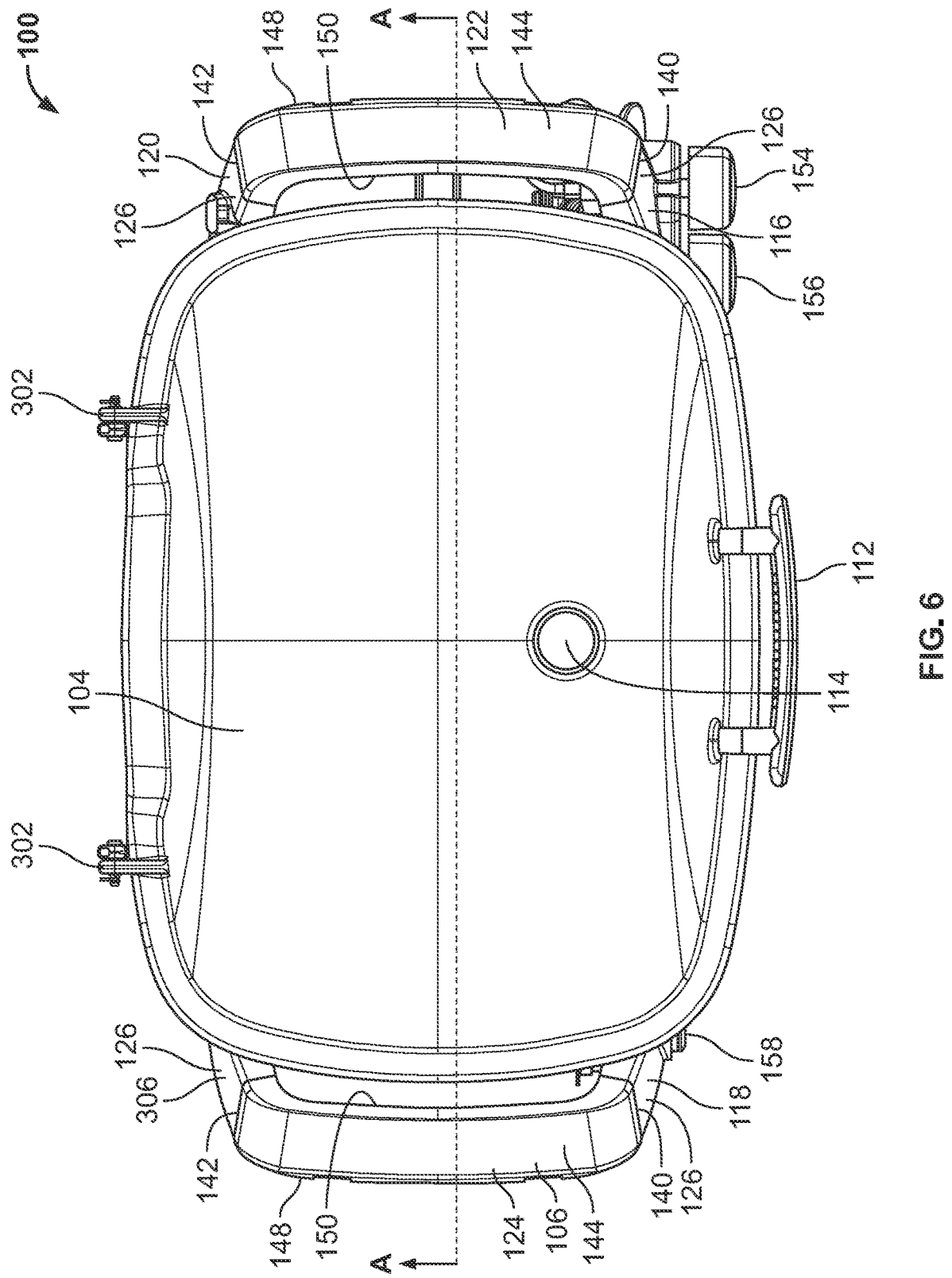
FIG. 6 is a top view of the portable grill of FIGS. 1-5.
Figure 7:
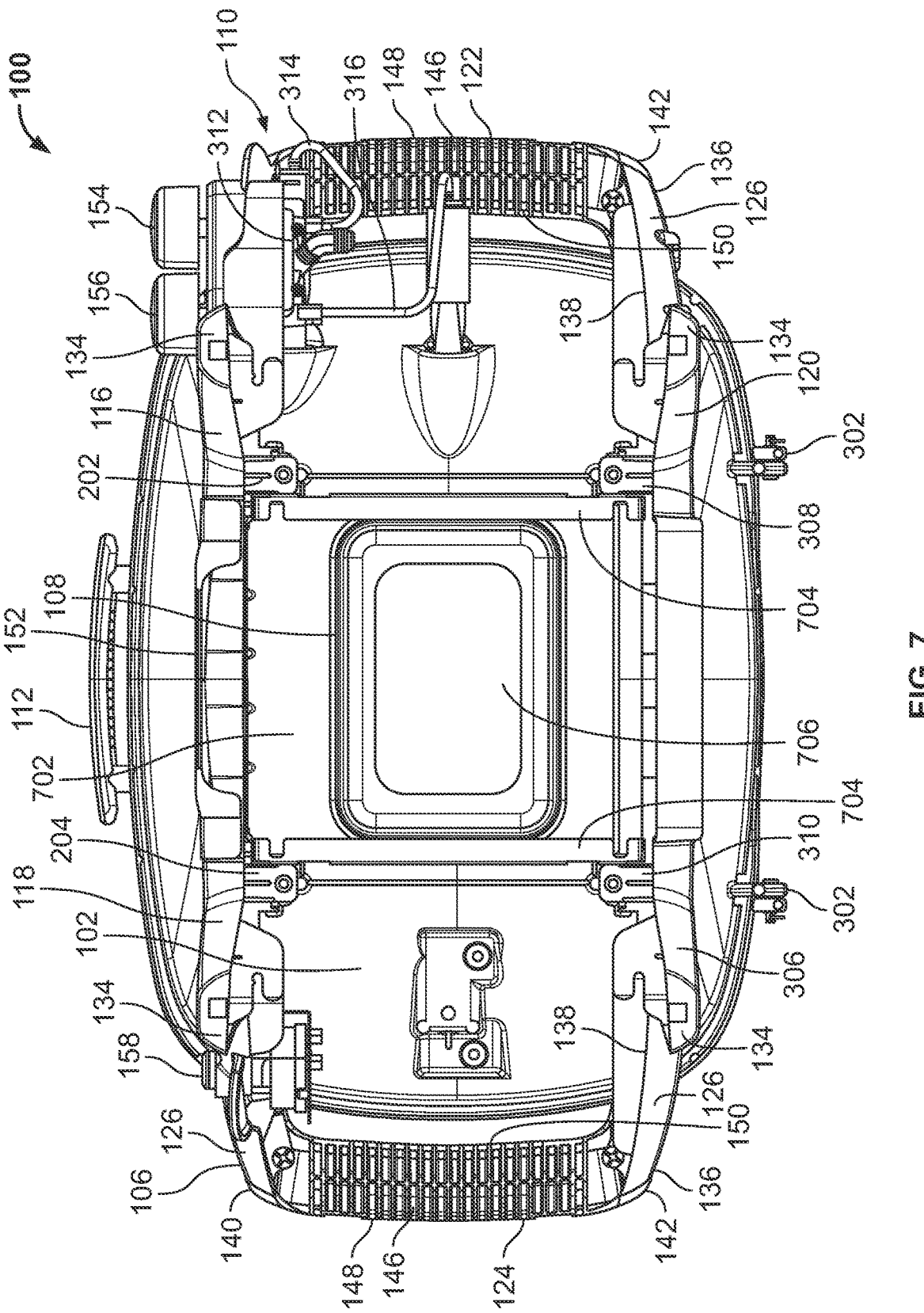
FIG. 7 is a bottom view of the portable grill of FIGS. 1-6.
Figure 8:
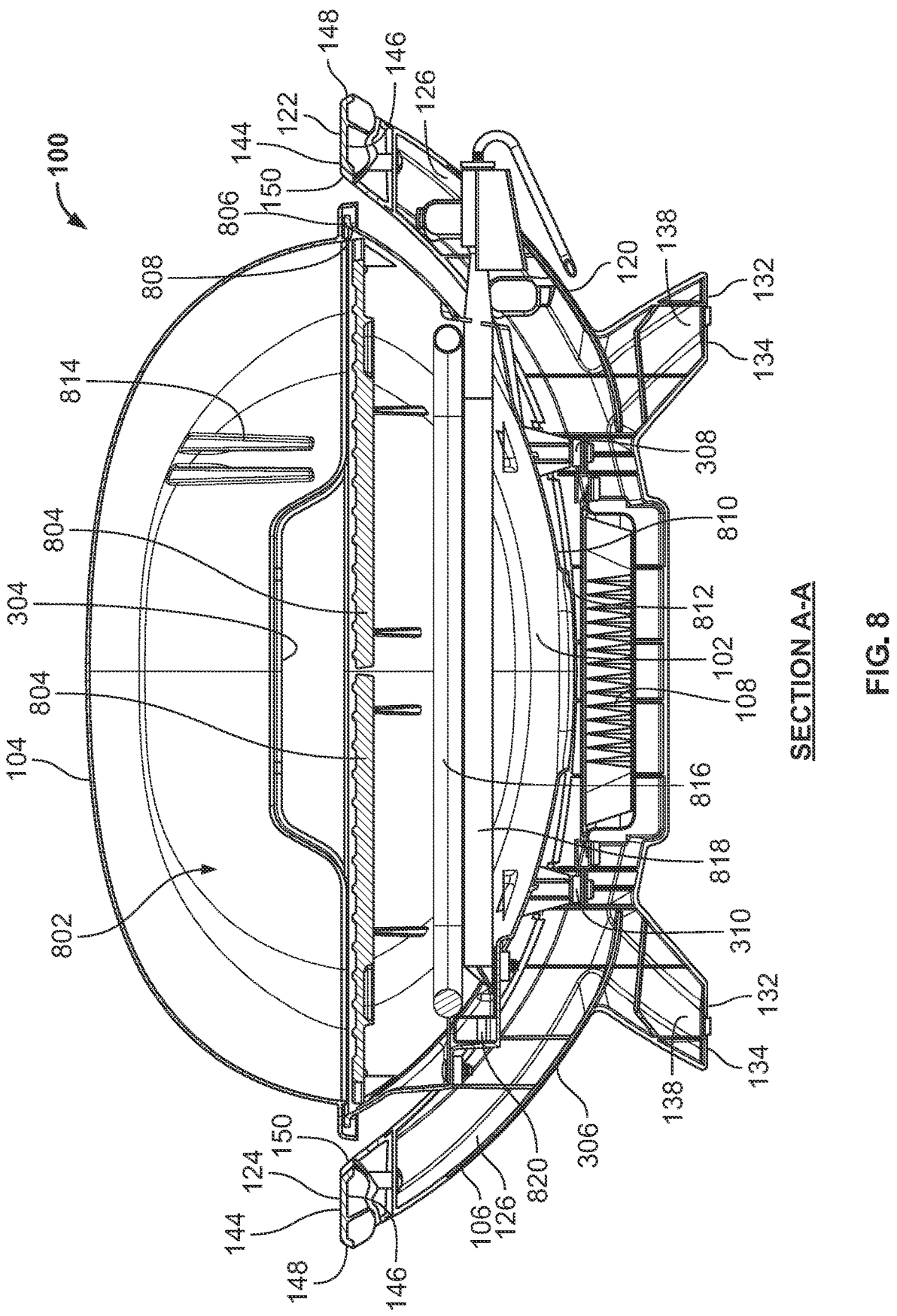
FIG. 8 is a cross-sectional view of the portable grill of FIGS. 1-7 taken along section A-A of FIG. 6.

FIG. 1 is a perspective view of an example portable grill 100 constructed in accordance with the teachings of this disclosure. FIG. 2 is a front view of the portable grill 100 of FIG. 1. FIG. 3 is a rear view of the portable grill 100 of FIGS. 1 and 2. FIG. 4 is a right side view of the portable grill 100 of FIGS. 1-3. FIG. 5 is a left side view of the portable grill 100 of FIGS. 1-4. FIG. 6 is a top view of the portable grill 100 of FIGS. 1-5. FIG. 7 is a bottom view of the portable grill 100 of FIGS. 1-6. FIG. 8 is a cross-sectional view of the portable grill 100 of FIGS. 1-7 taken along section A-A of FIG. 6. The portable grill 100 of FIGS. 1-8 includes an example cookbox 102, an example lid 104, an example base 106, an example waste management assembly 108, an example fuel management assembly 110, an example cooking chamber 802, and one or more example cooking grate(s) 804.

Figure 9:
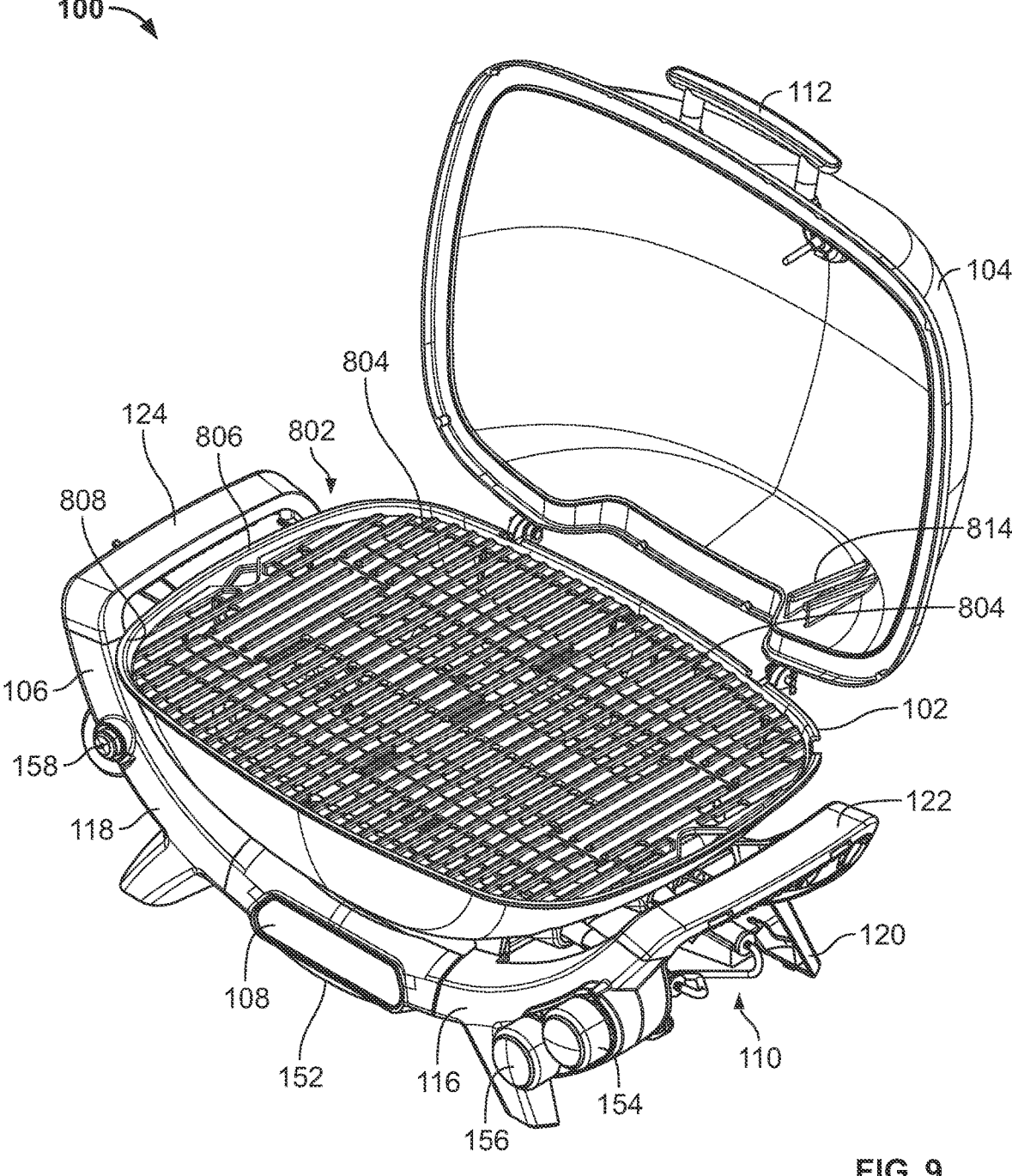
FIG. 9 is a perspective view of the portable grill of FIGS. 1-8, with the lid of the portable grill shown in an open position.
Figure 10:
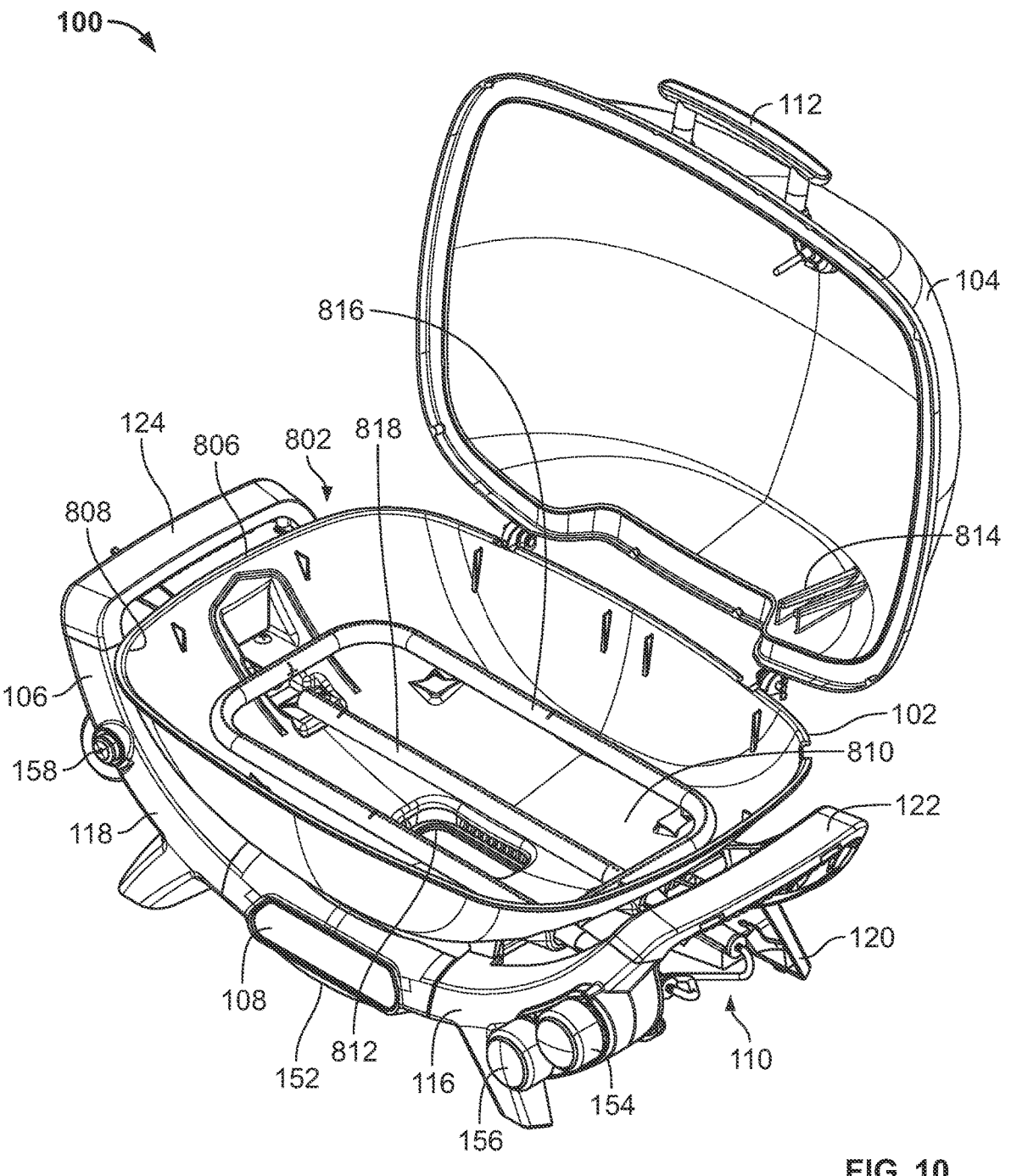
FIG. 10 is a perspective view of the portable grill of FIGS. 1-9, with the lid of the portable grill shown in an open position, and with the cooking grates of the portable grill removed to enhance the viewability of the interior of the cookbox of the portable grill.
Figure 11:
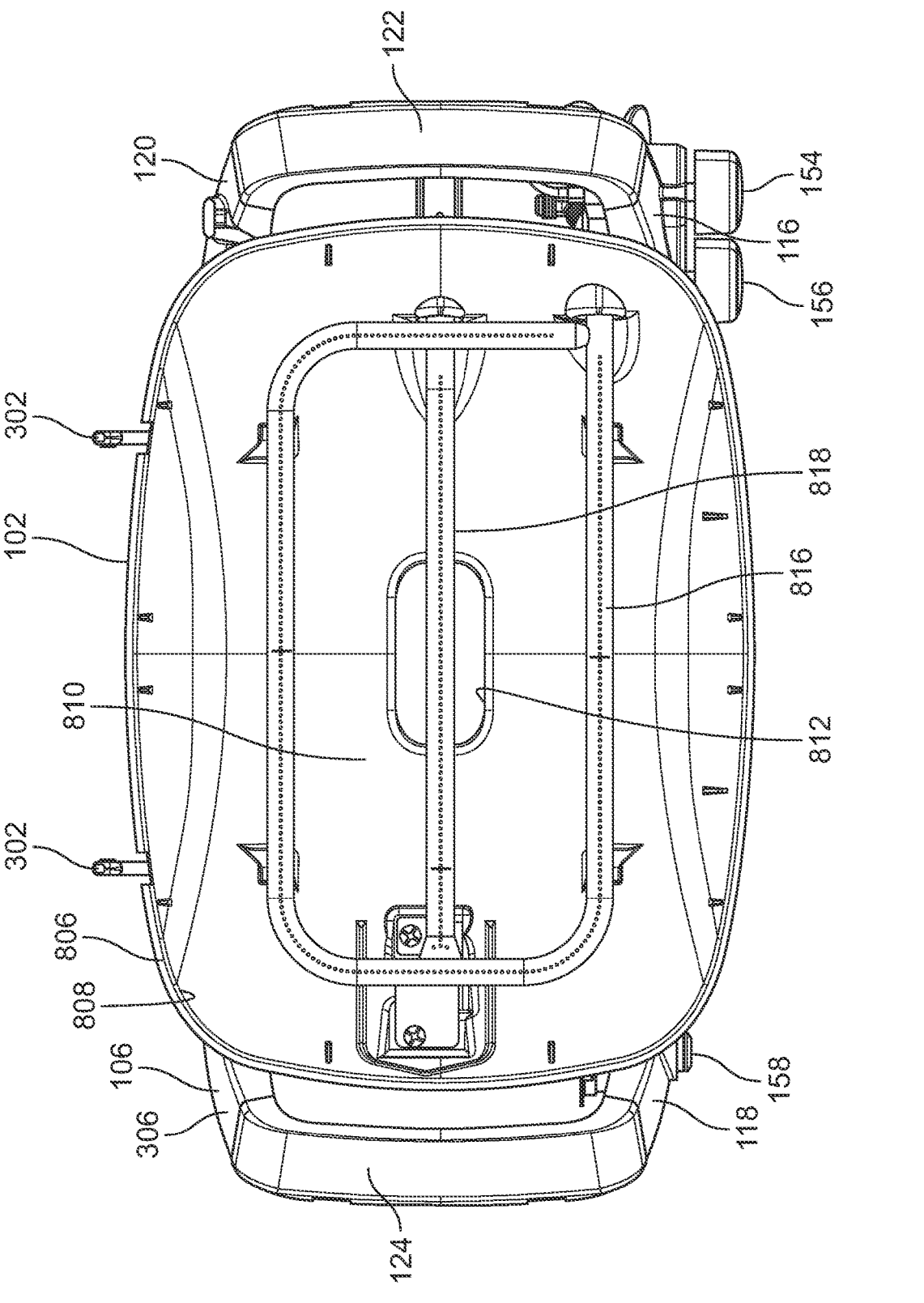
FIG. 11 is a top view of the portable grill of FIGS. 1-10, with the lid and the cooking grates of the portable grill removed to enhance the viewability of the interior of the cookbox of the portable grill.
Figure 12:
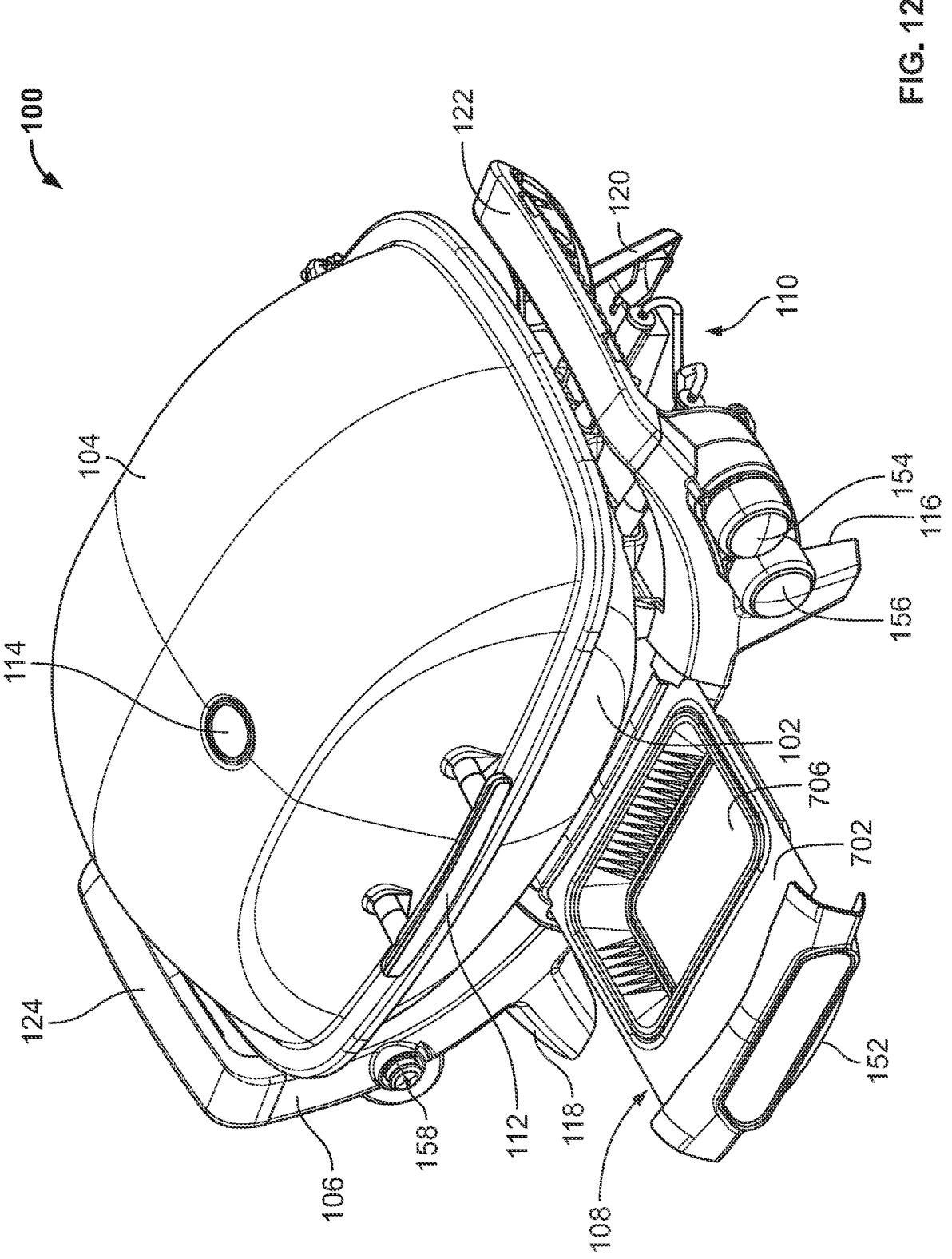
FIG. 12 is a perspective view of the portable grill of FIGS. 1-11, with the waste management assembly of the portable grill shown in an open position.

As shown in FIGS. 1-8, the lid 104 of the portable grill 100 is in a closed position relative to the cookbox 102 of the portable grill 100. FIG. 9 is a perspective view of the portable grill 100 of FIGS. 1-7, with the lid 104 of the portable grill 100 shown in an open position relative to the cookbox 102 of the portable grill 100. FIG. 10 is a perspective view of the portable grill 100 of FIGS. 1-9, with the lid 104 of the portable grill shown in an open position, and with the cooking grate(s) 804 of the portable grill 100 removed to enhance the viewability of the interior of the cookbox 102 of the portable grill 100. FIG. 11 is a top view of the portable grill 100 of FIGS. 1-10, with the lid 104 and the cooking grate(s) 804 of the portable grill 100 shown removed to enhance the viewability of the interior of the cookbox 102 of the portable grill 100. As shown in FIGS. 1-11, the waste management assembly 108 of the portable grill 100 is in a closed position relative to the cookbox 102 of the portable grill 100. FIG. 12 is a perspective view of the portable grill 100 of FIGS. 1-11, with the waste management assembly 108 of the portable grill 100 shown in an open position.

The cookbox 102 of FIGS. 1-12 is configured to support, carry, and/or house one or more component(s) of the portable grill 100 including, for example, the lid 104, the base 106, the waste management assembly 108, the fuel management assembly 110, and/or the cooking grate(s) 804. In instances where one or more of the aforementioned component(s) of the portable grill 100 is/are not supported, carried, and/or housed by the cookbox 102, such component(s) can alternatively be supported, carried, and/or housed by one or more other structure(s) of the portable grill 100 including, for example, the lid 104 and/or the base 106 of the portable grill 100. The cookbox 102 of the portable grill 100 can be of any configuration suitable for supporting, holding, and/or containing one or more cooking surface(s) and/or one or more item(s) of food to be cooked. In this regard, an upper portion (e.g., an example upper rim 806) of the cookbox 102 circumscribes and/or defines an example upper opening 808 having a configuration suitable to allow access to the cooking chamber 802 of the portable grill 100. In some examples, a lower portion (e.g., an example bottom wall 810) of the cookbox 102 includes an example lower opening 812 having a configuration suitable to allow cooking waste (e.g., grease, ash, and/or other residual cooking matter) to pass downwardly from the cookbox 102 into the waste management assembly 108 of the portable grill 100.

The lid 104 of the portable grill 100 is configured to cover and/or enclose the cookbox 102 of the portable grill 100 when the lid 104 is in a closed position. The lid 104 is movably (e.g., pivotally) coupled to the cookbox 102 via one or more example hinge(s) 302 such that the lid 104 can be moved (e.g., pivoted) relative to the cookbox 102 between a closed position (e.g., as shown in FIGS. 1-8) and an open position (e.g., as shown in FIGS. 9 and 10). In other examples, the lid 104 can instead be removably positioned on the cookbox 102 without there being any direct mechanical coupling between the lid 104 and the cookbox 102. In some such other examples, the lid 104 can be movably (e.g., pivotally) coupled to one or more structure(s) of the portable grill 100 other than the cookbox 102. For example, the lid 104 can be movably (e.g., pivotally) coupled to the base 106 of the portable grill 100. Movement of the lid 104 between the closed position (e.g., as shown in FIGS. 1-8) and the open position (e.g., as shown in FIGS. 9 and 10) can be facilitated via user interaction with an example handle 112 that is coupled to the lid 104.

The cookbox 102 and the lid 104 of the portable grill 100 collectively define the cooking chamber 802 of the portable grill 100. The cooking chamber 802 becomes accessible to a user of the portable grill 100 (e.g., via the upper opening 808 of the cookbox 102) when the lid 104 is in the open position (e.g., as shown in FIGS. 9 and 10). Conversely, the cooking chamber 802 is generally inaccessible to the user of the portable grill 100 when the lid 104 is in the closed position (e.g., as shown in FIGS. 1-8). User access to the cooking chamber 802 of the portable grill 100 may periodically become necessary, for example, to add an item of food to the cooking chamber 802 (e.g., at or toward the beginning of a cooking process), to remove an item of food from the cooking chamber 802 (e.g., at or toward the end of a cooking process), and/or to flip, rotate, relocate, or otherwise move an item of food within the cooking chamber 802 (e.g., during the middle of a cooking process). The cooking chamber 802 of the portable grill 100 may be of any configuration suitable for supporting, holding, and/or containing one or more cooking surface(s) (e.g., the cooking grate(s) 804) to be located therein, and/or suitable for supporting, holding, and/or containing one or more item(s) of food to be cooked therein.

As shown in FIGS. 1-8, the respective exteriors (e.g., exterior surfaces) of the cookbox 102 and the lid 104 of the portable grill 100 define and/or form a generally spheroidal shape when the lid 104 is in the closed position relative to the cookbox 102. In such an example, the cooking chamber 802 of the portable grill 100 likewise has a generally spheroidal shape corresponding to the generally spheroidal shape defined by the cookbox 102 and the lid 104. In other examples, the respective exteriors of the cookbox 102 and the lid 104 of the portable grill 100 can instead define and/or form a generally cuboidal shape when the lid 104 is in the closed position relative to the cookbox 102. In such other examples, the cooking chamber 802 of the portable grill 100 likewise has a generally cuboidal shape corresponding to the generally cuboidal shape defined by the cookbox 102 and the lid 104. In still other examples, the cooking chamber 802 of the portable grill 100 may have a geometric shape that differs from that defined by the respective exteriors of the cookbox 102 and the lid 104 of the portable grill 100.

In the illustrated example of FIGS. 1-12, the cooking grate(s) 804 of the portable grill 100 is/are implemented via a first cooking grate and a second cooking grate, both of which are positioned above a heating element (e.g., one or more gas burner(s)) located within the cookbox 102 of the portable grill 100. As shown in FIGS. 8 and 9, the first and second cooking grates 804 are configured in a side-by-side arrangement within the cookbox 102, with the first and second cooking grates 804 collectively filling and/or occupying the substantial entirety of a horizontal plane of the cookbox 102 that is defined by the upper rim 806 of the cookbox 102. In other examples, the first and second cooking grates 804 can instead be integrated to form a single cooking grate that fills and/or occupies (e.g., along the aforementioned horizontal plane) the substantial entirety of the cookbox 102. In still other examples, the first and second cooking grates 804 can instead be divided into a greater number (e.g., three, four, etc.) of cooking grates that collectively fill and/or occupy (e.g., along the aforementioned horizontal plane) the substantial entirety of the cookbox 102.

The portable grill 100 of FIGS. 1-12 further includes an example vent 304 configured to enable heat and/or smoke located within the cooking chamber 802 of the portable grill 100 to escape from the cooking chamber 802 into the surrounding atmosphere. As shown in FIG. 3, the vent 304 is formed along the rear side of the cookbox 102 and/or along the rear side of the lid 104 via a gap existing between an upper portion (e.g., the upper rim 806) of the cookbox 102 and a lower portion (e.g., a lower rim) of the lid 104. In other examples, the vent 304 can instead be formed via one or more opening(s) (e.g., one or more through hole(s)) formed in the cookbox 102 and/or in the lid 104.

The portable grill 100 of FIGS. 1-12 further includes an example 114 coupled to the lid 104. In the illustrated example of FIGS. 1-12, the temperature sensor 114 is implemented as a temperature gauge having a sensing portion located within and/or extending into the cooking chamber 802 of the portable grill 100, and a display portion that is located outside of and/or viewable externally from the cooking chamber 802 of the portable grill 100. As shown in FIGS. 1-6 and 12, the temperature sensor 114 is mounted to the lid 104 such that the display portion of the temperature gauge is flush with the exterior surface of the lid 104. Data, information, and/or signals sensed, measured, detected, and/or displayed by the temperature sensor 114 can be of any quantity, type, form, and/or format.

In the illustrated example of FIGS. 1-12, the lid 104 of the portable grill 100 further includes an example probe mount 814 coupled to or integrally formed by an interior surface of the lid 104. For example, as shown in FIGS. 8-10, the probe mount 814 is located along and/or integrally formed by a rear interior surface of the lid 104. The probe mount 814 is configured to support, carry, hold, and/or otherwise receive a removable ambient temperature probe, with the ambient temperature probe being configured to sense, measure, and/or detect a temperature within the cooking chamber 802 of the portable grill 100. In such examples, the ambient temperature probe is further configured to communicate (e.g., via wired or wireless electrical communication) temperature data measured, sensed, and/or detected via the ambient temperature probe to one or more computing devices (e.g., a temperature probe hub) located outside of and/or remotely from the cooking chamber 802 of the portable grill 100.

The base 106 of the portable grill 100 includes one or more support element(s) configured to support the cookbox 102 and/or the waste management assembly 108 above an underlying surface (e.g., a table top, a cart, a support stand, a ground surface, etc.) onto which the base 106 and/or, more generally, the portable grill 100 is placed. The support element(s) of the base 106 can include any type(s) and/or number(s) of frame member(s), mount(s), and/or leg(s). In the illustrated example of FIGS. 1-12, the base 106 has a rigid (e.g., non-collapsible) configuration. In other examples, the base 106 can include one or more collapsible component(s) (e.g., one or more foldable component(s), one or more telescopic component(s), etc.) configured to facilitate transitioning the base 106 between an erected configuration and a collapsed configuration.

In the illustrated example of FIGS. 1-12, the base 106 includes an example first front frame member 116, an example second front frame member 118, an example first rear frame member 120, an example second rear frame member 306, an example first side frame member 122, an example second side frame member 124, an example first front mount 202, an example second front mount 204, an example first rear mount 308, and an example second rear mount 310. As shown in FIGS. 1-12, the first front frame member 116 of the base 106 is located toward the right side of the cookbox 102, the second front frame member 118 of the base 106 is located toward the left side of the cookbox 102, and the waste management assembly 108 is located (e.g., at a position below the cookbox 102) between the first front frame member 116 and the second front frame member 118. Similarly, the first rear frame member 120 of the base 106 is located toward the right side of the cookbox 102, the second rear frame member 306 of the base 106 is located toward the left side of the cookbox 102, and the waste management assembly 108 is located (e.g., at a position below the cookbox 102) between the first rear frame member 120 and the second rear frame member 306.

The first front frame member 116 of the base 106 is coupled to the cookbox 102 via the first front mount 202 of the base 106, with the first front mount 202 being configured to space the first front frame member 116 apart from the exterior surface and/or the bottom wall 810 of the cookbox 102. The second front frame member 118 of the base 106 is coupled to the cookbox 102 via the second front mount 204 of the base 106, with the second front mount 204 being configured to space the second front frame member 118 apart from the exterior surface and/or the bottom wall 810 of the cookbox 102. The first rear frame member 120 of the base 106 is coupled to the cookbox 102 via the first rear mount 308 of the base 106, with the first rear mount 308 being configured to space the first rear frame member 120 apart from the exterior surface and/or the bottom wall 810 of the cookbox 102. The second rear frame member 306 of the base 106 is coupled to the cookbox 102 via the second rear mount 310 of the base 106, with the second rear mount 310 being configured to space the second rear frame member 306 apart from the exterior surface and/or the bottom wall 810 of the cookbox 102.

Each one of the first front frame member 116, the second front frame member 118, the first rear frame member 120, and the second rear frame member 306 of the base 106 of FIGS. 1-12 includes an example first segment 126 having an example first end 128 (e.g., a lower end) and an example second end 130 (e.g., an upper end) located opposite the first end 128. As shown in FIGS. 1-12, the first end 128 of each first segment 126 is located proximate to (e.g., adjacent) the waste management assembly 108 of the portable grill 100, and the second end 130 of each first segment 126 is coupled to and/or located proximate to (e.g., adjacent) either the first side frame member 122 or the second side frame member 124 of the base 106.

In the illustrated example of FIGS. 1-12, the first segment 126 of each one of the first front frame member 116, the second front frame member 118, the first rear frame member 120, and the second rear frame member 306 of the base 106 has a curved and/or contoured shape. In some examples, the curved and/or contoured shape of each first segment 126 complements a curved and/or contoured shape of a corresponding portion of the cookbox 102 of the portable grill 100 that is proximate the location of the first segment 126. In other examples, the curved and/or contoured shape of each first segment 126 may differ from a curved and/or contoured shape of a corresponding portion of the cookbox 102 of the portable grill 100 that is proximate the location of the first segment 126. In still other examples, the first segment 126 of each one of the first front frame member 116, the second front frame member 118, the first rear frame member 120, and the second rear frame member 306 of the base 106 can instead have a linear shape, or may be formed from a plurality of linear segments that may be positioned at one or more angles relative to one another.

Each one of the first front frame member 116, the second front frame member 118, the first rear frame member 120, and the second rear frame member 306 of the base 106 of FIGS. 1-12 further includes an example second segment 132 coupled to the first segment 126 at a location between the first end 128 and the second end 130 of the first segment 126, with the second segment 132 extending downwardly therefrom to form an example support leg 134 of the respective frame member and/or, more generally, of the base 106. Each support leg 134 is configured to contact an underlying surface (e.g., a table top, a cart, a support stand, a ground surface, etc.) onto which the base 106 and/or, more generally, the portable grill 100 is placed.

In the illustrated example of FIGS. 1-12, the second segment 132 of each one of the first front frame member 116, the second front frame member 118, the first rear frame member 120, and the second rear frame member 306 of the base 106 is integrally formed with the first segment 126 of the corresponding one of the first front frame member 116, the second front frame member 118, the first rear frame member 120, and the second rear frame member 306 of the base 106 such that the second segment 132 is inseparable from the first segment 126 in the absence of a mechanical destruction of the respective frame member. In other examples, the second segment 132 of each one of the first front frame member 116, the second front frame member 118, the first rear frame member 120, and the second rear frame member 306 of the base 106 can instead be removably coupled (e.g., via one or more fastener(s)) to the corresponding one of the first front frame member 116, the second front frame member 118, the first rear frame member 120, and the second rear frame member 306 of the base 106 such that the second segment 132 is removable from the first segment 126 without resorting to a mechanical destruction of the respective frame member.

Each one of the first front frame member 116, the second front frame member 118, the first rear frame member 120, and the second rear frame member 306 of the base 106 of FIGS. 1-12 further includes an example exterior surface 136 that generally faces outwardly and/or away from the cookbox 102, and an example interior surface 138 (e.g., located opposite the exterior surface 136) that generally faces inwardly and or toward the cookbox 102. As shown in FIGS. 1-12, the interior surface 138 of the first front frame member 116 of the base 106 is located opposite and/or across from the interior surface 138 of the first rear frame member 120 of the base 106 such that the interior surface 138 of the first front frame member 116 faces directly toward the interior surface 138 of the first rear frame member 120. Similarly, the interior surface 138 of the second front frame member 118 of the base 106 is located opposite and/or across from the interior surface 138 of the second rear frame member 306 of the base 106 such that the interior surface 138 of the second front frame member 118 faces directly toward the interior surface 138 of the first rear frame member 120.

Each one of the first front frame member 116, the second front frame member 118, the first rear frame member 120, and the second rear frame member 306 of the base 106 of FIGS. 1-12 further includes a table storage assembly coupled thereto (e.g., via one or more fastener(s)) and/or formed integrally therewith. For example, as shown in FIGS. 4 and 5, the first front frame member 116 includes an example first table storage assembly 402 formed integrally with the first front frame member 116, the first rear frame member 120 includes an example second table storage assembly 404 formed integrally with the first rear frame member 120, the second front frame member 118 includes an example third table storage assembly 502 formed integrally with the second front frame member 118, and the second rear frame member 306 includes an example fourth table storage assembly 504 formed integrally with the second rear frame member 306. The first table storage assembly 402 and/or the second table storage assembly 404 is/are configured (e.g., either individually or collectively) to hold and/or retain a first removable side table of the portable grill 100 in a storage position beneath the cookbox 102 of the portable grill 100, as further described herein. Similarly, the third table storage assembly 502 and/or the fourth table storage assembly 504 is/are configured (e.g., either individually or collectively) to hold and/or retain a second removable side table of the portable grill 100 in a storage position beneath the cookbox 102 of the portable grill 100, as further described herein.

Figure 13:
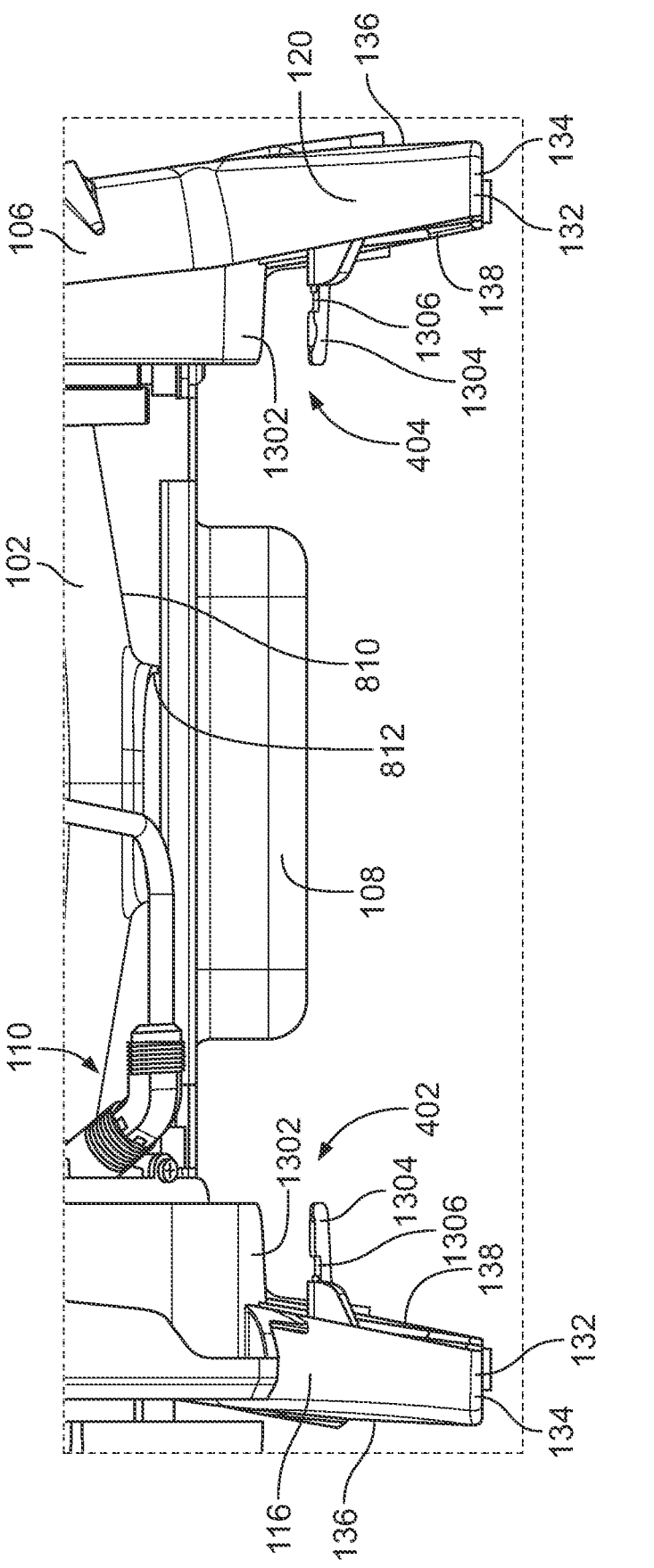
FIG. 13 is an enlarged view of a portion of FIG. 4 showing the first table storage assembly and the second table storage assembly of the base of the portable grill of FIGS. 1-12.
Figure 14:
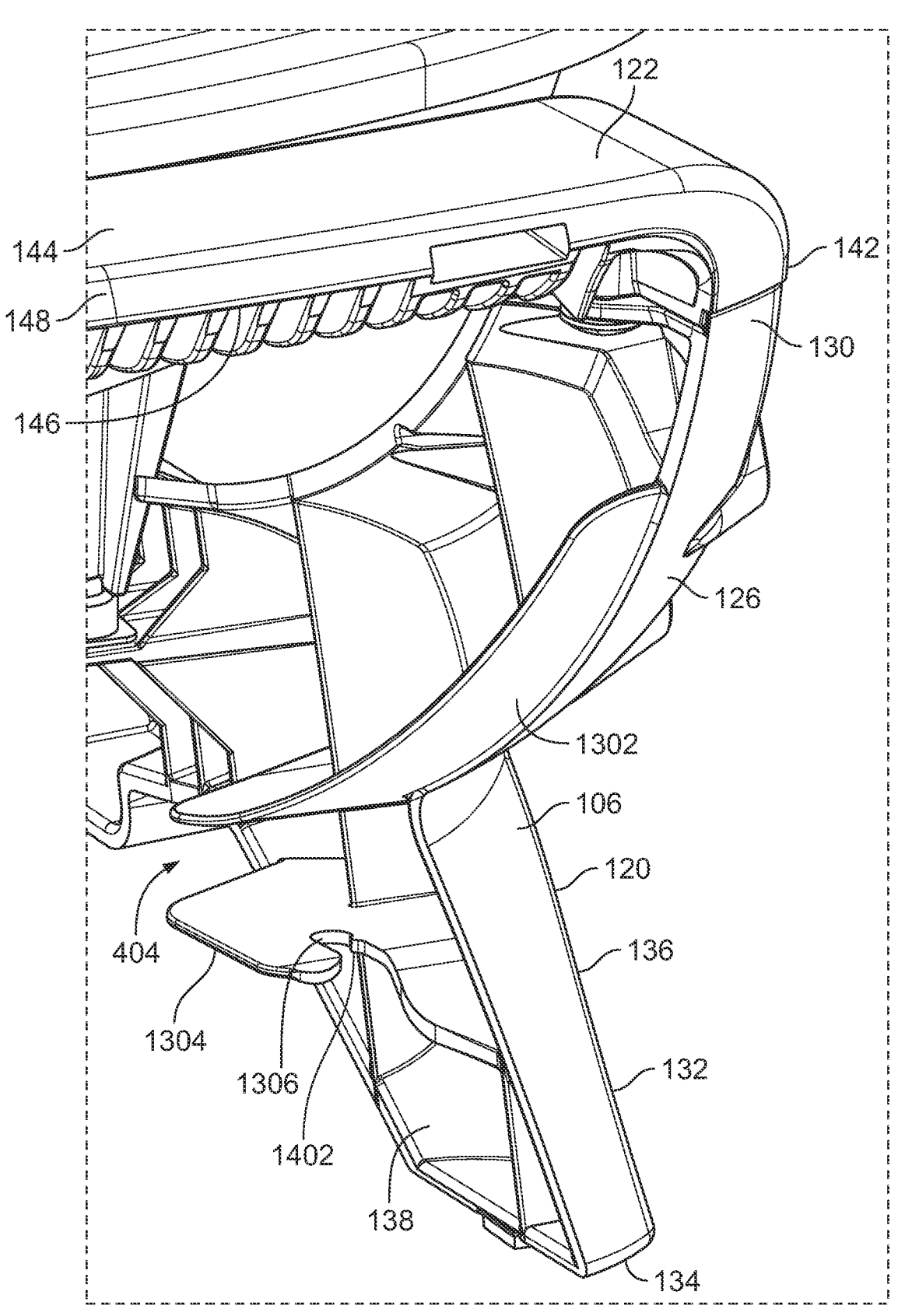
FIG. 14 is a first perspective view of the second table storage assembly of FIGS. 4 and 13.
Figure 15:
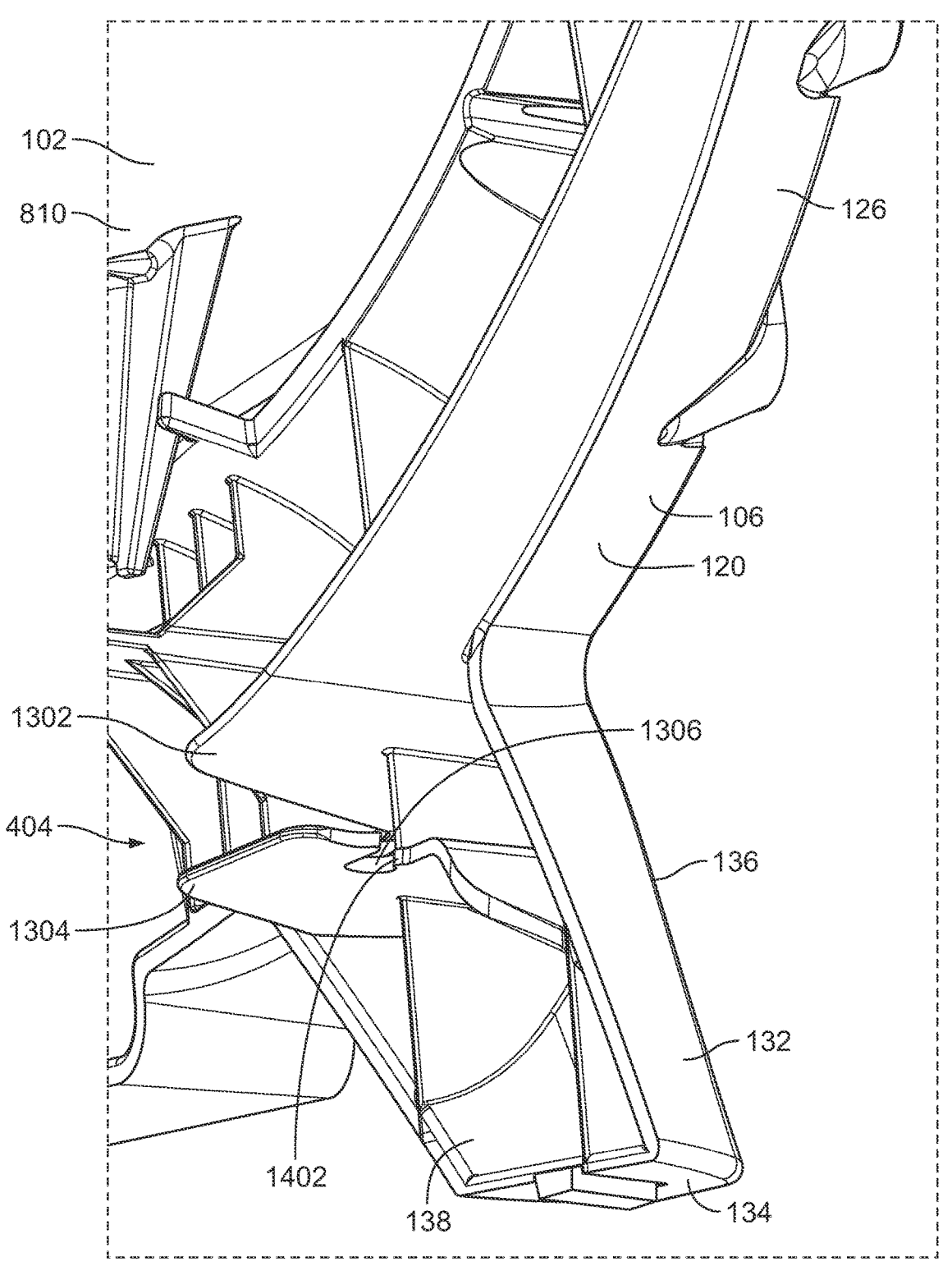
FIG. 15 is a second perspective view of the second table storage assembly of FIGS. 4, 13, and 14.

FIG. 13 is an enlarged view of a portion of FIG. 4 showing the first table storage assembly 402 and the second table storage assembly 404 of the base 106 of the portable grill 100 of FIGS. 1-12. FIG. 14 is a first perspective view of the second table storage assembly 404 of FIGS. 4 and 13. FIG. 15 is a second perspective view of the second table storage assembly 404 of FIGS. 4, 13, and 14. As shown in FIGS.

13-15, each one of the first table storage assembly 402 and the second table storage assembly 404 of the base 106 includes an example upper flange 1302 and an example lower flange 1304, with the upper flange 1302 being located above and spaced apart from the lower flange 1304. In the illustrated example of FIGS. 13-15, the upper flange 1302 and the lower flange 1304 of the first table storage assembly 402 of the base 106 respectively extend from the interior surface 138 of the first front frame member 116 of the base 106 in a direction toward the cookbox 102, and/or toward the interior surface 138 of the first rear frame member 120 of the base 106. Similarly, the upper flange 1302 and the lower flange 1304 of the second table storage assembly 404 of the base 106 respectively extend from the interior surface 138 of the first rear frame member 120 of the base 106 in a direction toward the cookbox 102, and/or toward the interior surface 138 of the first front frame member 116 of the base 106.

In the illustrated example of FIGS. 13-15, the upper flange 1302 of the first table storage assembly 402 is located along the first segment 126 of the first front frame member 116 of the base 106, and the lower flange 1304 of the first table storage assembly 402 is located along the second segment 132 of the first front frame member 116 of the base 106. In other examples, the upper flange 1302 and the lower flange 1304 of the first table storage assembly 402 can instead both be located along the first segment 126 of the first front frame member 116 of the base 106. In still other examples, the upper flange 1302 and the lower flange 1304 of the first table storage assembly 402 can instead both be located along the second segment 132 of the first front frame member 116 of the base 106.

Similarly, the upper flange 1302 of the second table storage assembly 404 is located along the first segment 126 of the first rear frame member 120 of the base 106, and the lower flange 1304 of the second table storage assembly 404 is located along the second segment 132 of the first rear frame member 120 of the base 106. In other examples, the upper flange 1302 and the lower flange 1304 of the second table storage assembly 404 can instead both be located along the first segment 126 of the first rear frame member 120 of the base 106. In still other examples, the upper flange 1302 and the lower flange 1304 of the second table storage assembly 404 can instead both be located along the second segment 132 of the first rear frame member 120 of the base 106

As further shown in FIGS. 13-15, each one of the first table storage assembly 402 and the second table storage assembly 404 of the base 106 further includes an example retainer 1306 formed in and/or defined by the lower flange 1304 of the corresponding table storage assembly (e.g., the first table storage assembly 402 or the second table storage assembly 404), with each retainer 1306 being configured to receive a corresponding post of a side table such that the side table is held and/or retained in a stored position relative to the base 106 via the corresponding table storage assembly. In some examples, each retainer 1306 includes an example protrusion 1402 (e.g., a dimple, a bump, a nib, etc.) configured to create and/or form a friction fit with the corresponding received post of the side table such that the side table can be removably coupled to and/or removably held in position by the corresponding table storage assembly (e.g., the first table storage assembly 402 or the second table storage assembly 404) of the base 106.

Figure 14A:
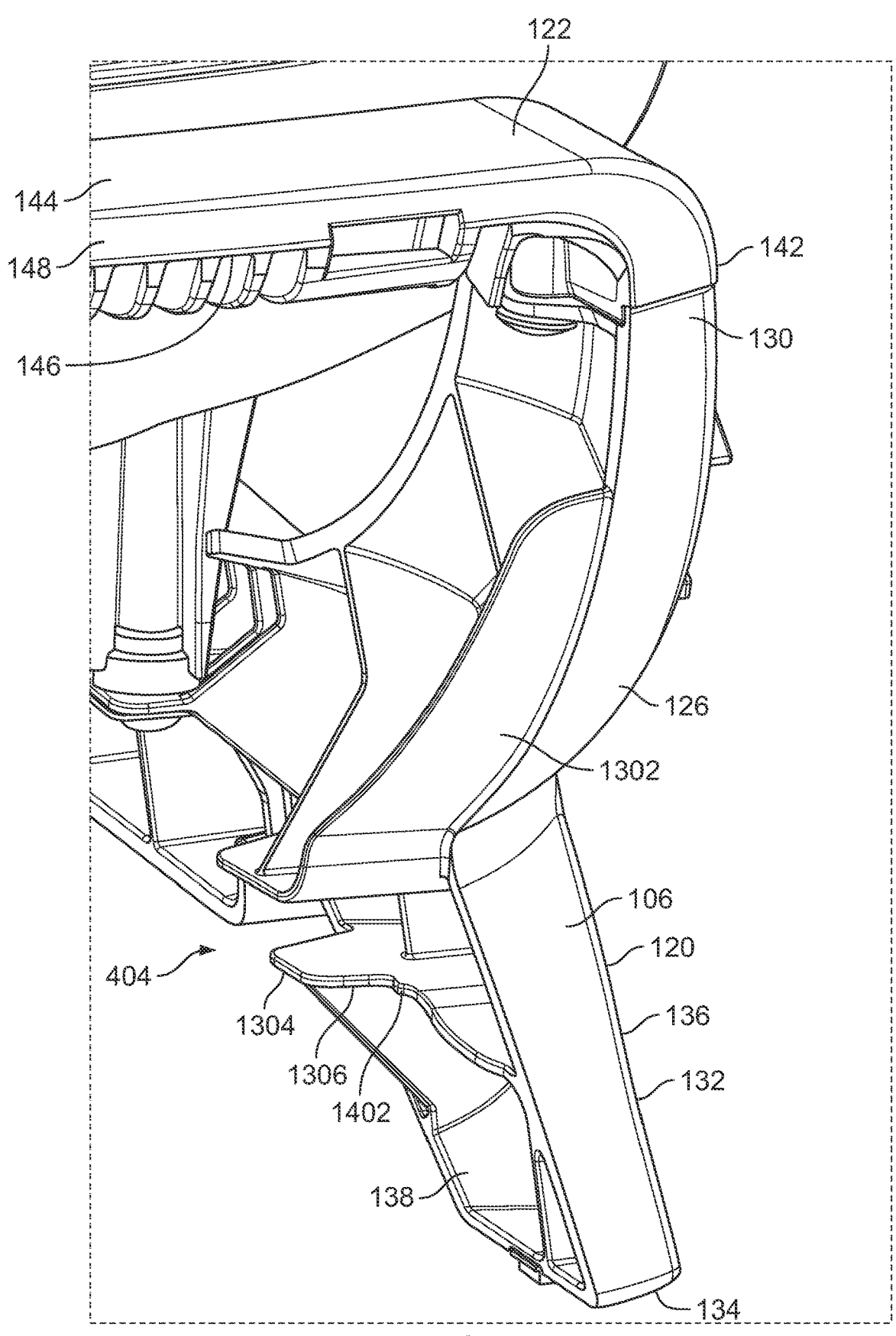
FIG. 14A is a first perspective view of an alternate configuration of the second table storage assembly of FIGS. 4, 13, and 14.
Figure 15A:
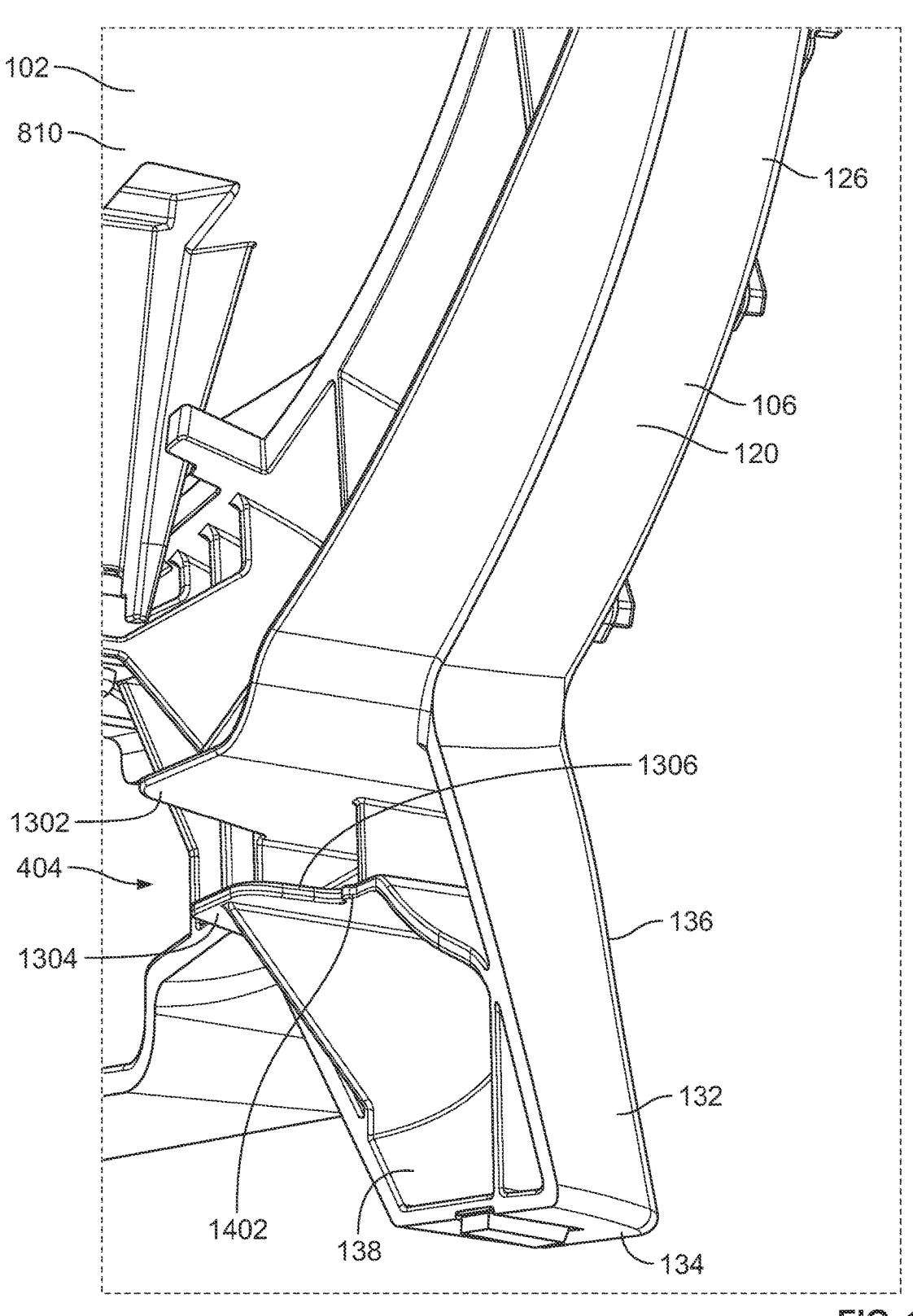
FIG. 15A is a second perspective view of the alternate configuration of the second table storage assembly of FIGS. 4 and 13-15.

In the illustrated example of FIGS. 13-15, each retainer 1306 is implemented and/or configured as a slot, with the protrusion 1402 being located along an edge of the slot. In other examples, each retainer 1306 can instead be implemented and/or configured as a recess, an indentation, a cutout, an opening, or a notch, with the protrusion 1402 being located along an edge of the recess, indentation, cutout, opening, or notch. For example, FIGS. 14A and 15A provide first and second perspective views of an alternate configuration of the second table storage assembly 404 of FIGS. 4 and 13-15. As shown in FIGS. 14A and 15A, the retainer 1306 of the lower flange 1304 of the second table storage assembly 404 of the base 106 is implemented and/or configured as a recess, with the protrusion 1402 being located along an edge of the recess. In such an example, the retainer 1306 of the lower flange 1304 of the first table storage assembly 402 of the base 106 can be implemented and/or configured as a mirror image of the retainer 1306 of the lower flange 1304 of the second table storage assembly 404 of the base 106 illustrated in FIGS. 14A and 15A.

Returning to the illustrated example of FIGS. 13-15, the upper flange 1302 and/or the lower flange 1304 of each one of the first table storage assembly 402 and the second table storage assembly 404 of the base 106 is/are configured (e.g., either individually or collectively) to guide and/or direct a side table of the portable grill 100 into a stored position. In this regard, each upper flange 1302 is configured to be contacted by an upper surface of the side table in connection with the side table being moved (e.g., from a use position, as described below) into the stored position. In response to such contact between the upper surface of the side table and the upper flange 1302 of the corresponding table storage assembly (e.g., the first table storage assembly 402 or the second table storage assembly 404), a lower surface of the side table is guided and/or directed toward the lower flange 1304 of the corresponding table storage assembly, and a corresponding post of the side table is guided and/or directed toward and/or into the retainer 1306 of the corresponding table storage assembly.

In the illustrated example of FIGS. 13-15, the upper flange 1302 of each one of the first table storage assembly 402 and the second table storage assembly 404 of the base 106 has a curved and/or contoured shape. In some examples, the curved and/or contoured shape of each upper flange 1302 complements a curved and/or contoured shape of a corresponding portion of the first segment 126 of the corresponding frame member (e.g., the first front frame member 116 or the first rear frame member 120) with which the upper flange 1302 is associated. In other examples, the curved and/or contoured shape of each upper flange 1302 may differ from a curved and/or contoured shape of a corresponding portion of the first segment 126 of the corresponding frame member (e.g., the first front frame member 116 or the first rear frame member 120) with which the upper flange 1302 is associated. In still other examples, the upper flange 1302 of each one of the first table storage assembly 402 and the second table storage assembly 404 of the base 106 can instead have a linear shape, or may be formed from a plurality of linear segments that may be positioned at one or more angles relative to one another.

While the foregoing description of FIGS. 13-15 is directed to the implementation, construction, and/or configuration of the first table storage assembly 402 and/or the second table storage assembly 404 of the base 106 of the portable grill 100, it is to be understood that the third table storage assembly 502 and/or the fourth table storage assembly 504 of the base 106 of the portable grill 100 can be similarly implemented, constructed, and/or configured. In this regard, the third table storage assembly 502 of the base 106 can be implemented, constructed, and/or configured relative to the second front frame member 118 of the base 106 as a mirror image of the implementation, construction, and/or configuration of the first table storage assembly 402 of the base 106 (e.g., as described above relative to the first front frame member 116 of the base 106). Similarly, the fourth table storage assembly 504 of the base 106 can be implemented, constructed, and/or configured relative to the second rear frame member 306 of the base 106 as a mirror image of the implementation, construction, and/or configuration of the second table storage assembly 404 of the base 106 (e.g., as described above relative to the first rear frame member 120 of the base 106). The first table storage assembly 402, the second table storage assembly 404, the third table storage assembly 502, and/or the fourth table storage assembly 504 of the base 106 is/are further described below in connection with FIGS. 30-38.

Returning to the illustrated example of FIGS. 1-12, the first side frame member 122 of the base 106 is located along the right side of the cookbox 102, and the second side frame member 124 of the base 106 is located along the left side of the cookbox 102. The first side frame member 122 of the base 106 extends between the first front frame member 116 and the first rear frame member 120 of the base 106, with the first side frame member 122 being spaced apart from the right side of the cookbox 102. The second side frame member 124 of the base 106 extends between the second front frame member 118 and the second rear frame member 306 of the base 106, with the second side frame member 124 being spaced apart from the left side of the cookbox 102. In the illustrated example of FIGS. 1-12, the first front frame member 116 is coupled to the first rear frame member 120 via the first side frame member 122, and the second front frame member 118 is coupled to the second rear frame member 306 via the second side frame member 124. In other examples, the first side frame member 122 and the second side frame member 124 can be coupled to the cookbox 102 and/or to another portion of the base 106 without the first side frame member 122 and the second side frame member 124 being directly coupled to any one of the first front frame member 116, the second front frame member 118, the first rear frame member 120, and/or the second rear frame member 306 of the base 106. In the illustrated example of FIGS. 1-12, the first side frame member 122 and the second side frame member 124 of the base 106 are respectively configured to function as handles that can be gripped and/or grasped by a user of the portable grill 100 in connection with the user picking up, holding, moving, and/or otherwise relocating the portable grill 100.

Each one of the first side frame member 122 and the second side frame member 124 of the base 106 of FIGS. 1-12 includes an example first end 140 (e.g., a front end), an example second end 142 (e.g., a rear end), an example upper surface 144, an example lower surface 146, an example outer surface 148, and an example inner surface 150. For example, as shown in FIGS. 1-12, the second end 142 of the first side frame member 122 is located opposite the first end 140 of the first side frame member 122. The upper surface 144 of the first side frame member 122 extends between the first end 140 and the second end 142 of the first side frame member 122, with the upper surface 144 being oriented to face upwards (e.g., away from the first front frame member 116 and/or the first rear frame member 120 of the base 106). The lower surface 146 of the first side frame member 122 extends between the first end 140 and the second end 142 of the first side frame member 122 and is located opposite the upper surface 144 of the first side frame member 122, with the lower surface 146 being oriented to face downwards (e.g., toward the first front frame member 116 and/or the first rear frame member 120 of the base 106). The outer surface 148 of the first side frame member 122 extends between the first end 140 and the second end 142 of the first side frame member 122, with the outer surface 148 being oriented to face outwardly (e.g., away from the right side of cookbox 102 and/or the lid 104 of the portable grill 100). The inner surface 150 of the first side frame member 122 extends between the first end 140 and the second end 142 of the first side frame member 122 and is located opposite the outer surface 148 of the first side frame member 122, with the inner surface 150 being oriented to face inwardly (e.g., toward the right side of the cookbox 102 and/or the lid 104 of the portable grill 100).

Each one of the first side frame member 122 and the second side frame member 124 of the base 106 of FIGS. 1-12 further includes a table use assembly coupled thereto (e.g., via one or more fastener(s)) and/or formed integrally therewith. For example, as shown in FIGS. 4 and 5, the first side frame member 122 includes an example first table use assembly 406 formed integrally with the first side frame member 122, and the second side frame member 124 includes an example second table use assembly 506 formed integrally with the second side frame member 124. The first table use assembly 406 is configured to hold and/or retain a first removable side table of the portable grill 100 in a use position proximate to (e.g., adjacent) the upper rim 806 of the cookbox 102, and/or proximate to (e.g., adjacent) the upper surface 144 of the first side frame member 122, as further described herein. Similarly, the second table use assembly 506 is configured to hold and/or retain a second removable side table of the portable grill 100 in a use position proximate to (e.g., adjacent) the upper rim 806 of the cookbox 102, and/or proximate to (e.g., adjacent) the upper surface 144 of the second side frame member 124.

Figure 16:
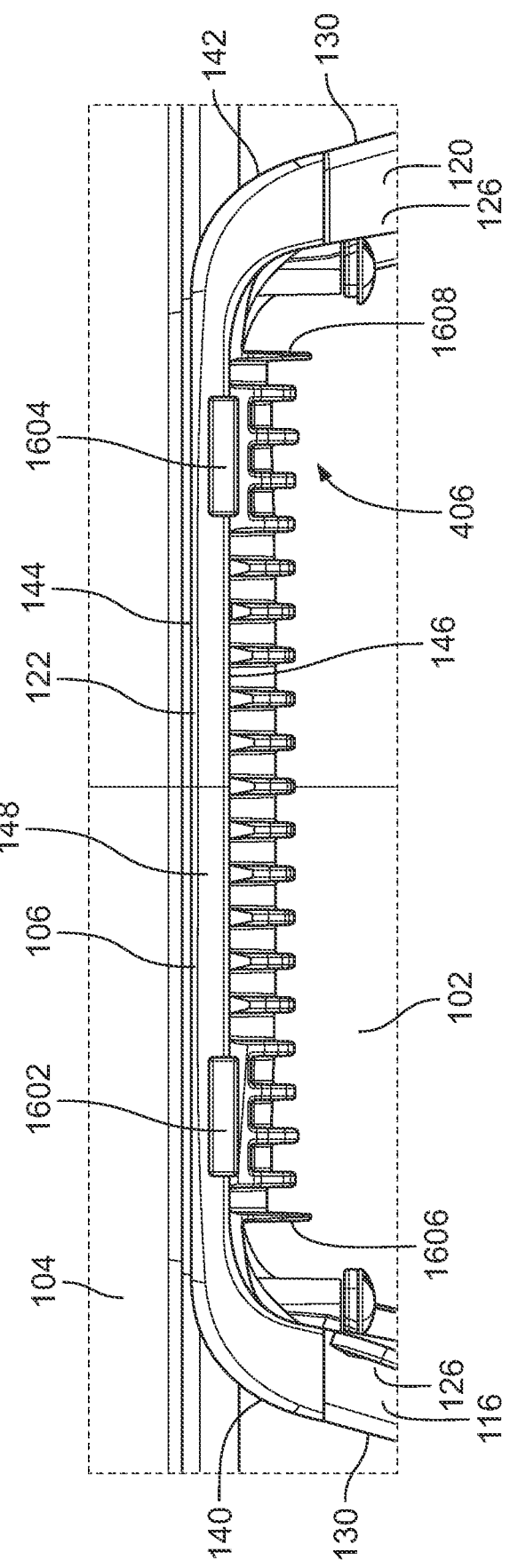
FIG. 16 is an enlarged view of a portion of FIG. 4 showing the first table use assembly of the base of the portable grill of FIGS. 1-12.

FIG. 16 is an enlarged view of a portion of FIG. 4 showing the first table use assembly 406 of the base 106 of the portable grill 100 of FIGS. 1-12. As shown in FIG. 16, the first table use assembly 406 of the base 106 includes an example first slot 1602, an example second slot 1604, an example first alignment flange 1606, and an example second alignment flange 1608. The first slot 1602 and the second slot 1604 of the first table use assembly 406 are spaced apart from one another, with the first slot 1602 and the second slot 1604 being respectively located along the outer surface 148 of the first side frame member 122 of the base 106 and extending inwardly therefrom (e.g., toward the inner surface 150 of the first side frame member 122 of the base 106). The first alignment flange 1606 and the second alignment flange 1608 of the first table use assembly 406 are spaced apart from one another, with the first alignment flange 1606 and the second alignment flange 1608 being respectively located along the lower surface 146 of the first side frame member 122 of the base 106 and extending downwardly therefrom (e.g., toward the bottom wall 810 of the cookbox 102).

In the illustrated example of FIG. 16, the first slot 1602 and the second slot 1604 of the first table use assembly 406 are respectively located between the first alignment flange 1606 and the second alignment flange 1608 of the first table use assembly 406. In other examples, the first alignment flange 1606 and the second alignment flange 1608 of the first table use assembly 406 can instead respectively be located between the first slot 1602 and the second slot 1604 of the first table use assembly 406. In the illustrated example of FIG. 16, the first table use assembly 406 includes two slots (e.g., the first slot 1602 and the second slot 1604) and two alignment flanges (e.g., the first alignment flange 1606 and the second alignment flange 1608). In other examples, the first table use assembly 406 can instead include a different number of slots (e.g., one slot, three slots, four slots, etc.) and/or a different number of alignment flanges (e.g., one alignment flange, three alignment flanges, four alignment flanges, etc.).

The first slot 1602 and the second slot 1604 of the first table use assembly 406 are respectively configured to receive a corresponding tab of a side table in connection with the side table being moved (e.g., from a stored position, as described above and further described below) into the use position. Insertion of the corresponding tabs of the side table of the portable grill 100 into the respective ones of the first slot 1602 and the second slot 1604 of the first table use assembly 406 assists with properly locating the side table of the portable grill 100 relative to the first side frame member 122 of the base 106, and/or assists with increasing the rigidity (e.g., the structural integrity) of the connection between the side table of the portable grill 100 and the first side frame member 122 of the base 106.

The first alignment flange 1606 and the second alignment flange 1608 of the first table use assembly 406 are respectively configured to be received within a gap of a corresponding hook of a side table in connection with the side table being moved (e.g., from a stored position, as described above and further described below) into the use position. Insertion of the first alignment flange 1606 and the second alignment flange 1608 of the first table use assembly 406 into the gaps of the corresponding hooks of the side table of the portable grill 100 assists with properly locating the side table of the portable grill 100 relative to the first side frame member 122 of the base 106, and/or assists with increasing the rigidity (e.g., the structural integrity) of the connection between the side table of the portable grill 100 and the first side frame member 122 of the base 106.

While the foregoing description of FIG. 16 is directed to the implementation, construction, and/or configuration of the first table use assembly 406 of the base 106 of the portable grill 100, it is to be understood that the second table use assembly 506 of the base 106 of the portable grill 100 can be similarly implemented, constructed, and/or configured. In this regard, the second table use assembly 506 of the base 106 can be implemented, constructed, and/or configured relative to the second side frame member 124 of the base 106 as a mirror image of the implementation, construction, and/or configuration of the first table use assembly 406 of the base 106 (e.g., as described above relative to the first side frame member 122 of the base 106). The first table use assembly 406 and/or the second table use assembly 506 of the base 106 is/are further described below in connection with FIGS. 24-29.

Returning to the illustrated example of FIGS. 1-12, the waste management assembly 108 of the portable grill 100 is located below the cookbox 102, and is configured to receive, collect, and/or store waste (e.g., grease, ash, and/or other residual cooking matter) that passes downwardly through the lower opening 812 of the cookbox 102 into the waste management assembly 108. As shown in FIGS. 1-12, the waste management assembly 108 is centrally located between the first front frame member 116 and the second front frame member 118 of the base 106. The waste management assembly 108 includes an example waste tray 702 that is movably (e.g., slidably) coupled to a pair of example support brackets 704 such that an example waste bin 706 of the waste tray 702 can be moved (e.g., slid) relative to the cookbox 102 between a closed position (e.g., as shown in FIGS. 1-11) in which the waste bin 706 is positioned directly below (e.g., in vertical alignment with) the lower opening 812 of the cookbox 102 and an open position (e.g., as shown in FIG. 12) in which the waste bin 706 is positioned forward of the cookbox 102. Movement of the waste tray 702 and/or the waste bin 706 between the closed position (e.g., as shown in FIGS. 1-11) and the open position (e.g., as shown in FIG. 12) can be facilitated via user interaction with an example tab 152 that is coupled to and/or formed by a front portion of the waste tray 702.

The fuel management assembly 110 of the portable grill 100 is configured to deliver fuel (e.g., combustible gas) from an external fuel source (e.g., a liquefied petroleum ("LP") gas tank, cylinder, or canister) into the cooking chamber 802 of the portable grill 100. The fuel management assembly 110 is further configured to generate heat within the cooking chamber 802 in response to combustion of the delivered fuel. In the illustrated example of FIGS. 1-12, the fuel management assembly 110 includes an example valve assembly 312, an example first control knob 154, an example second control knob 156, an example first gas conduit 314, an example second gas conduit 316, an example first gas burner 816, an example second gas burner 818, an example ignitor 820, and an example ignitor button 158.

The valve assembly 312 of the fuel management assembly 110 is configured to control, manage, and/or regulate a flow of fuel (e.g., a flow of combustible gas) between an external fuel source (e.g., an LP gas tank, cylinder, or canister) and respective ones of the first gas conduit 314 and the second gas conduit 316. In this regard, the valve assembly 312 includes an inlet, a first outlet, a second outlet, a first flow control member, and a second flow control member. The inlet of the valve assembly 312 is operatively coupled to (e.g., in fluid communication with) the external fuel source. The first outlet of the valve assembly 312 is operatively coupled to (e.g., in fluid communication with) the first gas conduit 314, which in turn is operatively coupled to (e.g., in fluid communication with) the first gas burner 816. The second outlet of the valve assembly 312 is operatively coupled to (e.g., in fluid communication with) the second gas conduit 316, which in turn is operatively coupled to (e.g., in fluid communication with) the second gas burner 818.

The first flow control member of the valve assembly 312 is operatively positioned between the inlet and the first outlet of the valve assembly 312. The second flow control member of the valve assembly 312 is operatively positioned between the inlet and the second outlet of the valve assembly 312 or, alternatively, between the first flow control member and the second outlet of the valve assembly 312. The first control knob 154 of the fuel management assembly 110 is operatively coupled (e.g., mechanically coupled) to the first flow control member of the valve assembly 312 such that the first control knob 154 can be manually actuated (e.g., rotated) by a user of the portable grill 100 to control the flow of fuel from the external fuel source into the first gas conduit 314 and/or the first gas burner 816 of the fuel management assembly 110. The second control knob 156 of the fuel management assembly 110 is operatively coupled (e.g., mechanically coupled) to the second flow control member of the valve assembly 312 such that the second control knob 156 can be manually actuated (e.g., rotated) by a user of the portable grill 100 to control the flow of fuel from the external fuel source into the second gas conduit 316 and/or the second gas burner 818 of the fuel management assembly 110.

The first gas conduit 314 of the fuel management assembly 110 is configured to convey and/or transport fuel (e.g., combustible gas) from the first outlet of the valve assembly 312 to the first gas burner 816 of the fuel management assembly. The first gas conduit 314 can be implemented by any number(s) and/or any type(s) of tube(s), pipe(s), duct(s), and/or fitting(s) configured to place the first outlet of the valve assembly 312 in fluid communication with the first gas burner 816 of the fuel management assembly 110. The second gas conduit 316 of the fuel management assembly 110 is configured to convey and/or transport fuel (e.g., combustible gas) from the second outlet of the valve assembly 312 to the second gas burner 818 of the fuel management assembly 110. The second gas conduit 316 can be implemented by any number(s) and/or any type(s) of tube(s), pipe(s), duct(s), and/or fitting(s) configured to place the second outlet of the valve assembly 312 in fluid communication with the second gas burner 818 of the fuel management assembly 110.

The first gas burner 816 of the fuel management assembly 110 is implemented as a burner tube (e.g., a P-shaped burner tube) located at least partially within the cookbox 102 and/or at least partially within the cooking chamber 802. In some examples, the first gas burner 816 is configured to function as the main and/or primary heating element for grilling and/or otherwise cooking one or more item(s) of food at a moderate temperature. As shown in FIGS. 8, 10, and 11, the portion of the first gas burner 816 located within the cookbox 102 and/or within the cooking chamber 802 is positioned between the bottom wall 810 of the cookbox 102 and the cooking grate(s) 804 of the portable grill 100. In some examples, the portion of the first gas burner 816 that is located within the cookbox 102 and/or within the cooking chamber 802 is supported by one or more portion(s) (e.g., a wall surface, an edge, a lip, a flange, a bracket, etc.) of the cookbox 102.

The second gas burner 818 of the fuel management assembly 110 is implemented as a burner tube (e.g., a linear burner tube) located at least partially within the cookbox 102 and/or at least partially within the cooking chamber 802. In some examples, the second gas burner 818 is configured to function as a supplemental and/or secondary heating element for searing one or more item(s) of food at a high temperature. As shown in FIGS. 8, 10, and 11, the portion of the second gas burner 818 located within the cookbox 102 and/or within the cooking chamber 802 is positioned between the bottom wall 810 of the cookbox 102 and the cooking grate(s) 804 of the portable grill 100. In some examples, the portion of the second gas burner 818 that is located within the cookbox 102 and/or within the cooking chamber 802 is supported by one or more portion(s) (e.g., a wall surface, an edge, a lip, a flange, a bracket, etc.) of the cookbox 102, and/or by one or more portion(s) of the first gas burner 816.

The ignitor 820 of the fuel management assembly 110 is located at least partially within the cookbox 102 and/or within the cooking chamber 802 at a position between the bottom wall 810 of the cookbox 102 and the cooking grate(s) 804 of the portable grill 100. In this regard, the portion of the ignitor 820 that is located within the cookbox 102 and/or within the cooking chamber 802 is operatively coupled to the first gas burner 816 and/or the second gas burner 818 such that an electrical spark produced by the ignitor 820 can ignite gaseous fuel located within and/or passing through the first gas burner 816 and/or the second gas burner 818. In some examples, the portion of the ignitor 820 that is located within the cookbox 102 and/or within the cooking chamber 802 is supported by one or more portion(s) (e.g., a wall surface, an edge, a lip, a flange, a bracket, etc.) of the cookbox 102, one or more portion(s) of the first gas burner 816, and/or one or more portion(s) of the second gas burner 818. The ignitor button 158 of the fuel management assembly 110 is operatively coupled to (e.g., in electrical communication with) the ignitor 820 of the fuel management assembly 110. The ignitor button 158 is configured to cause the ignitor 820 to produce an electrical spark (e.g., to cause the ignitor 820 to fire and/or activate) in response to the ignitor button 158 being manually actuated (e.g., pressed) by a user of the portable grill 100.

Figure 17:
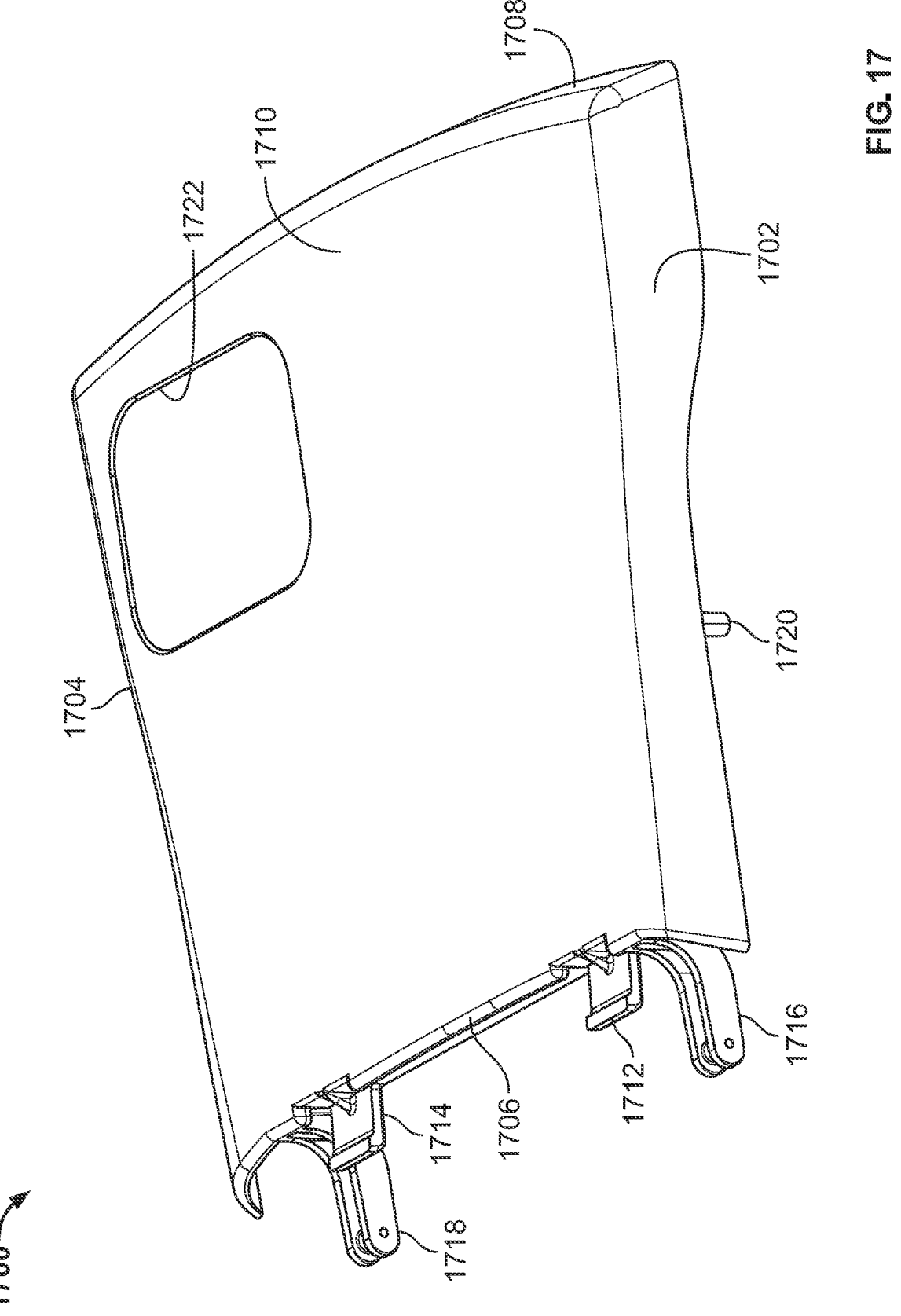
FIG. 17 is a perspective view of an example side table for the portable grill of FIGS. 1-16.
Figures 18, 19:
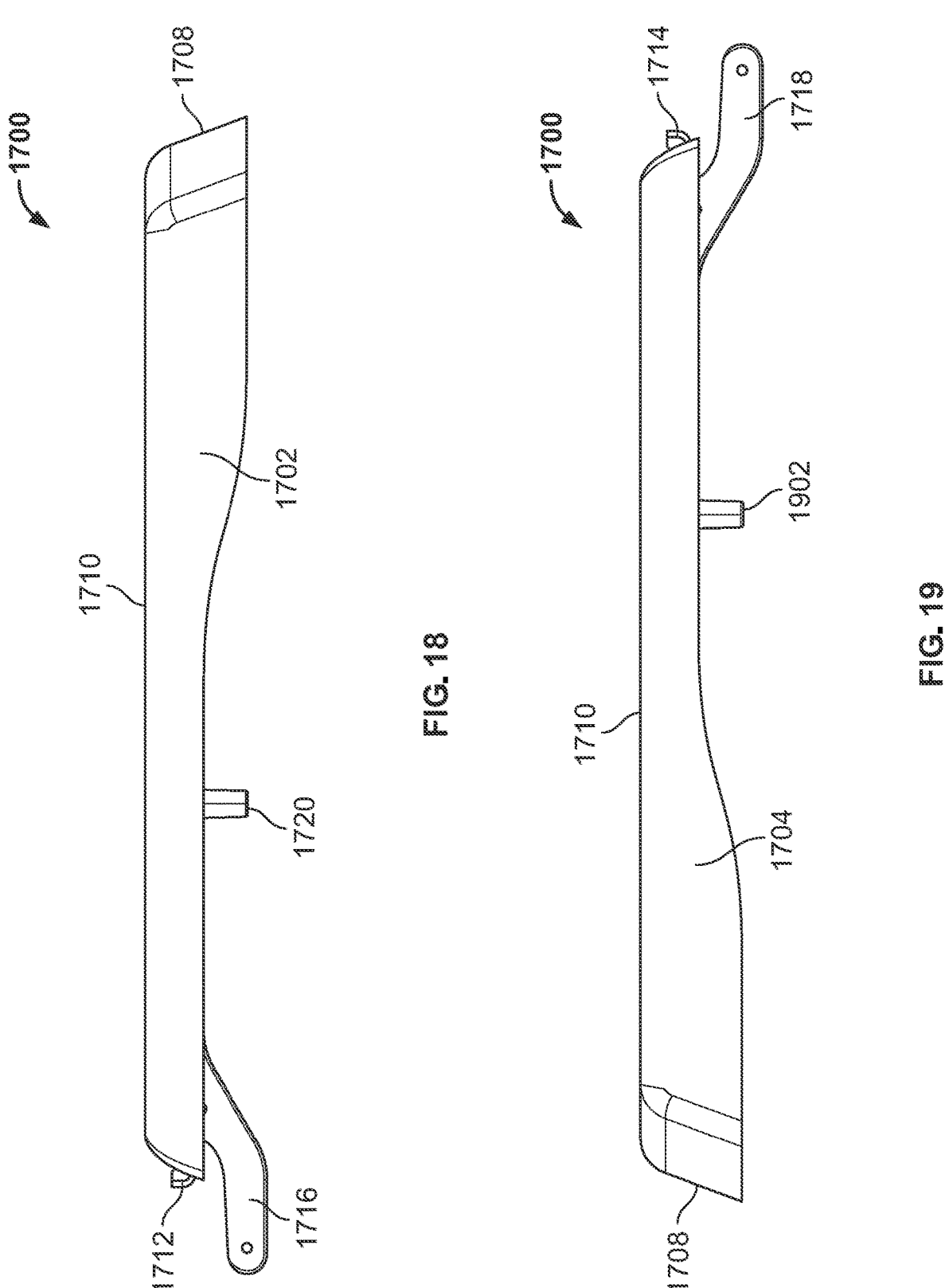
FIG. 18 is a front view of the side table of FIG. 17.
FIG. 19 is a rear view of the side table of FIGS. 17 and 18.
Figures 20, 21:
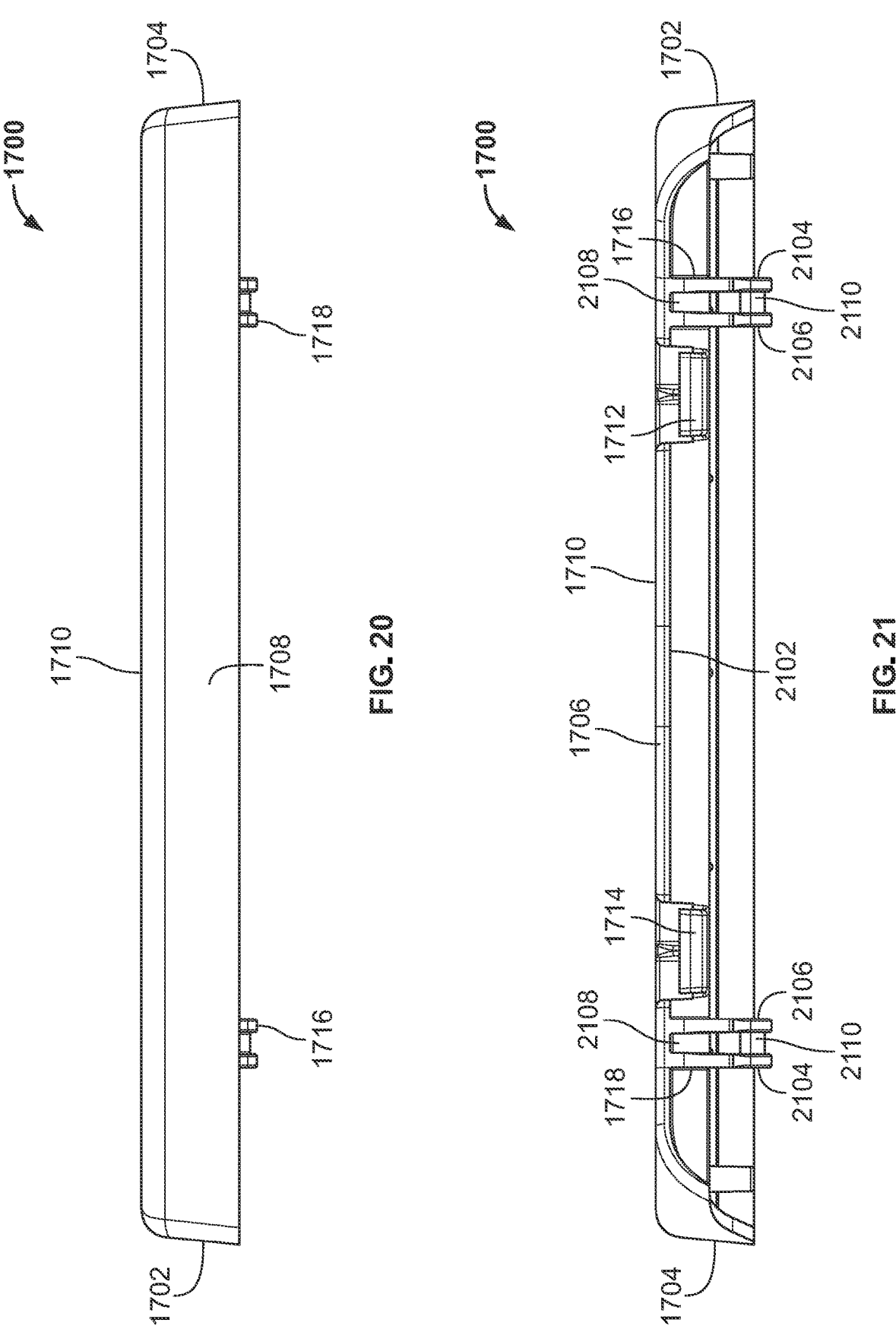
FIG. 20 is a right side view of the side table of FIGS. 17-19.
FIG. 21 is a left side view of the side table of FIGS. 17-20.
Figure 22:
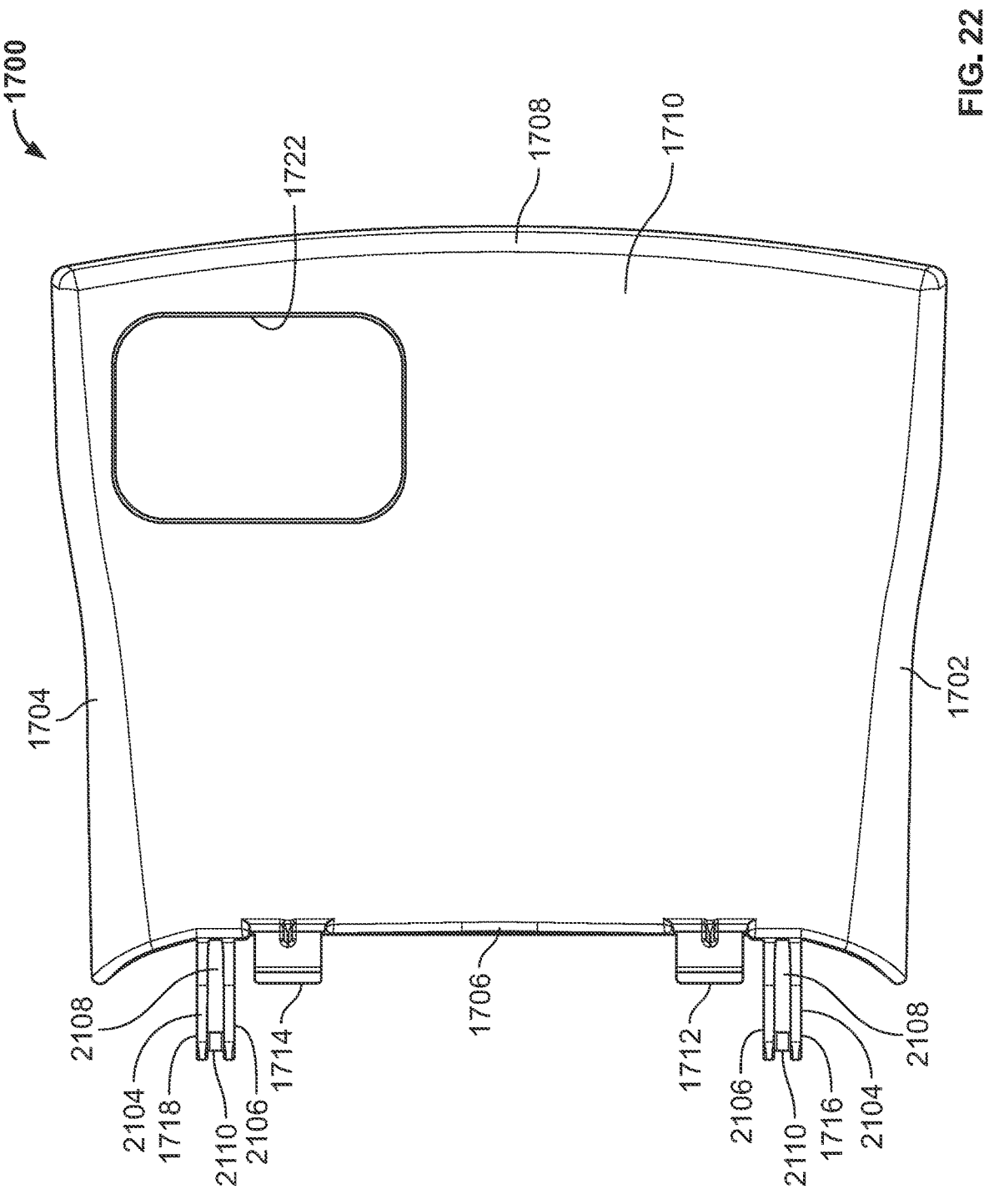
FIG. 22 is a top view of the side table of FIGS. 17-21.
Figure 23:
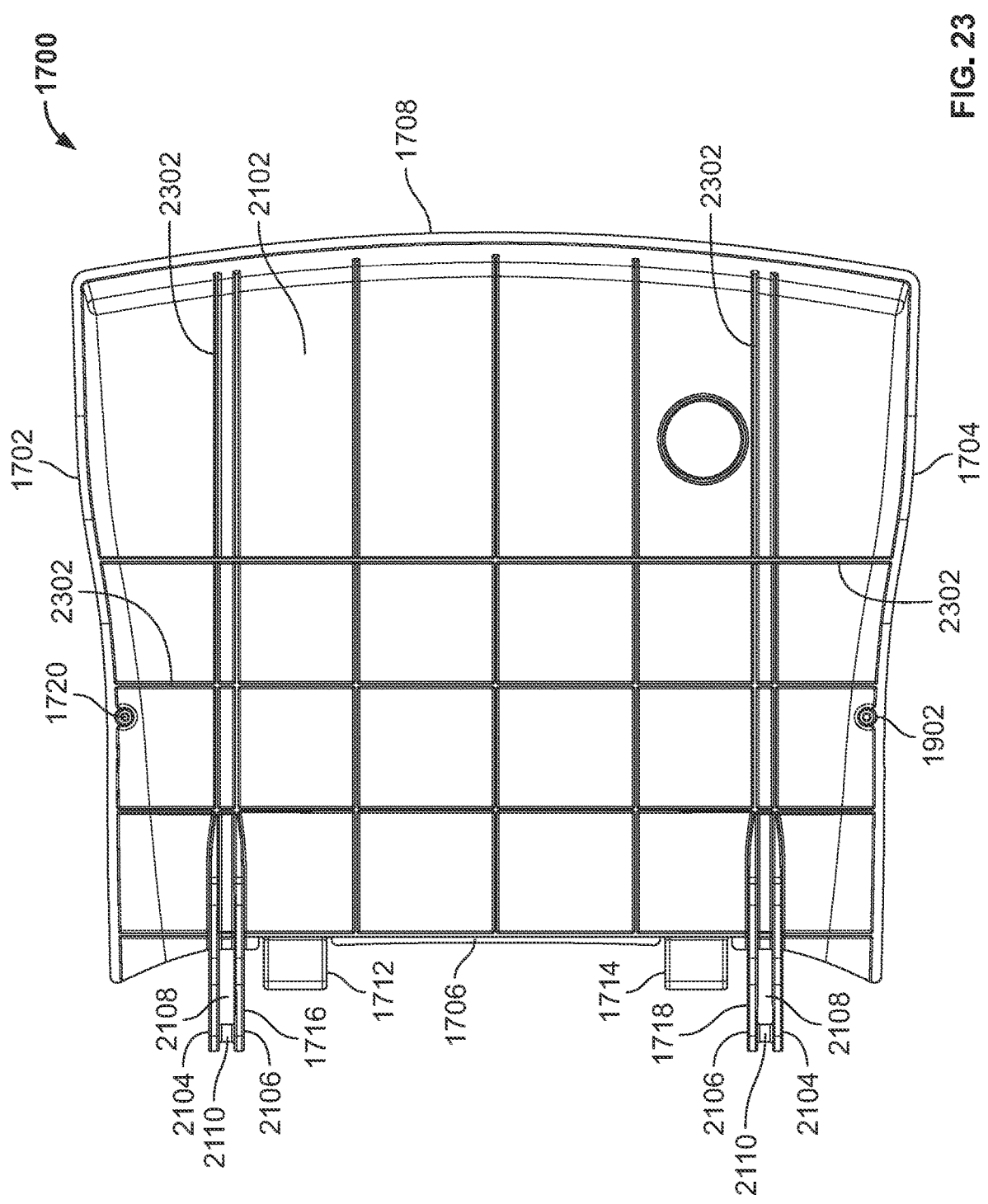
FIG. 23 is a bottom view of the side table of FIGS. 17-22.

FIG. 17 is a perspective view of an example side table 1700 for the portable grill 100 of FIGS. 1-16. FIG. 18 is a front view of the side table 1700 of FIG. 17. FIG. 19 is a rear view of the side table 1700 of FIGS. 17 and 18. FIG. 20 is a right side view of the side table 1700 of FIGS. 17-19. FIG. 21 is a left side view of the side table 1700 of FIGS. 17-20. FIG. 22 is a top view of the side table 1700 of FIGS. 17-21. FIG. 23 is a bottom view of the side table 1700 of FIGS. 17-22. The side table 1700 of FIGS. 17-23 is configured to be removably coupled to the portable grill 100 of FIGS. 1-16 in either a use position (e.g., a position laterally offset from the cookbox 102 of the portable grill 100 to facilitate one or more cooking vessels, cooking accessories, and/or items of food being placed onto and/or supported by an upper surface of the side table 1700) or a storage position (e.g., a position in which the side table 1700 is coupled to and/or otherwise held by the base 106 of the portable grill 100 at a position below the cookbox 102 of the portable grill 100, as may be desirable when transporting and/or storing the portable grill 100). As shown in FIGS. 17-23, the side table 1700 is configured as a first side table (e.g., a right side table) to be removably coupled to the first table use assembly 406 of the base 106 when the side table 1700 is in the use position, and to be removably coupled to the first table storage assembly 402 and/or the second table storage assembly 404 of the base 106 when the side table 1700 is in the storage position.

In the illustrated example of FIGS. 17-23, the side table 1700 includes an example front surface 1702, an example rear surface 1704, an example inner surface 1706, an example outer surface 1708, and example upper surface 1710, an example lower surface 2102, an example first tab 1712, an example second tab 1714, an example first hook 1716, an example second hook 1718, an example first post 1720, and an example second post 1902. The rear surface 1704 of the side table 1700 of FIGS. 17-23 is located opposite the front surface 1702 of the side table 1700. The inner surface 1706 of the side table 1700 of FIGS. 17-23 extends between the front surface 1702 and the rear surface 1704 of the side table 1700, with the inner surface 1706 of the side table 1700 being oriented to face towards the outer surface 148 of the first side frame member 122 of the base 106 when the side table 1700 is positioned in the use position. The outer surface 1708 of the side table 1700 of FIGS. 17-23 extends between the front surface 1702 and the rear surface 1704 of the side table 1700, with the outer surface 1708 of the side table 1700 being located opposite the inner surface 1706 of the side table 1700 such that the outer surface 1708 of the side table 1700 faces away from the outer surface 148 of the first side frame member 122 of the base 106 when the side table 1700 is positioned in the use position.

The upper surface 1710 of the side table 1700 of FIGS. 17-23 extends between the front surface 1702, the rear surface 1704, the inner surface 1706, and the outer surface 1708 of the side table 1700. The upper surface 1710 of the side table 1700 is configured to support one or more cooking vessels, cooking accessories, and/or items of food when the side table 1700 is positioned in the use position. In the illustrated example of FIGS. 17-23, the upper surface 1710 of the side table 1700 includes an example recess 1722 configured to accommodate a cooking accessory having a base with a generally rectangular profile, such as a temperature probe hub. In some examples, the temperature probe hub may communicate (e.g., via wired or wireless electrical communication) with an ambient temperature probe that is coupled to and/or held by the probe mount 814 which is located along the interior of the lid 104 of the portable grill 100. In other examples, the upper surface 1710 of the side table 1700 can instead be configured as a flat, planar surface that is free of any recesses and/or projections.

The lower surface 2102 of the side table 1700 of FIGS. 17-23 extends between the front surface 1702, the rear surface 1704, the inner surface 1706, and the outer surface 1708 of the side table 1700, with the lower surface 2102 of the side table 1700 being located opposite the upper surface 1710 of the side table 1700. In the illustrated example of FIGS. 17-23, the lower surface 2102 of the side table 1700 includes a plurality of example ribs 2302 configured to increase the rigidity (e.g., the structural integrity) of the side table 1700. In other examples, the lower surface 2102 of the side table 1700 can instead be configured as a flat, planar surface that is free of any structural support ribs. The first hook 1716, the second hook 1718, the first post 1720, and the second post 1902 of the side table 1700 respectively extend downwardly from the lower surface 2102 of the side table 1700, as further described below.

The first tab 1712 and the second tab 1714 of the side table 1700 of FIGS. 17-23 are spaced apart from one another, with the first tab 1712 and the second tab 1714 being respectively located along the inner surface 1706 of the side table 1700 and extending outwardly therefrom (e.g., toward the outer surface 148 of the first side frame member 122 of the base 106). The first hook 1716 and the second hook 1718 of the side table 1700 are spaced apart from one another, with the first hook 1716 and the second hook 1718 respectively projecting downwardly from the lower surface 2102, and with a portion of each of the first hook 1716 and the second hook 1718 extending past the inner surface 1706 of the side table 1700. In the illustrated example of FIGS. 17-23, the first tab 1712 and the second tab 1714 of the side table 1700 are respectively located between the first hook 1716 and the second hook 1718 of the side table 1700. In other examples, the first hook 1716 and the second hook 1718 of the side table 1700 can instead respectively be located between the first tab 1712 and the second tab 1714 of the side table 1700. In the illustrated example of FIGS. 17-23, the side table 1700 includes two tabs (e.g., the first tab 1712 and the second tab 1714) and two hooks (e.g., the first hook 1716 and the second hook 1718). In other examples, the side table 1700 can instead include a different number of tabs (e.g., one tab, three tabs, four tabs, etc.) and/or a different number of hooks (e.g., one hook, three hooks, four hooks, etc.).

The first tab 1712 and the second tab 1714 of the side table 1700 of FIGS. 17-23 are respectively configured to be inserted into and/or received by corresponding ones of the first slot 1602 and the second slot 1604 of the first table use assembly 406 of the base 106 of the portable grill 100 in connection with the side table 1700 being moved (e.g., from a stored position) into the use position. Insertion of the first tab 1712 and the second tab 1714 of the side table 1700 into the corresponding ones of the first slot 1602 and the second slot 1604 of the first table use assembly 406 assists with properly locating the side table 1700 of the portable grill 100 relative to the first side frame member 122 of the base 106, and/or assists with increasing the rigidity (e.g., the structural integrity) of the connection between the side table 1700 of the portable grill 100 and the first side frame member 122 of the base 106.

The first hook 1716 and the second hook 1718 of the side table 1700 of FIGS. 17-23 are respectively configured to receive, contact, and/or engage corresponding ones of the first alignment flange 1606 and the second alignment flange 1608 of the first table use assembly 406 of the base 106 of the portable grill 100 in connection with the side table 1700 being moved (e.g., from a stored position) into the use position. Engagement of the first hook 1716 and the second hook 1718 of the side table 1700 with the corresponding ones of the first alignment flange 1606 and the second alignment flange 1608 of the first table use assembly 406 of the base assists with properly locating the side table 1700 of the portable grill 100 relative to the first side frame member 122 of the base 106, and/or assists with increasing the rigidity (e.g., the structural integrity) of the connection between the side table 1700 of the portable grill 100 and the first side frame member 122 of the base 106.

In the illustrated example of FIGS. 17-23, each one of the first hook 1716 and the second hook 1718 includes an example first hook member 2104, an example second hook member 2106, an example gap 2108 located between the first hook member 2104 and the second hook member 2106, and an example brace 2110 bridging the gap 2108 and extending between the first hook member 2104 and the second hook member 2106. Each hook is configured such that a corresponding one of the alignment flanges (e.g., the first alignment flange 1606 or the second alignment flange 1608) of the first table use assembly 406 of the base 106 is received within the gap 2108 (e.g., between the first hook member 2104 and the second hook member 2106) of the hook, and such that the corresponding one of the alignment flanges contacts and/or engages the brace 2110 of the hook, in connection with the side table 1700 being moved (e.g., from a stored position) into the use position. Insertion of the corresponding one of the alignment flanges of the first table use assembly 406 into the gap 2108 of the hook assists with properly locating the side table 1700 of the portable grill 100 relative to the first side frame member 122 of the base 106, and/or assists with increasing the rigidity (e.g., the structural integrity) of the connection between the side table 1700 of the portable grill 100 and the first side frame member 122 of the base 106. Engagement of the corresponding one of the alignment flanges of the first table use assembly 406 with the brace 2110 of the hook further assists with properly locating the side table 1700 of the portable grill 100 relative to the first side frame member 122 of the base 106, and/or further assists with increasing the rigidity (e.g., the structural integrity) of the connection between the side table 1700 of the portable grill 100 and the first side frame member 122 of the base 106.

The first post 1720 and the second post 1902 of the side table 1700 of FIGS. 17-23 are spaced apart from one another, with the first post 1720 and the second post 1902 being respectively located along the lower surface 2102 of the side table 1700 and extending downwardly therefrom. In the illustrated example of FIGS. 17-23, the first post 1720 is located proximate to (e.g., adjacent) the front surface 1702 of the side table 1700, and the second post 1902 is located proximate to (e.g., adjacent) the rear surface 1704 of the side table 1700. As shown in FIGS. 17-23, the first post 1720 and the second post 1902 are respectively located approximately midway between the inner surface 1706 and the outer surface 1708 of the side table 1700. In other examples, the first post 1720 and/or the second post 1902 can instead be located more proximate to (e.g., adjacent) the inner surface 1706 of the side table 1700. In still other examples, the first post 1720 and/or the second post 1902 can instead be located more proximate to (e.g., adjacent) the outer surface 1708 of the side table 1700. In the illustrated example of FIGS. 17-23, the side table 1700 includes two posts (e.g., the first post 1720 and the second post 1902). In other examples, the side table 1700 can instead include a different number of posts (e.g., one post, three posts, four posts, etc.).

The first post 1720 and the second post 1902 of the side table 1700 of FIGS. 17-23 are respectively configured to be inserted into and/or received by corresponding ones of the retainer 1306 of the first table storage assembly 402 and the retainer 1306 of the second table storage assembly 404 of the base 106 of the portable grill 100 in connection with the side table 1700 being moved (e.g., from a use position) into the stored position. As discussed above, each retainer 1306 includes a protrusion 1402 (e.g., a dimple, a bump, a nib, etc.) configured to create and/or form a friction fit with the corresponding received post (e.g., the first post 1720 or the second post 1902) of the side table 1700 such that the side table 1700 can be removably coupled to and/or removably held in position by the corresponding table storage assembly (e.g., the first table storage assembly 402 or the second table storage assembly 404) of the base 106.

While the foregoing description of FIGS. 17-23 is directed to the implementation, construction, and/or configuration of the side table 1700 as a first side table (e.g., a right side table) of the portable grill 100, it is to be understood that a second side table (e.g., a left side table) of the portable grill 100 can be similarly implemented, constructed, and/or configured. In this regard, the second side table (e.g., the left side table) of the portable grill 100 can be implemented, constructed, and/or configured as a mirror image of the implementation, construction, and/or configuration of the first side table (e.g., the right side table) of the portable grill 100, with the second side table being configured to be removably coupled to the second table use assembly 506 of the base 106 when the second side table is in the use position, and to be removably coupled to the third table storage assembly 502 and/or the fourth table storage assembly 504 of the base 106 when the second side table is in the storage position.

Figure 24:
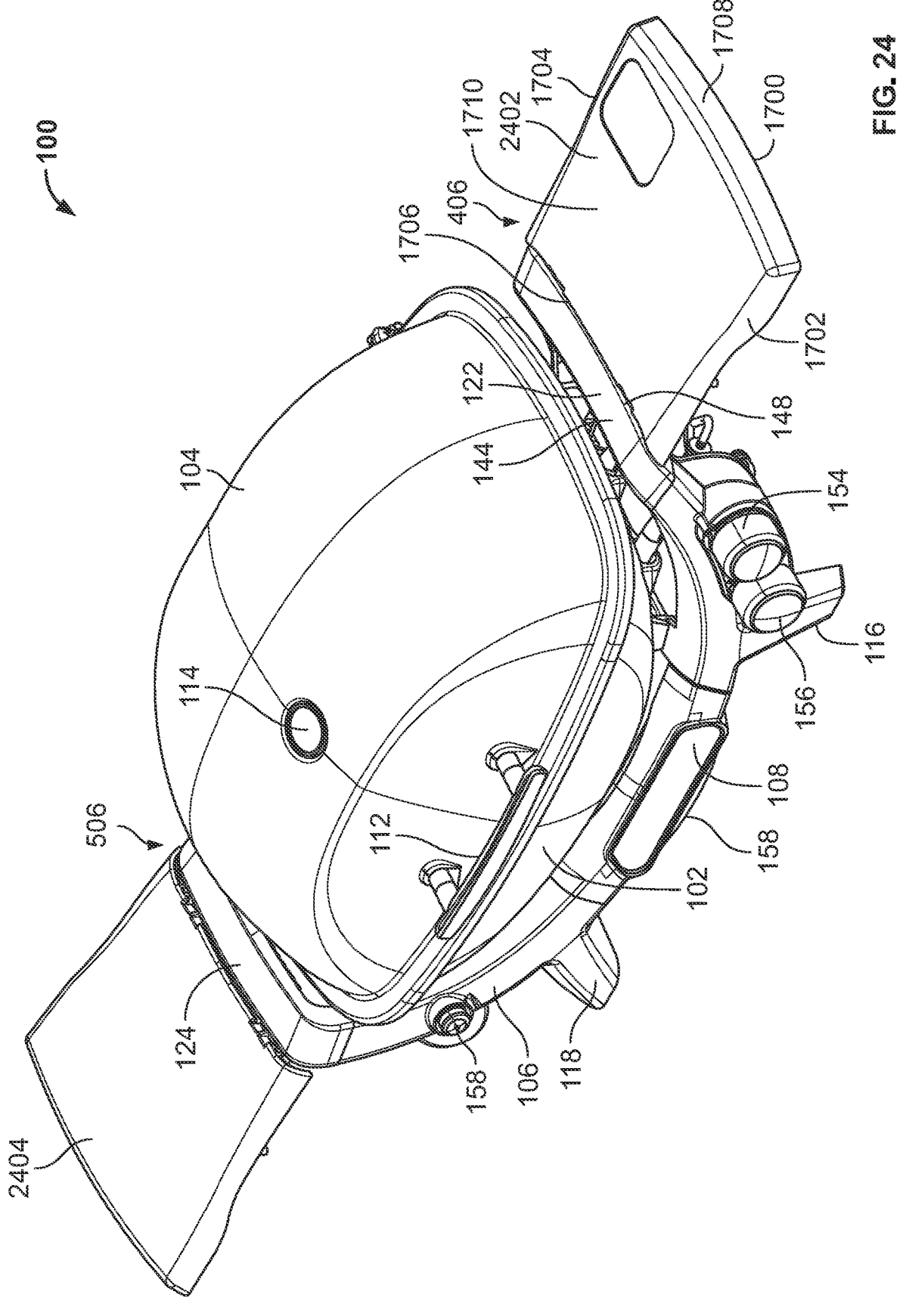
FIG. 24 is a perspective view of the portable grill of FIGS. 1-16, with the side table of FIGS. 17-23 shown coupled to the first table use assembly of the base of the portable grill in a use position.
Figure 25:
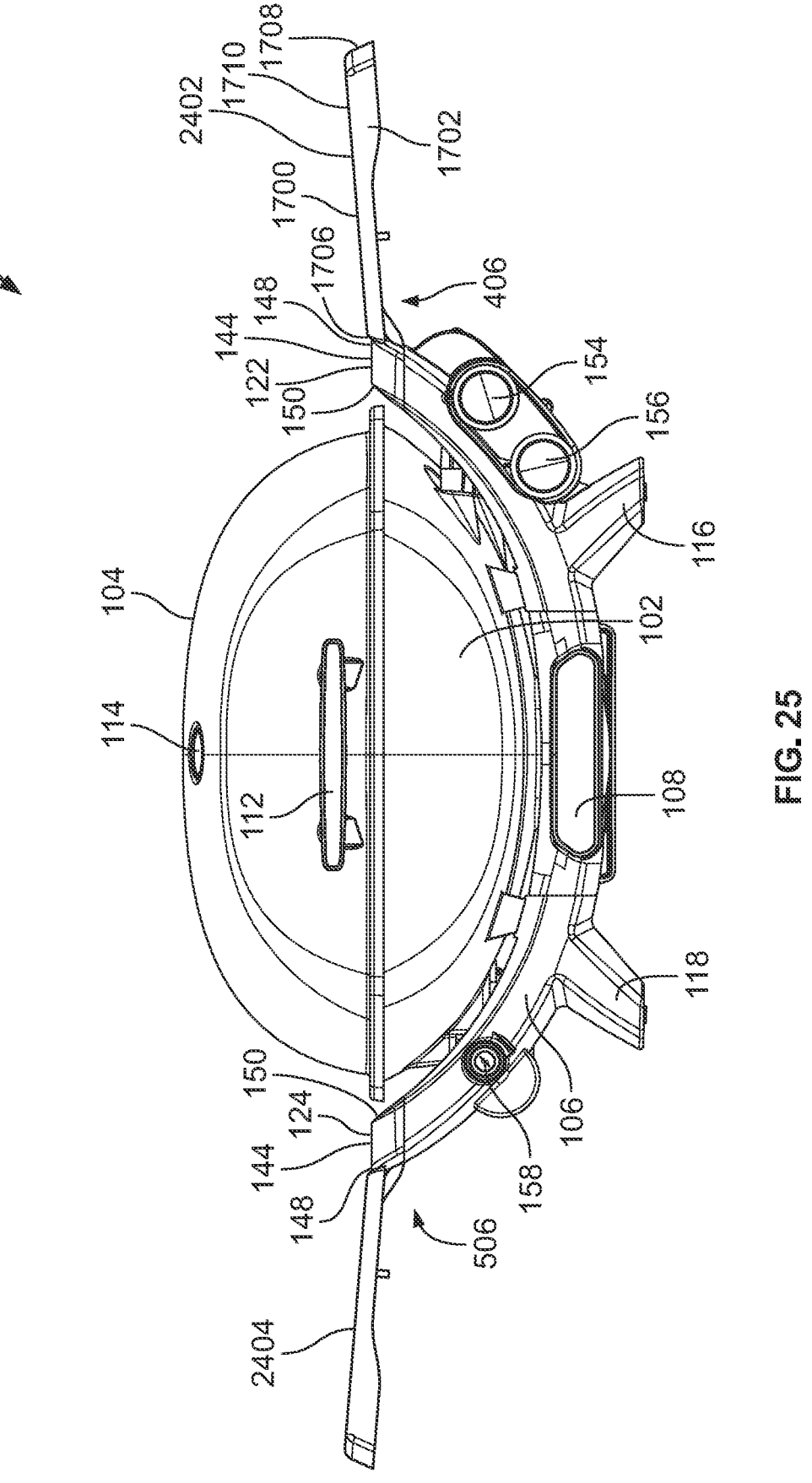
FIG. 25 is a front view of the portable grill as shown in FIG. 24.
Figures 26, 27:
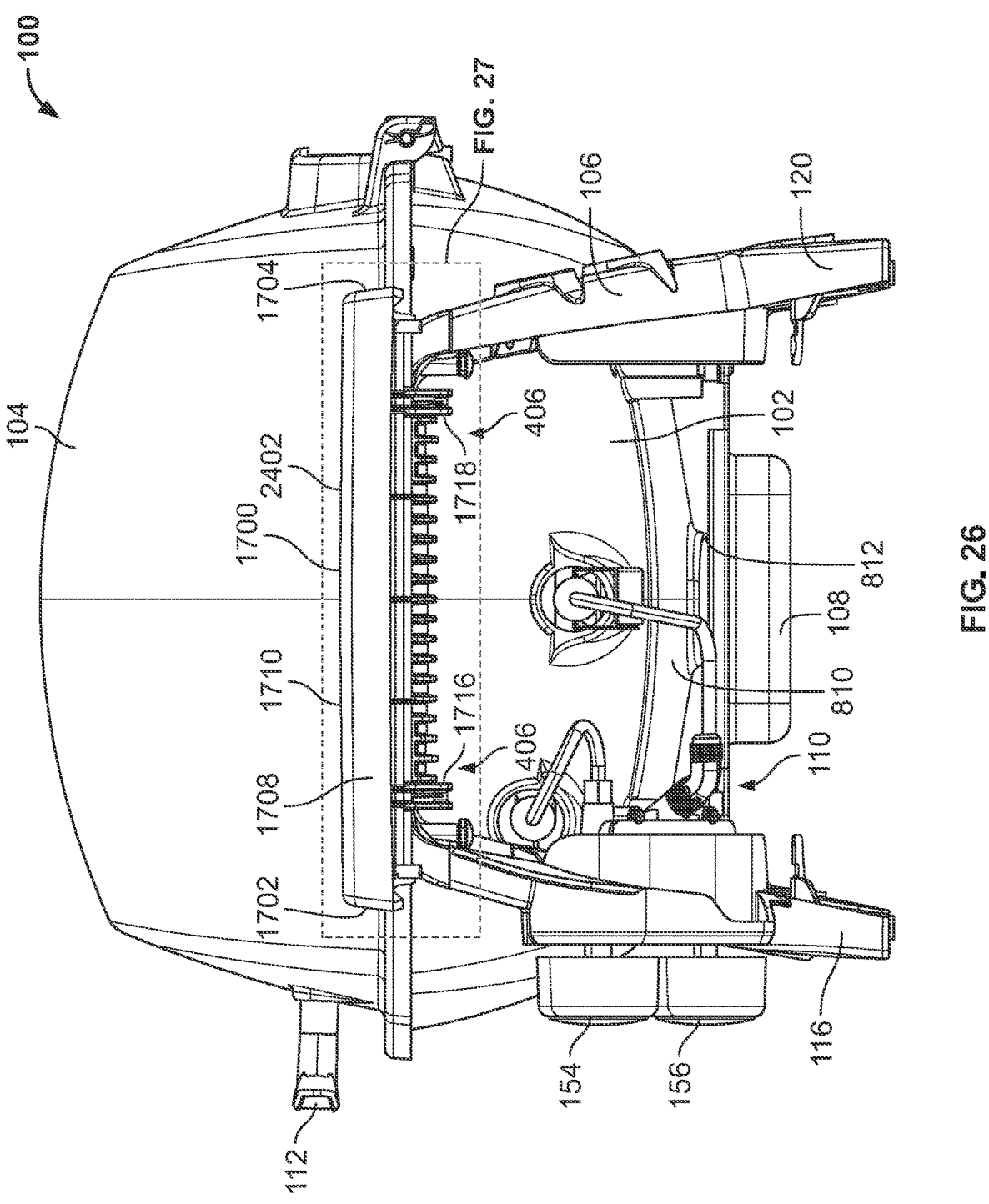
FIG. 26 is a right side view of the portable grill as shown in FIGS. 24 and 25.
FIG. 27 is an enlarged view of a portion of FIG. 26 showing the side table coupled to the first table use assembly of the base of the portable grill.
Figure 27:
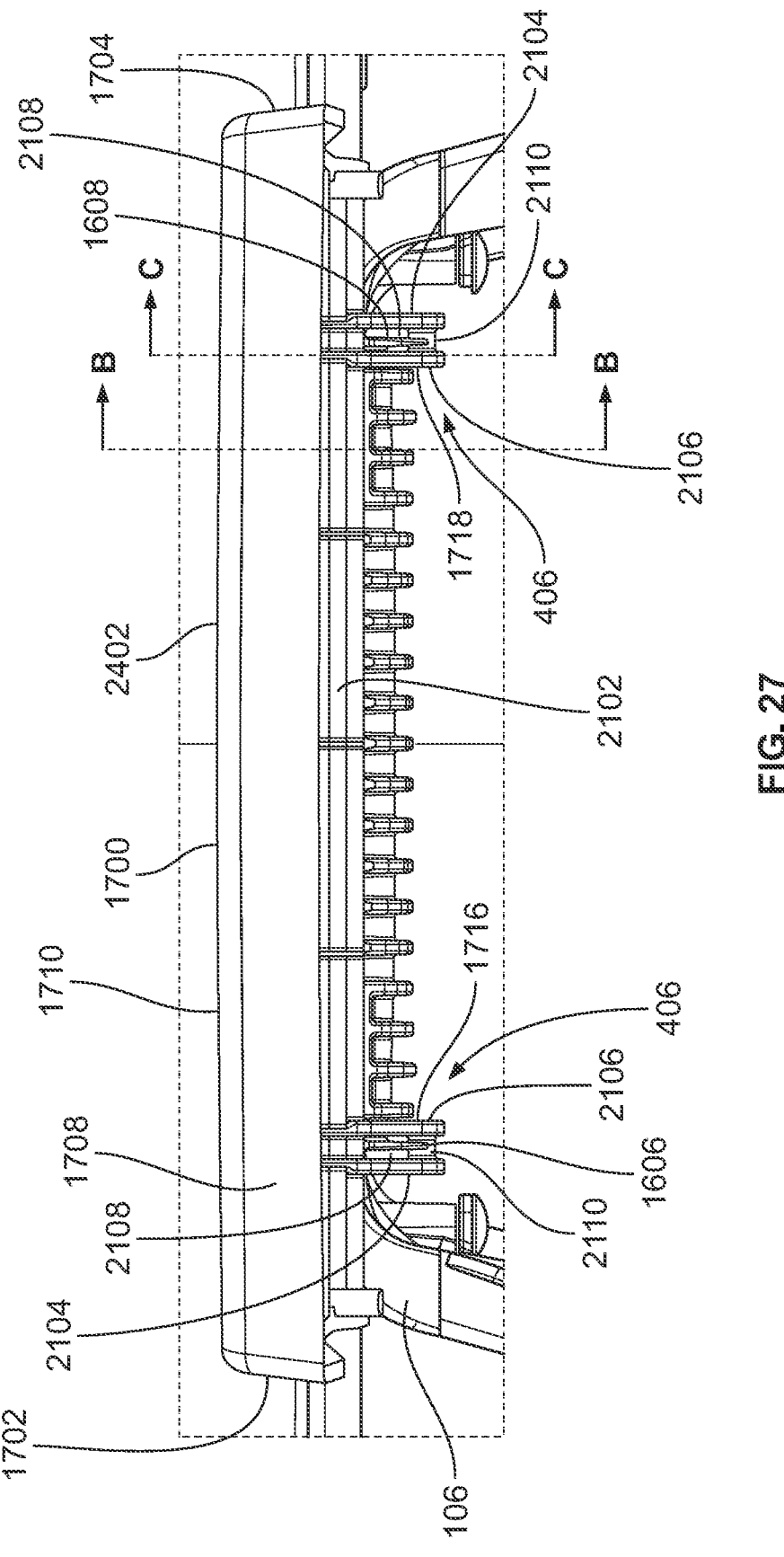
Figures 28, 29:
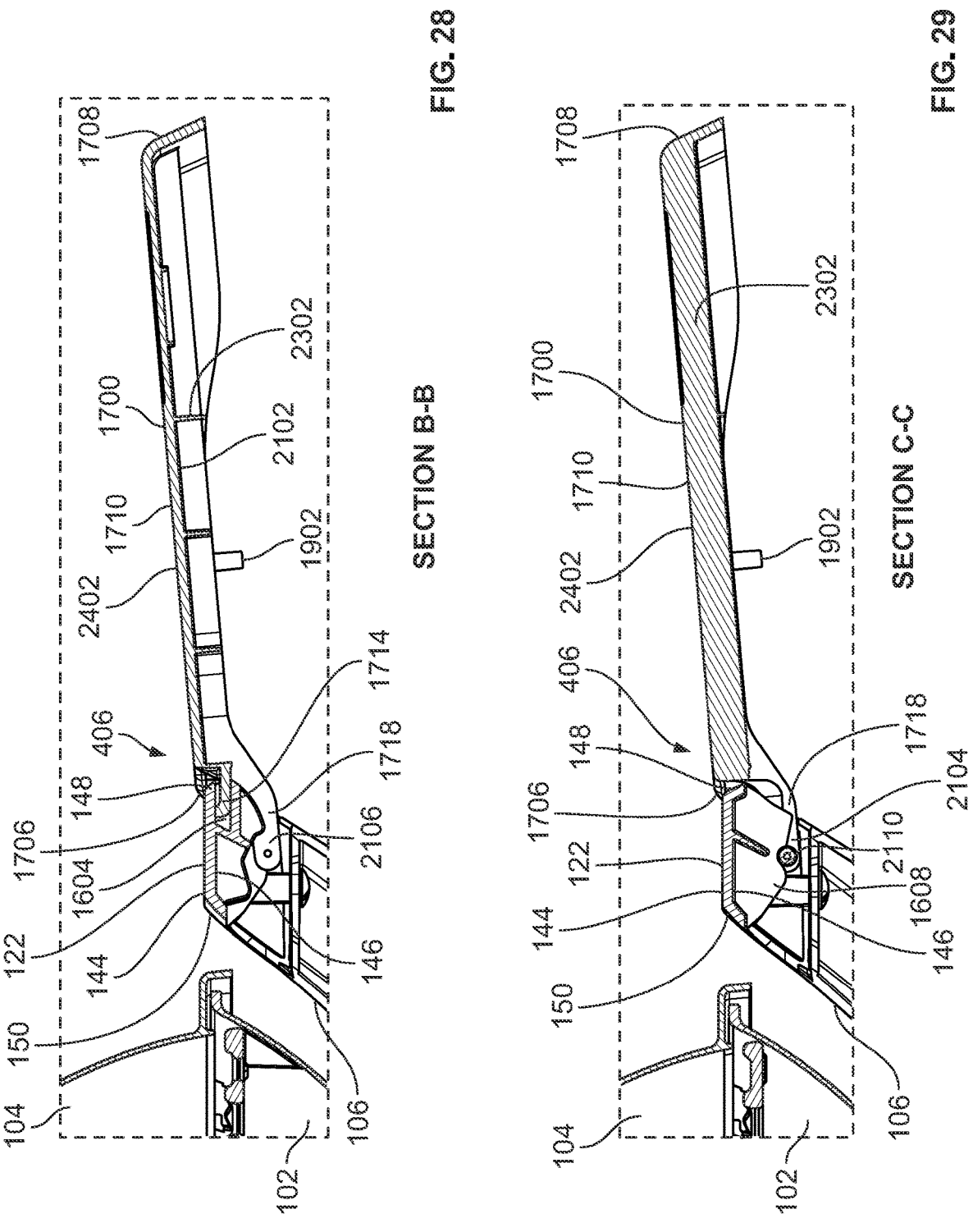
FIG. 28 is a cross-sectional view of the portable grill shown in FIGS. 24-27 taken along section B-B of FIG. 27.
FIG. 29 is a cross-sectional view of the portable grill shown in FIGS. 24-28 taken along section C-C of FIG. 27.

FIG. 24 is a perspective view of the portable grill 100 of FIGS. 1-16, with the side table 1700 of FIGS. 17-23 shown coupled to the first table use assembly 406 of the base 106 of the portable grill 100 in a use position. FIG. 25 is a front view of the portable grill 100 as shown in FIG. 24. FIG. 26 is a right side view of the portable grill 100 as shown in FIGS. 24 and 25. FIG. 27 is an enlarged view of a portion of FIG. 26 showing the side table 1700 coupled to the first table use assembly 406 of the base 106 of the portable grill 100. FIG. 28 is a cross-sectional view of the portable grill 100 shown in FIGS. 24-27 taken along section B-B of FIG. 27. FIG. 29 is a cross-sectional view of the portable grill 100 shown in FIGS. 24-28 taken along section C-C of FIG. 27. The side table 1700 is laterally offset from the cookbox 102 of the portable grill 100 when the side table 1700 is positioned in the use position shown in FIGS. 24-29. With the side table 1700 positioned in the use position (e.g., as shown in FIGS. 24-29), one or more cooking vessels, cooking accessories, and/or items of food can be placed onto and/or supported by the upper surface 1710 of the side table 1700. As shown in FIGS. 24-29, a first instance of the side table 1700 is implemented as an example first side table 2402 (e.g., a right side table) removably coupled to the first table use assembly 406 of the base 106. As further shown in FIGS. 24-29, a second instance of the side table 1700 (e.g., constructed as a mirror image of the first instance of the side table 1700) is implemented as an example second side table 2404 (e.g., a left side table) removably coupled to the second table use assembly 506 of the base 106.

In the illustrated example of FIGS. 24-29, the first tab 1712 and the second tab 1714 of the first side table 2402 are respectively inserted into and/or received by corresponding ones of the first slot 1602 and the second slot 1604 of the first table use assembly 406 of the base 106 of the portable grill 100. Insertion of the first tab 1712 and the second tab 1714 of the first side table 2402 into the corresponding ones of the first slot 1602 and the second slot 1604 of the first table use assembly 406 assists with properly locating the first side table 2402 of the portable grill 100 relative to the first side frame member 122 of the base 106, and/or assists with increasing the rigidity (e.g., the structural integrity) of the connection between the first side table 2402 of the portable grill 100 and the first side frame member 122 of the base 106.

The first hook 1716 and the second hook 1718 of the first side table 2402 respectively receive, contact, and/or engage corresponding ones of the first alignment flange 1606 and the second alignment flange 1608 of the first table use assembly 406 of the base 106 of the portable grill 100. More specifically, the first alignment flange 1606 of the first table use assembly 406 of the base 106 is received within the gap 2108 of the first hook 1716 of the first side table 2402 such that the first alignment flange 1606 contacts and/or engages the brace 2110 of the first hook 1716. Similarly, the second alignment flange 1608 of the first table use assembly 406 of the base 106 is received within the gap 2108 of the second hook 1718 of the first side table 2402 such that the second alignment flange 1608 contacts and/or engages the brace 2110 of the second hook 1718. Insertion of the respective ones of the first alignment flange 1606 and the second alignment flange 1608 of the first table use assembly 406 into corresponding ones of the gap 2108 of the first hook 1716 and the gap 2108 of the second hook 1718 assists with properly locating the first side table 2402 of the portable grill 100 relative to the first side frame member 122 of the base 106, and/or assists with increasing the rigidity (e.g., the structural integrity) of the connection between the first side table 2402 of the portable grill 100 and the first side frame member 122 of the base 106. Engagement of the respective ones of the first alignment flange 1606 and the second alignment flange 1608 of the first table use assembly 406 with corresponding ones of the brace 2110 of the first hook 1716 and the brace 2110 of the second hook 1718 further assists with properly locating the first side table 2402 of the portable grill 100 relative to the first side frame member 122 of the base 106, and/or further assists with increasing the rigidity (e.g., the structural integrity) of the connection between the first side table 2402 of the portable grill 100 and the first side frame member 122 of the base 106.

Figure 30:
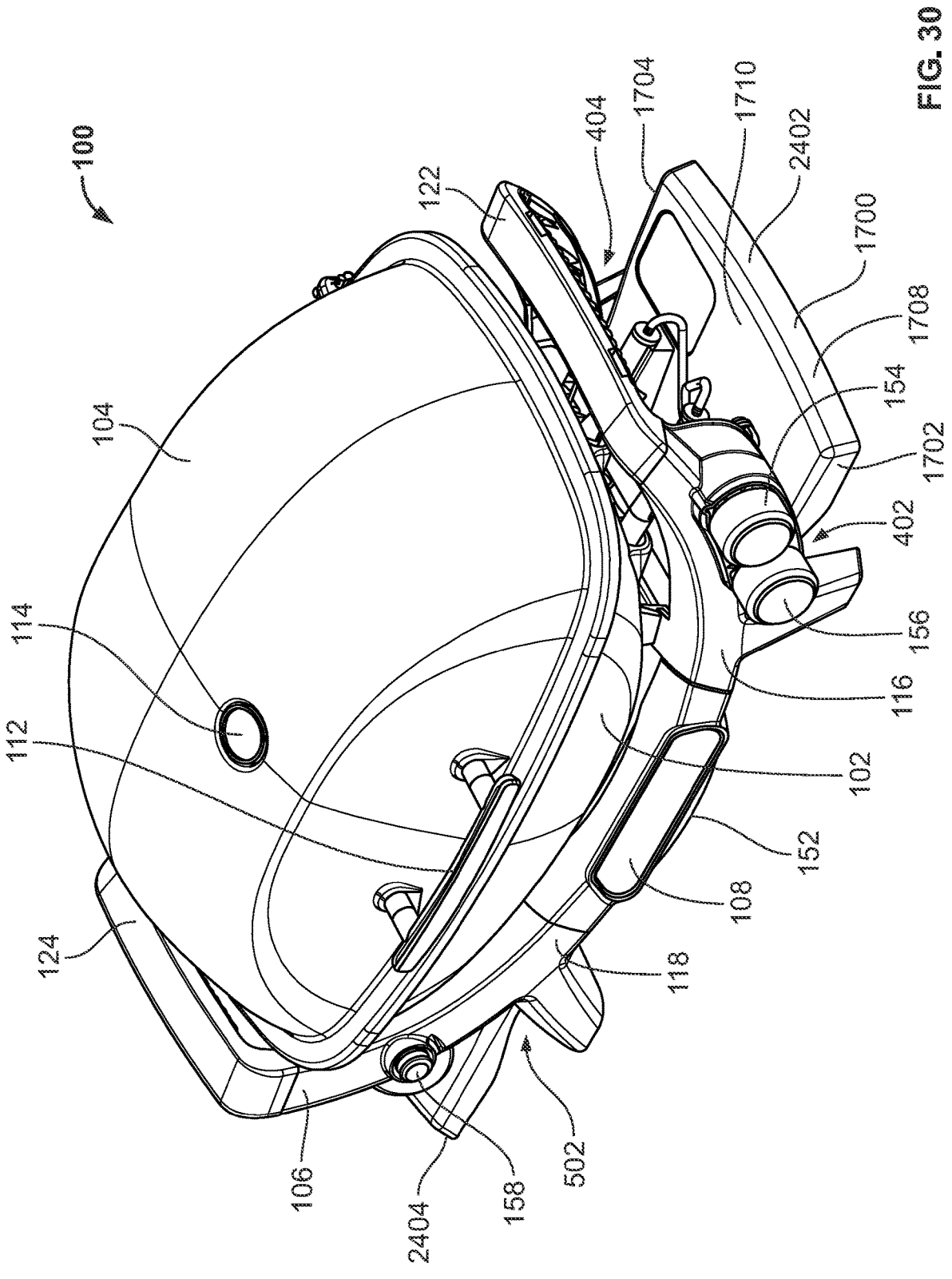
FIG. 30 is a first perspective view of the portable grill of FIGS. 1-16, with the side table of FIGS. 17-23 shown coupled to the first table storage assembly and the second table storage assembly of the base of the portable grill in a storage position.
Figure 31:
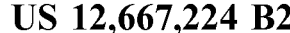
FIG. 31 is a front view of the portable grill as shown in FIG. 30.
Figure 32:
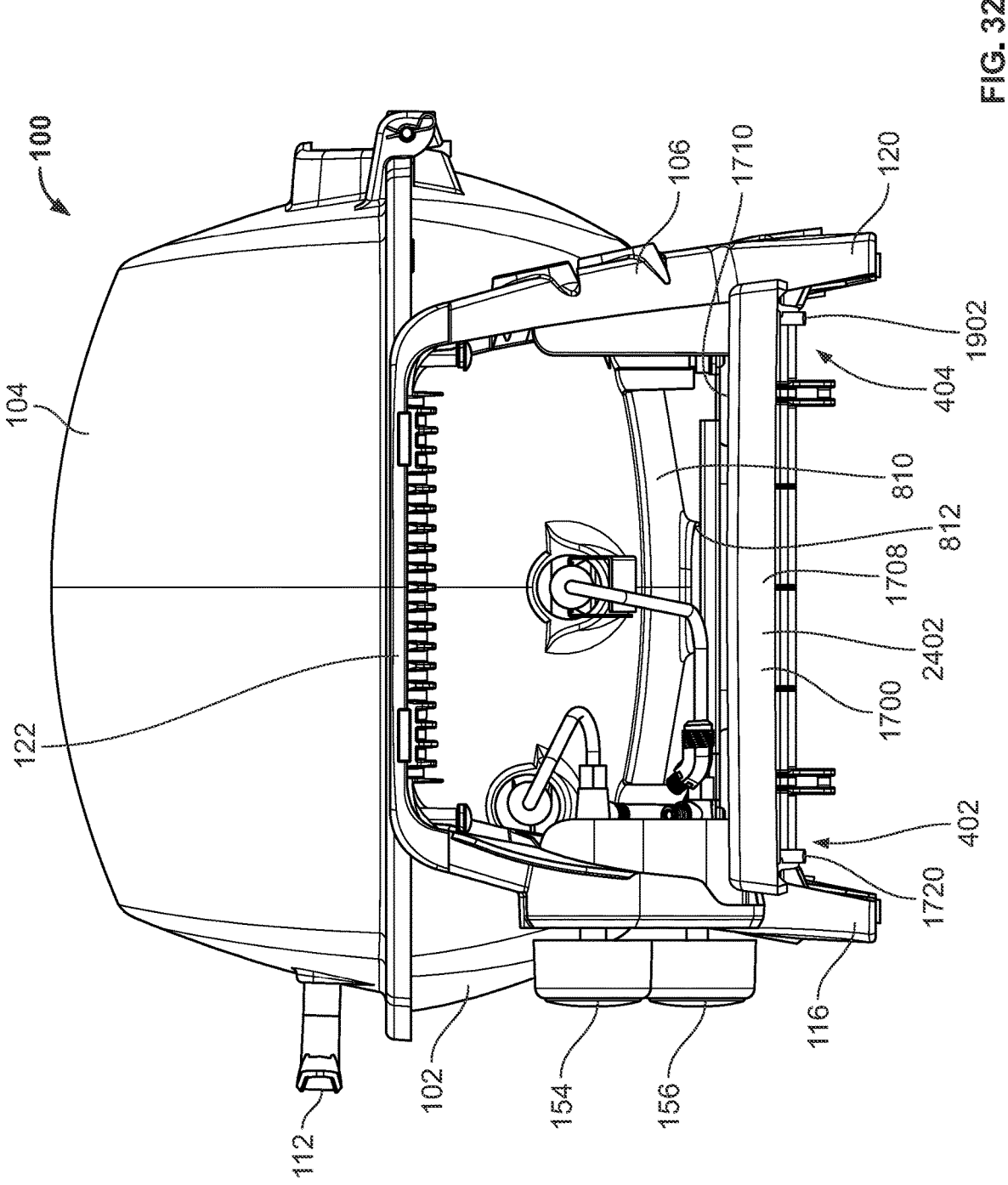
FIG. 32 is a right side view of the portable grill as shown in FIGS. 30 and 31.
Figure 33:
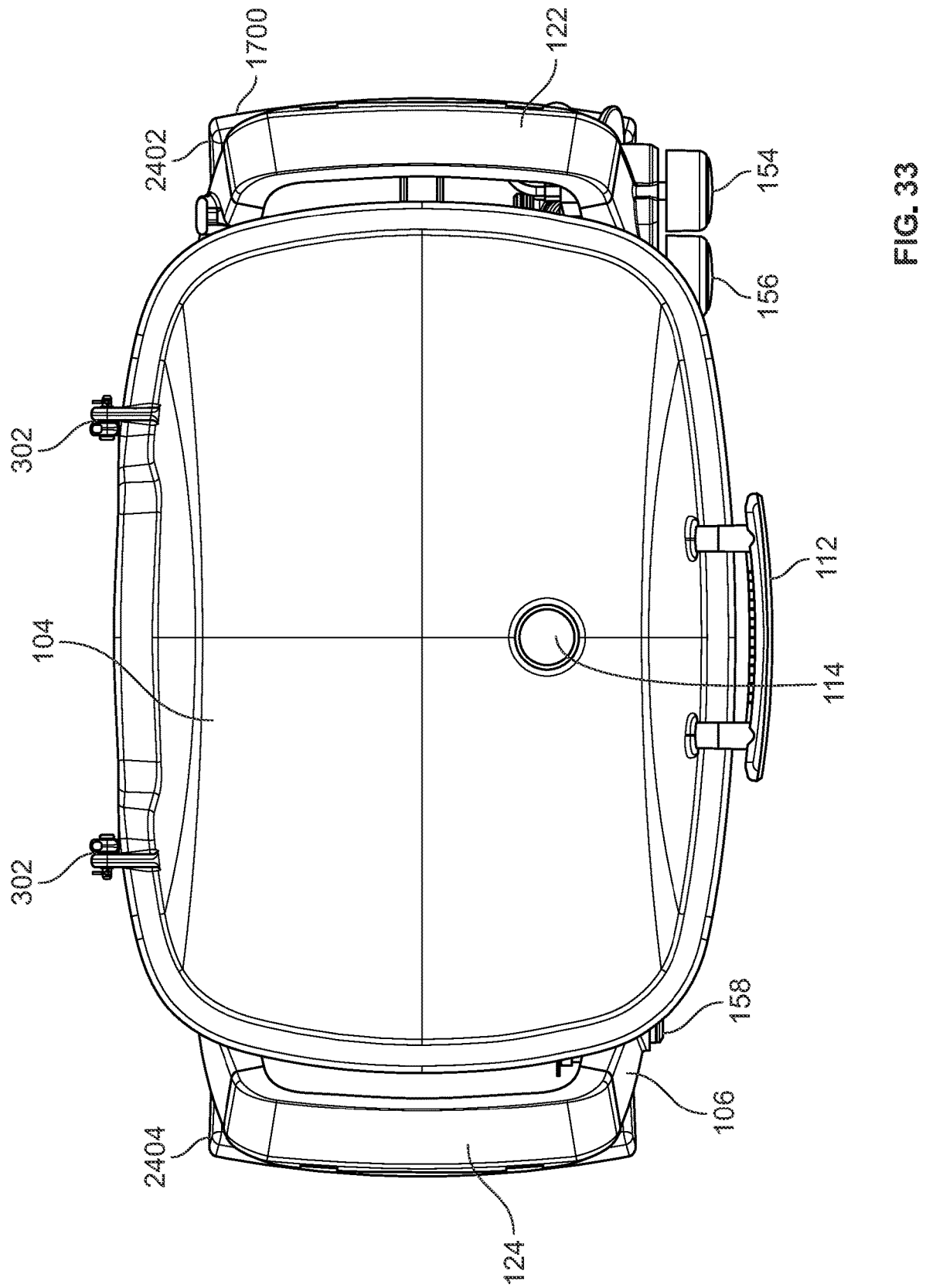
FIG. 33 is a top view of the portable grill as shown in FIGS. 30-32.
Figure 34:
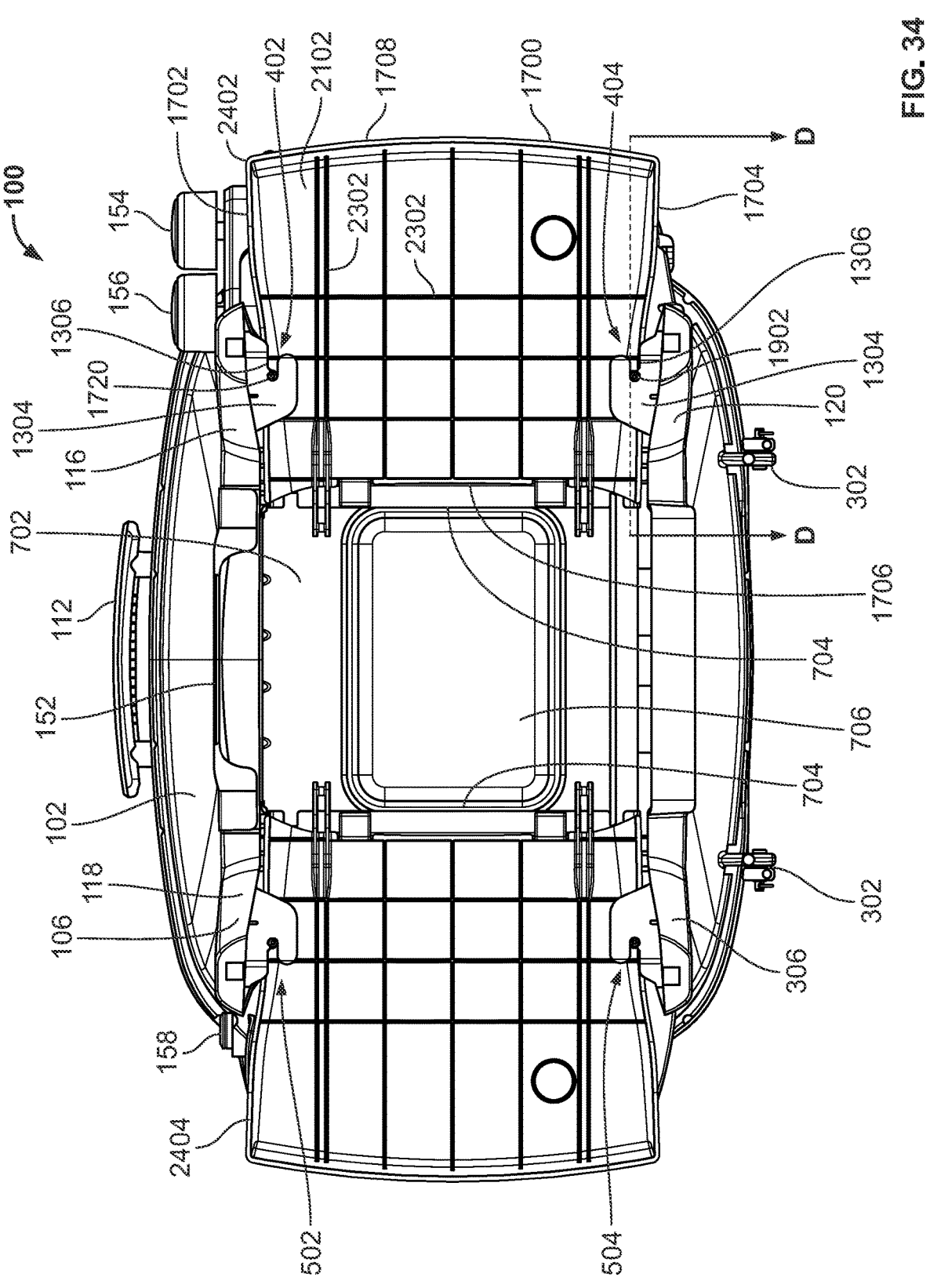
FIG. 34 is a bottom view of the portable grill as shown in FIGS. 30-33.
Figure 35:
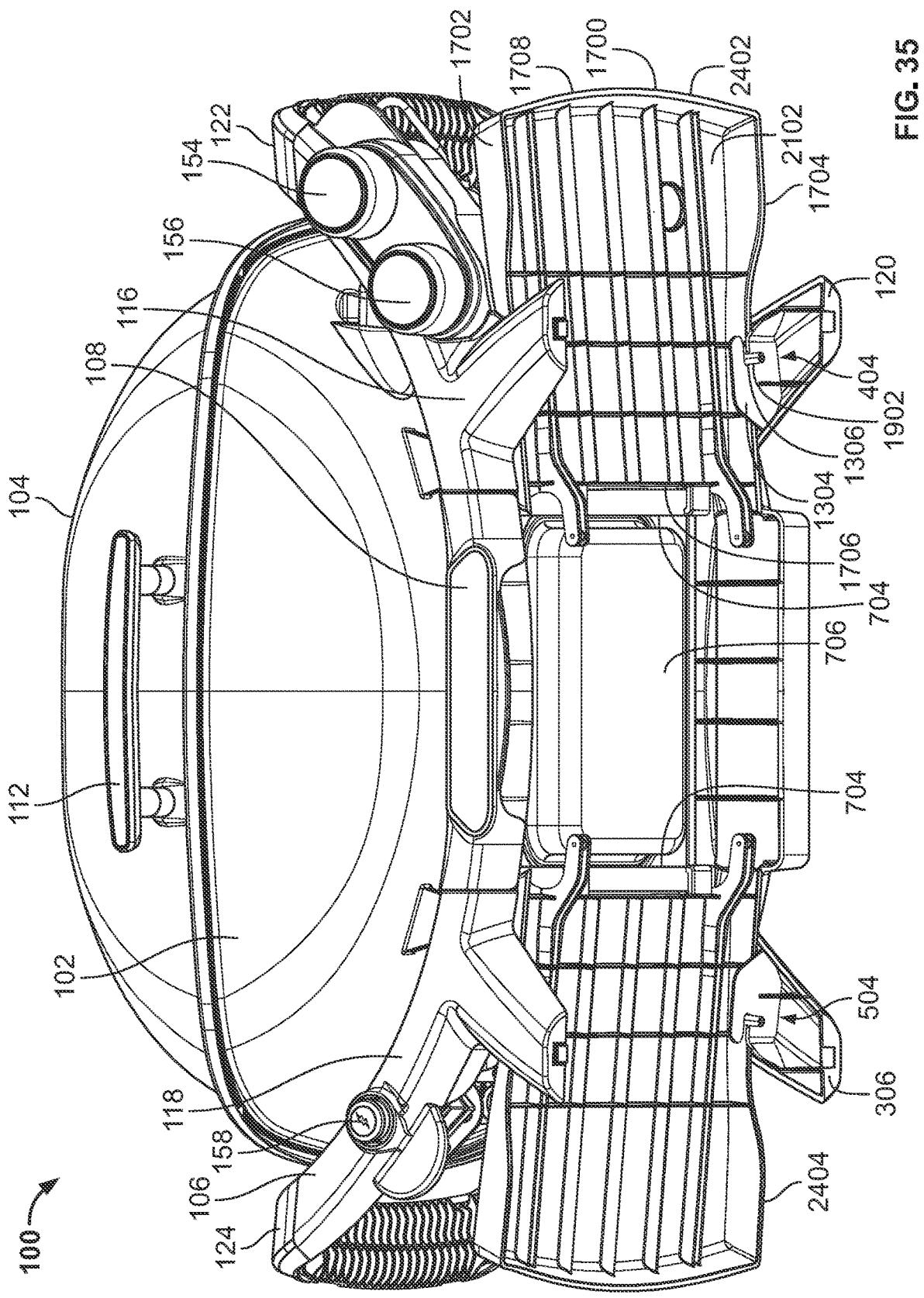
FIG. 35 is a second perspective view of the portable grill as shown in FIGS. 30-34.
Figure 36:
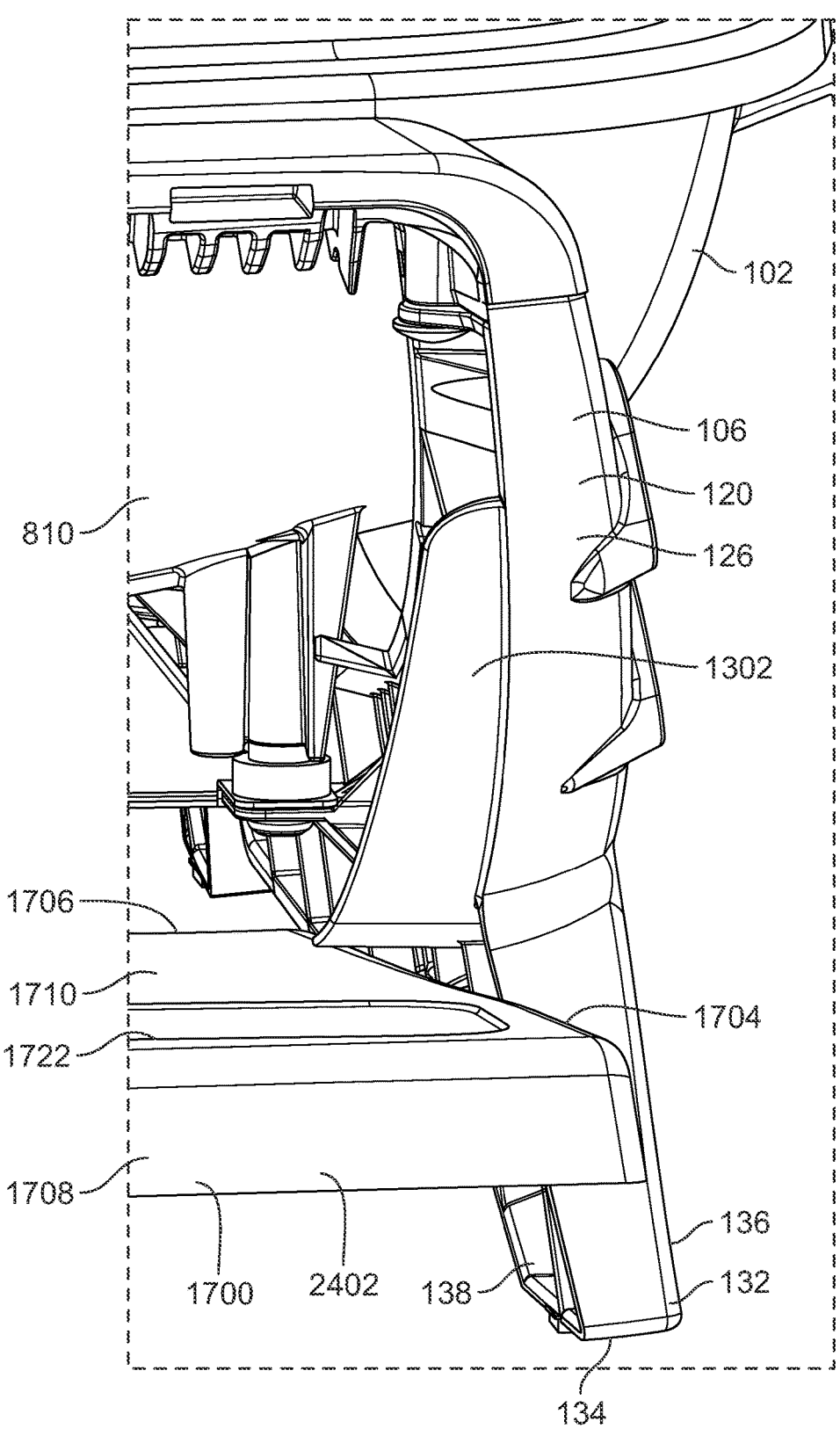
FIG. 36 is a first enlarged perspective view of the portable grill as shown in FIGS. 30-35, with the side table shown coupled to the second table storage assembly of the base of the portable grill.
Figure 37:
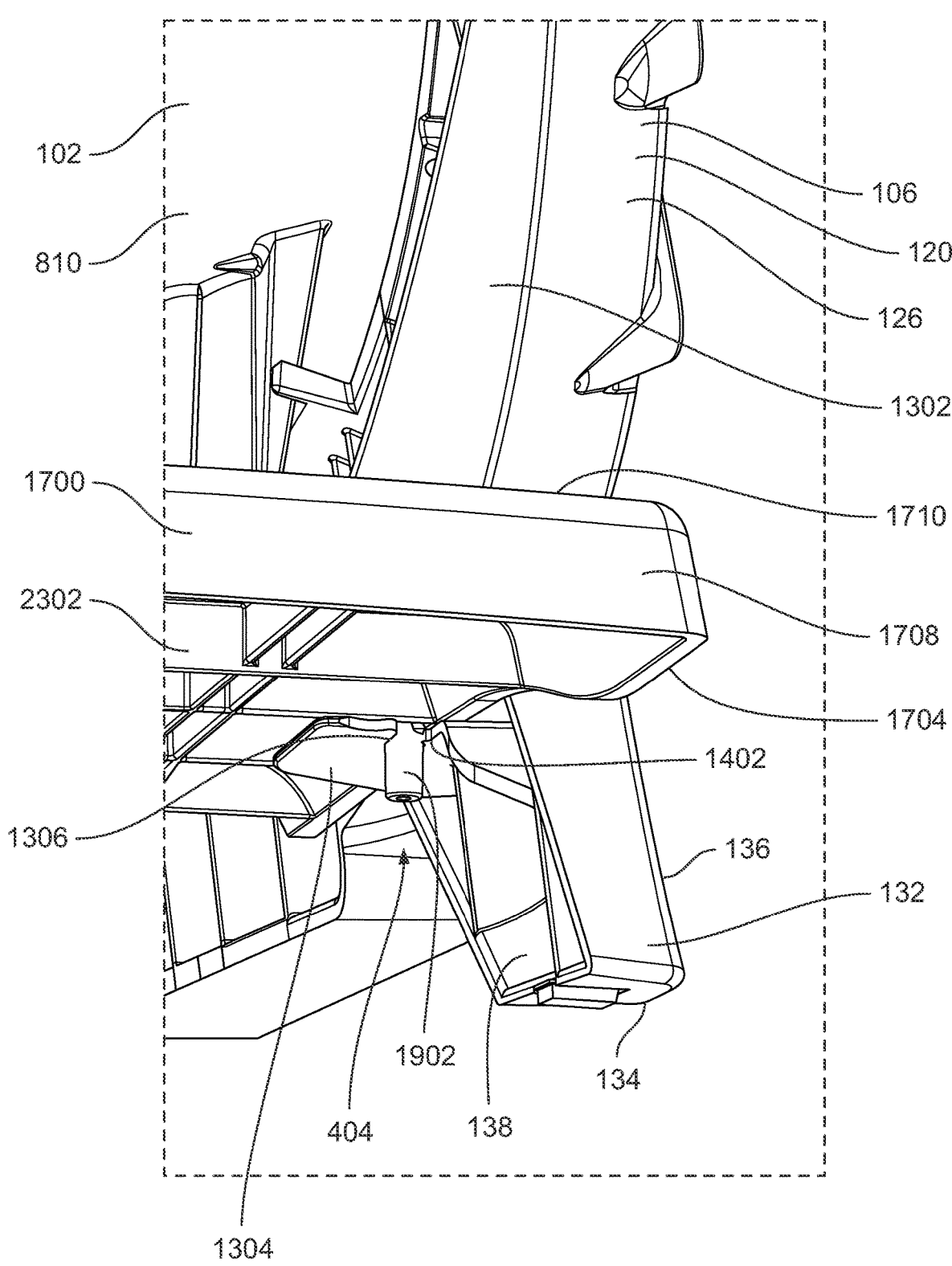
FIG. 37 is a second enlarged perspective view of the portable grill as shown in FIGS. 30-36, with the side table shown coupled to the second table storage assembly of the base of the portable grill.
Figure 38:
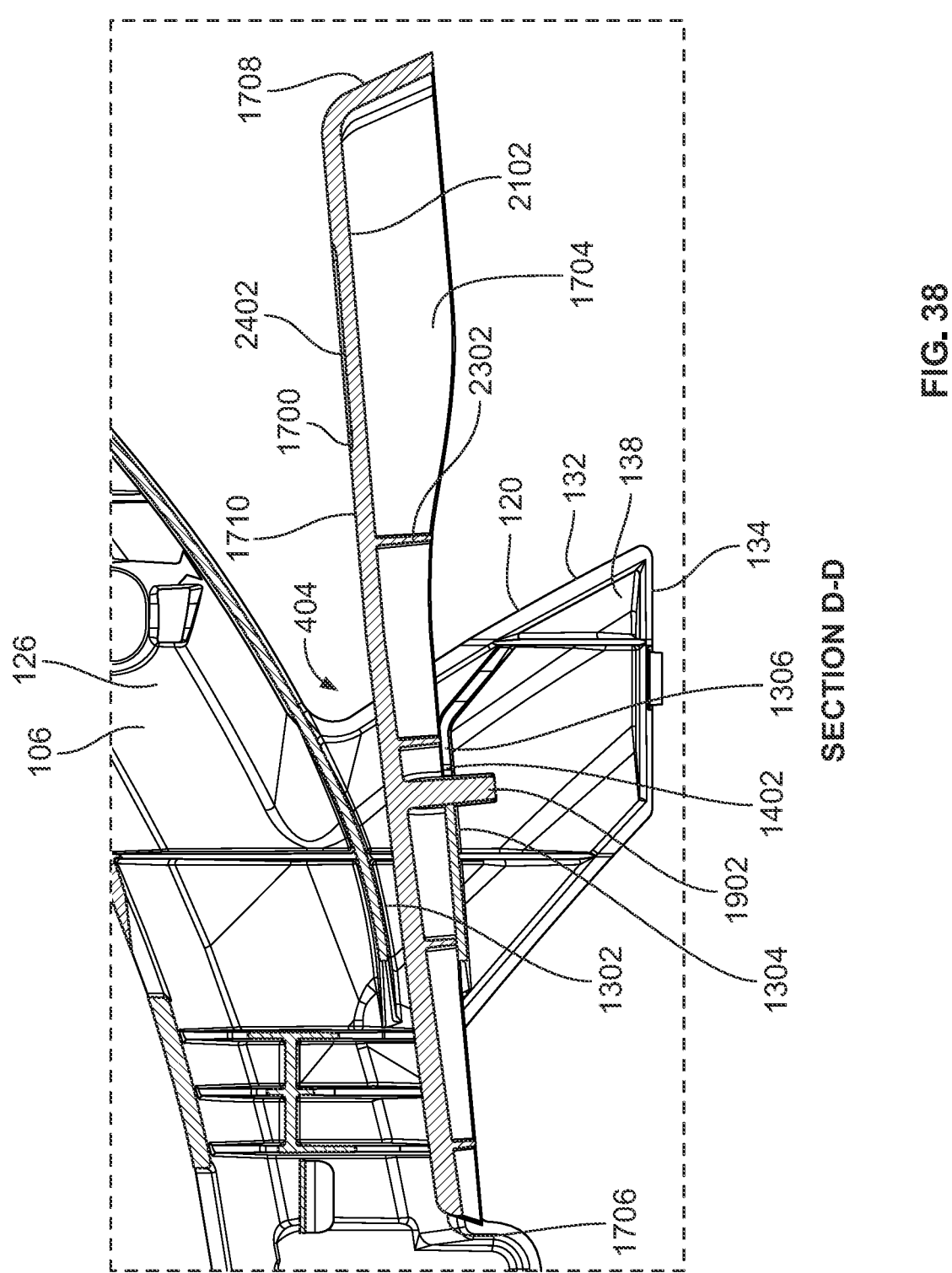
FIG. 38 is a cross-sectional view of the portable grill shown in FIGS. 30-37 taken along section D-D of FIG. 34.

FIG. 30 is a first perspective view of the portable grill 100 of FIGS. 1-16, with the side table 1700 of FIGS. 17-23 shown coupled to the first table storage assembly 402 and the second table storage assembly 404 of the base 106 of the portable grill 100 in a storage position. FIG. 31 is a front view of the portable grill 100 as shown in FIG. 30. FIG. 32 is a right side view of the portable grill 100 as shown in FIGS. 30 and 31. FIG. 33 is a top view of the portable grill 100 as shown in FIGS. 30-32. FIG. 34 is a bottom view of the portable grill 100 as shown in FIGS. 30-33. FIG. 35 is a second perspective view of the portable grill 100 as shown in FIGS. FIG. 36 is a first enlarged perspective view of the portable grill 100 as shown in FIGS. with the side table 1700 shown coupled to the second table storage assembly 404 of the base 106 of the portable grill 100. FIG. 37 is a second enlarged perspective view of the portable grill 100 as shown in FIGS. 30-36, with the side table 1700 shown coupled to the second table storage assembly 404 of the base 106 of the portable grill 100. FIG. 38 is a cross-sectional view of the portable grill 100 shown in FIGS. 30-37 taken along section D-D of FIG. 34.

The side table 1700 is positioned beneath the cookbox 102 of the portable grill 100 (e.g., beneath the bottom wall 810 of the cookbox 102) when the side table 1700 is positioned in the storage position shown in FIGS. 30-38. With the side table 1700 positioned in the storage position (e.g., as shown in FIGS. 30-38), the side table 1700 can be carried and/or held by the base 106 of the portable grill 100 while the portable grill 100 is being transported and/or stored. Locating the side table 1700 in the storage position shown in FIGS. 30-38 advantageously reduces the footprint and/or the overall form factor of the portable grill 100 compared to the footprint and/or the overall form factor of the portable grill 100 that exists when the side table 1700 is located in the use position shown in FIGS. 24-29. In some examples, the footprint and/or the overall form factor of the side table 1700 substantially fits within (e.g., does not exceed) the footprint and/or the overall form factor of the base 106 of the portable grill 100 when the side table 1700 is located in the storage position. As shown in FIGS. 30-38, a first instance of the side table 1700 implemented as the first side table 2402 (e.g., a right side table, as described above in connection with FIGS. 24-29) is removably coupled to the first table storage assembly 402 and/or the second table storage assembly 404 of the base 106. As further shown in FIGS. a second instance of the side table 1700 implemented as the second side table 2404 (e.g., a left side table, as described above in connection with FIGS. 24-29) is removably coupled to the third table storage assembly 502 and the fourth table storage assembly 504 of the base 106.

In the illustrated example of FIGS. 30-38, the first post 1720 and the second post 1902 of the first side table 2402 are respectively inserted into and/or received by corresponding ones of the retainer 1306 of the first table storage assembly 402 and the retainer 1306 of the second table storage assembly 404 of the base 106 of the portable grill 100. As discussed above, each retainer 1306 includes a protrusion 1402 (e.g., a dimple, a bump, a nib, etc.) that creates and/or forms a friction fit with the corresponding received post (e.g., the first post 1720 or the second post 1902) of the first side table 2402 such that the first side table 2402 is removably coupled to and/or removably held in position by the corresponding table storage assembly (e.g., the first table storage assembly 402 or the second table storage assembly 404) of the base 106. As further shown in FIGS. 30-38, the upper surface 1710 of the first side table 2402 is located between the upper flange 1302 and the lower flange 1304 of the first table storage assembly 402 and between the upper flange 1302 and the lower flange 1304 of the second table storage assembly 404 when the first side table 2402 is positioned in the storage position. As further shown in FIGS. 30-38, a lower edge of the front surface 1702 of the first side table 2402 contacts and/or engages the lower flange 1304 of the first table storage assembly 402 when the first side table 2402 is positioned in the storage position. Similarly, a lower edge of the rear surface 1704 of the first side table 2402 contacts and/or engages the lower flange 1304 of the second table storage assembly 404 when the first side table 2402 is positioned in the storage position.

From the foregoing, it will be appreciated that portable grills disclosed herein include one or more side table(s) configured to be removably coupled to the base of the portable grill without the use of any hand tools. Such an arrangement advantageously increases the ease by which the side table(s) can be connected to and/or removed from the portable grill (e.g., for assembling, replacing, and/or cleaning the side table(s)), thereby providing the user of the portable grill with an improved user experience relative to known portable grills. Example portable grills disclosed herein also advantageously include a base having supports configured to store the removable side table(s) of the portable grill in a storage position that places and/or locates the side table(s) beneath the cookbox of the portable grill. Placing the side table(s) in a storage position that is beneath the cookbox of the portable grill advantageously minimizes (e.g., eliminates) the possibility of the side table(s) being exposed to cooking waste (e.g., grease, ash, and/or other residual cooking matter) that might be present within the cooking chamber and/or the cookbox when the side table(s) is/are being stored, as may occur when the portable grill as a whole is being transported or stored. In some disclosed examples, the footprint and/or the form factor of the side table(s) is substantially within (e.g., does not exceed) the footprint and/or the form factor of the base of the portable grill when the side table(s) is/are positioned in the storage position beneath the cookbox. Such an arrangement advantageously increases the portability of the portable grill, thereby providing the user of the portable grill with an improved user experience relative to known portable grills.

In some examples, a portable grill is disclosed. In some disclosed examples, the portable grill comprises a cookbox, a base, and a side table. In some disclosed examples, the base is coupled to the cookbox. In some disclosed examples, the base is configured to support the cookbox above an underlying surface onto which the base is to be placed. In some disclosed examples, the side table is configured to be removably coupled to the base in a storage position. In some disclosed examples, the side table is to be located beneath the cookbox when the side table is coupled to the base in the storage position.

In some disclosed examples, the base includes a frame member having an exterior surface and an interior surface located opposite the exterior surface. In some disclosed examples, the base includes a flange extending from the interior surface of the frame member. In some disclosed examples, the flange includes a retainer.

In some disclosed examples, the side table includes a post. In some disclosed examples, the post is configured to be received in the retainer when the side table is coupled to the base in the storage position.

In some disclosed examples, the retainer includes a protrusion configured to form a friction fit with the post when the side table is coupled to the base in the storage position.

In some disclosed examples, the side table includes an upper surface and a lower surface located opposite the upper surface. In some disclosed examples, the post extends downwardly from the lower surface.

In some disclosed examples, the side table includes a front surface and a rear surface located opposite the rear surface. In some disclosed examples, the post is located proximate the front surface or the rear surface.

In some disclosed examples, the side table includes an inner surface and an outer surface located opposite the inner surface. In some disclosed examples, the post is located approximately midway between the inner surface and the outer surface.

In some disclosed examples, the flange is a lower flange. In some disclosed examples, the base further includes an upper flange extending from the interior surface of the frame member. In some disclosed examples, the upper flange is located above and spaced apart from the lower flange.

In some disclosed examples, an upper surface of the side table is located between the upper flange and the lower flange when the side table is coupled to the base in the storage position.

In some disclosed examples, the upper flange has a curved shape.

In some disclosed examples, the side table is further configured to be removably coupled to the base in a use position. In some disclosed examples, the side table is to be laterally offset from the cookbox when the side table is coupled to the base in the use position.

In some disclosed examples, the base includes a side frame member having an outer surface and an inner surface located opposite the outer surface. In some disclosed examples, the base includes a slot extending inwardly from the outer surface of the side frame member toward the inner surface of the side frame member.

In some disclosed examples, the side table includes a tab configured to be received in the slot when the side table is coupled to the base in the use position.

In some disclosed examples, the base includes a side frame member having an upper surface and a lower surface located opposite the upper surface. In some disclosed examples, the base includes an alignment flange extending downwardly from the lower surface of the side frame member.

In some disclosed examples, the side table includes a hook having a first hook member, a second hook member, and a brace. In some disclosed examples, the second hook member is spaced apart from the first hook member by a gap. In some disclosed examples, the brace extends between the first hook member and the second hook member.

In some disclosed examples, the alignment flange is configured to be located within the gap when the side table is coupled to the base in the use position.

In some disclosed examples, the alignment flange is configured to engage the brace when the side table is coupled to the base in the use position.

In some disclosed examples, the base includes a front frame member having a first exterior surface and a first interior surface located opposite the first exterior surface. In some disclosed examples, the base includes a rear frame member spaced apart from the front frame member. In some disclosed examples, the rear frame member has a second exterior surface and a second interior surface located opposite the second exterior surface. In some disclosed examples, the second interior surface faces the first interior surface. In some disclosed examples, the base includes a first flange extending from the first interior surface of the front frame member. In some disclosed examples, the first flange includes a first retainer. In some disclosed examples, the base includes a second flange extending from the second interior surface of the rear frame member. In some disclosed examples, the second flange includes a second retainer.

In some disclosed examples, the side table includes a first post and a second post. In some disclosed examples, the first post is configured to be received in the first retainer when the side table is coupled to the base in the storage position. In some disclosed examples, the second post is configured to be received in the second retainer when the side table is coupled to the base in the storage position.

In some disclosed examples, the side table includes an upper surface and a lower surface located opposite the upper surface. In some disclosed examples, the first post and the second post extend downwardly from the lower surface.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A portable grill, comprising:
a cookbox;
a base coupled to the cookbox, the base configured to support the cookbox above an underlying surface onto which the base is to be placed, the base including:
a frame member having an exterior surface and an interior surface located opposite the exterior surface; and
a flange extending from the interior surface of the frame member, the flange including a retainer; and
a side table configured to be removably coupled to the base in a storage position, the side table to be located beneath the cookbox when the side table is coupled to the base in the storage position, the side table including a post, the post configured to be received in the retainer when the side table is coupled to the base in the storage position.

2. The portable grill of claim 1, wherein the retainer includes a protrusion configured to form a friction fit with the post when the side table is coupled to the base in the storage position.

3. The portable grill of claim 1, wherein the side table includes an upper surface and a lower surface located opposite the upper surface, the post extending downwardly from the lower surface.

4. The portable grill of claim 3, wherein the side table includes a front surface and a rear surface located opposite the rear surface, the post located proximate the front surface or the rear surface.

5. The portable grill of claim 4, wherein the side table includes an inner surface and an outer surface located opposite the inner surface, the post located approximately midway between the inner surface and the outer surface.

6. The portable grill of claim 1, wherein the flange is a lower flange, and wherein the base further includes an upper flange extending from the interior surface of the frame member, the upper flange located above and spaced apart from the lower flange.

7. The portable grill of claim 6, wherein an upper surface of the side table is located between the upper flange and the lower flange when the side table is coupled to the base in the storage position.

8. The portable grill of claim 6, wherein the upper flange has a curved shape.

9. The portable grill of claim 1, wherein the side table is further configured to be removably coupled to the base in a use position, the side table to be laterally offset from the cookbox when the side table is coupled to the base in the use position.

10. The portable grill of claim 9, wherein the base includes:

a side frame member having an outer surface and an inner surface located opposite the outer surface; and a slot extending inwardly from the outer surface of the side frame member toward the inner surface of the side frame member.

11. The portable grill of claim 10, wherein the side table includes a tab configured to be received in the slot when the side table is coupled to the base in the use position.

12. The portable grill of claim 9, wherein the base includes:

a side frame member having an upper surface and a lower surface located opposite the upper surface; and an alignment flange extending downwardly from the lower surface of the side frame member.

13. The portable grill of claim 12, wherein the side table includes a hook having a first hook member, a second hook member, and a brace, the second hook member being spaced apart from the first hook member by a gap, the brace extending between the first hook member and the second hook member.

14. The portable grill of claim 13, wherein the alignment flange is configured to be located within the gap when the side table is coupled to the base in the use position.

15. The portable grill of claim 13, wherein the alignment flange is configured to engage the brace when the side table is coupled to the base in the use position.

16. A portable grill, comprising:

a cookbox;

a base coupled to the cookbox, the base configured to support the cookbox above an underlying surface onto which the base is to be placed, the base including:

a front frame member spaced apart from the cookbox; and a rear frame member spaced apart from the cookbox and spaced apart from the front frame member, wherein the front frame member and the rear frame member each include an exterior surface that faces away from the cookbox and an interior surface that faces toward the cookbox, wherein the interior surface of the front frame member faces toward the interior surface of the rear frame member, wherein the front frame member and the rear frame member each further include an upper flange and a lower flange, wherein the upper flange and the lower flange of the front frame member are integrally formed with and respectively extend from the interior surface of the front frame member toward the interior surface of the rear frame member, wherein the upper flange and the lower flange of the rear frame member are integrally formed with and respectively extend from the interior surface of the rear frame member toward the interior surface of the front frame member, wherein each lower flange includes a retainer formed therein, and wherein each retainer includes a protrusion formed along an edge of the retainer; and a side table configured to be removably coupled to the base in a storage position in which the side table is located beneath the cookbox with the side table extending between the front frame member and the rear frame member, wherein the side table includes a first post and a second post that respectively extend downwardly from a lower surface of the side table, wherein the first post is received by the retainer of the lower flange of the front frame member and retained therein via a friction fit formed relative to the first post by the protrusion of the retainer of the lower flange of the front frame member when the side table is coupled to the base in the storage position, and wherein the second post is received by the retainer of the lower flange of the rear frame member and retained therein via a friction fit formed relative to the second post by the protrusion of the retainer of the lower flange of the rear frame member when the side table is coupled to the base in the storage position.

17. The portable grill of claim 16, wherein the side table further includes a front surface, a rear surface, an inner surface, an outer surface, and an upper surface, the rear surface located opposite the front surface, the outer surface located opposite the inner surface, the lower surface located opposite the upper surface, wherein the first post of the side table is located proximate the front surface of the side table, and the second post of the side table is located proximate the rear surface of the side table.

18. The portable grill of claim 17, wherein the first post and the second post of the side table are respectively located approximately midway between the inner surface and the outer surface of the side table.

19. The portable grill of claim 16, wherein the side table further includes a front surface, a rear surface, an inner surface, an outer surface, and an upper surface, the rear surface located opposite the front surface, the outer surface located opposite the inner surface, the lower surface located opposite the upper surface, wherein the upper surface of the side table is located between the upper flange and the lower flange of the front frame member and between the upper flange and the lower flange of the rear frame member when the side table is coupled to the base in the storage position.

20. The portable grill of claim 19, wherein a lower edge of the front surface of the side table contacts the lower flange of the front frame member and a lower edge of the rear surface of the side table contacts the lower flange of the rear frame member when the side table is coupled to the base in the storage position.

* * * * *